(12) United States Patent
Rabhi

(10) Patent No.: US 9,546,654 B2
(45) Date of Patent: Jan. 17, 2017

(54) HYDRAULIC MOTOR-PUMP WITH FIXED OR VARIABLE DISPLACEMENT

(71) Applicant: Vianney Rabhi, Lyons (FR)

(72) Inventor: Vianney Rabhi, Lyons (FR)

( * ) Notice: Subject to any disclaimer, the term of this patent is extended or adjusted under 35 U.S.C. 154(b) by 529 days.

(21) Appl. No.: 14/171,972

(22) Filed: Feb. 4, 2014

(65) Prior Publication Data
US 2014/0219848 A1    Aug. 7, 2014

Related U.S. Application Data

(60) Provisional application No. 61/826,098, filed on May 22, 2013.

(30) Foreign Application Priority Data

Feb. 4, 2013    (FR) ...................................... 13 50949

(51) Int. Cl.
*F01B 5/00*          (2006.01)
*F04C 2/04*          (2006.01)
(Continued)

(52) U.S. Cl.
CPC . *F04C 2/04* (2013.01); *B60K 6/12* (2013.01); *B60K 17/10* (2013.01); *F03C 1/047* (2013.01); *F03C 1/26* (2013.01); *F04B 1/047* (2013.01); *F04B 11/0008* (2013.01); *F04B 11/0016* (2013.01); *F15B 1/24* (2013.01); *F16C 33/306* (2013.01); *F16C 33/36* (2013.01); *F16C 33/585* (2013.01); *F16C 41/004* (2013.01); *F16H 39/00* (2013.01); *F16H 39/04* (2013.01); *F16H 39/40* (2013.01); *B60K 7/0015* (2013.01); *B60K 2007/0046* (2013.01); *B60K 2007/0061* (2013.01); *B60K 2007/0092* (2013.01);
(Continued)

(58) Field of Classification Search
CPC ........... F04C 2/04; F01B 1/062; F01B 1/0627; F01B 1/0631; F01B 1/0634; F01B 1/0637; F01B 1/0658; F01B 1/0672; F01B 1/12; F01B 5/00; F01B 5/003; F01B 5/006
See application file for complete search history.

(56) References Cited

U.S. PATENT DOCUMENTS 1,895,353 A *   1/1933   Sturm ....................... F01B 5/00
                                                           417/462
2,608,933 A *   9/1952   Ferris ..................... F01B 1/0644
                                                           417/272
(Continued)

FOREIGN PATENT DOCUMENTS

FR            1259827 A      3/1961
FR            2969705 A1    6/2012

*Primary Examiner* — Michael Leslie
*Assistant Examiner* — Dustin T Nguyen
(74) *Attorney, Agent, or Firm* — Young & Thompson

(57) ABSTRACT

The fixed or variable displacement hydraulic motor-pump (1) includes a motor-pump central rotor (3) in which a hydraulic cylinder (14) is arranged, the rotor (3) being in sealed contact with an input-output spool valve (43) connecting the cylinder (14) with a motor-pump frame (2) while a hydraulic piston (13) moves in the cylinder (14) to push, using a hydraulic piston guided plunger (18), a tangential arm (22) articulated in the central rotor (3), and a tangential arm antifriction roller (28) on a motor-pump peripheral rotor (29) synchronized in rotation with the motor-pump central rotor (3).

57 Claims, 22 Drawing Sheets

(51) Int. Cl.
*F16C 33/30* (2006.01)
*F16C 33/36* (2006.01)
*F16C 33/58* (2006.01)
*F16C 41/00* (2006.01)
*B60K 17/10* (2006.01)
*F04B 1/047* (2006.01)
*F03C 1/047* (2006.01)
*F03C 1/26* (2006.01)
*F16H 39/04* (2006.01)
*F04B 11/00* (2006.01)
*F15B 1/24* (2006.01)
*F16H 39/00* (2006.01)
*F16H 39/40* (2006.01)
*B60K 6/12* (2006.01)
*B60K 7/00* (2006.01)

(52) U.S. Cl.
CPC ........... *F01B 5/00* (2013.01); *F15B 2201/205* (2013.01); *F15B 2201/31* (2013.01); *F15B 2201/411* (2013.01); *F15B 2201/42* (2013.01); *F15B 2201/51* (2013.01); *Y02P 80/13* (2015.11); *Y02T 10/6208* (2013.01)

(56) References Cited

U.S. PATENT DOCUMENTS 3,557,661 A * 1/1971 Orshansky, Jr. ..... B60K 7/0015
91/184
2012/0174895 A1 7/2012 Rabhi

* cited by examiner

HYDRAULIC MOTOR-PUMP WITH FIXED OR VARIABLE DISPLACEMENT

FIELD OF INVENTION

The present invention relates to a hydraulic motor-pump with fixed or variable displacement.

BACKGROUND OF THE INVENTION

Hydraulic pumps, hydraulic motor-pumps and hydraulic motors are used in many industrial and household applications and may, under certain conditions, also be used as a means for transmitting power between the heat or electric engine of motor vehicles and the wheels of said vehicles. Various industrial and household applications could thus benefit greatly from a hydraulic motor-pump offering a high output at a moderate cost. It is nevertheless in the field of automobile propulsion that the positive environmental, energy and economic impact of such a hydraulic motor-pump would be the most obvious.

The large majority of motor vehicles driving throughout the world are propelled by reciprocating internal combustion heat engines operating primarily with oil-based fuels. For environmental, energy and economic reasons, reducing motor vehicle fuel consumption and the associated carbon dioxide emissions is a priority in most countries across the globe. Consequently, reciprocating internal combustion motor vehicle engines are subject to constant improvements to increase their output, in particular during everyday use.

Progress is not, however, limited to the heat engine itself: reducing the weight of motor vehicles, their aerodynamic drag and the rolling resistance of their tires also contributes to reducing the per-kilometer fuel consumption of said vehicles, by reducing the work their heat engines must supply to propel them. The use of onboard equipment with a high energy output also contributes to reducing the fuel consumption of motor vehicles, whether that equipment is dedicated to air conditioning for the passenger compartment, power steering, lighting, or information and communication.

Aside from the heat engine itself, at least four other strategies allow a noticeable improvement of the energy output of a motor vehicle:

Reducing friction losses produced by the members that transmit the mechanical work produced by the heat engine of said vehicle to its wheels;

Continuously optimizing the ratio of the transmission connecting said heat engine to the drive wheels of said vehicle such that said engine always works as close as possible to its operating point offering the best energy output;

Temporarily storing all or part of the mechanical work produced by the heat engine when its output is high, said work then being recovered so as to move the motor vehicle in the power ranges where the output of said engine is ordinarily low, so as to avoid using said engine in those ranges;

Recovering the largest possible portion of the kinetic energy of the motor vehicle during braking or deceleration thereof by replacing, as much as possible, the use of friction brakes, which dissipate said energy as a pure loss in the form of heat, by storing said energy in a form that can be reused in the reacceleration phase of said vehicle, the storage device for said energy having to offer the best possible output both in terms of storage and recovery, and having to have a storage and recovery power such that the greatest amount of kinetic energy of the vehicle can be recovered, then released.

These four strategies are found alone or in combination in various types of transmissions that can be combined with various heat-electric, heat-pneumatic or heat-hydraulic hybrid devices, each configuration involving a compromise between various advantages and drawbacks, without any being fully satisfactory in practice.

At least two types of transmission are used in the context of motor vehicle propulsion: discrete ratio transmissions based on cluster gears, and continuously variable transmissions primarily based on belts, rollers or variable displacement hydraulic motor-pumps. Discrete ratio transmissions may be controlled manually or automatically, whereas continuously variable transmissions are generally controlled automatically.

The traditional gear transmissions have a high output, since the work that they transmit goes through smaller number of pairs of involute pinions. Furthermore, said transmissions are coupled with the heat engine using a dry disc clutch that only dissipates the energy during gear shifting, and in a small quantity. These transmissions are generally actuated by the driver, who selects the ratios thereof manually, at his own discretion. Said gear transmissions are known as "manual transmissions". They still make up the majority of automobile production worldwide, since they offer the best mechanical output of all transmissions combined and are inexpensive to produce.

It is possible to optimize the use of the transmission ratios of traditional transmissions using a maximum output or maximum power criterion of the heat engine. This may be done by allowing software run by a microprocessor to choose the engaged ratio. In that case, an automaton replaces the driver, whose clutch pedal and gear shifter are replaced by electromechanical, electro-hydraulic or electro-pneumatic actuators acting directly on the clutch and the selection ranges of the transmission ratios. These "automated manual transmissions" offer both maximum mechanical output and good optimization of the operating points of the engine.

The main drawback of this configuration is relative slowness in shifting gears, which results—for the vehicle's driver—in an unpleasant sensation of loss of continuity in the transmission of the power. This problem is greatly attenuated, or even practically eliminated, if quick actuators are used, which cooperate with synchro rings that are also quick. The problem with the latter solutions is their cost, which limits them to transmissions for high-end and high-performance vehicles.

It is possible to benefit simultaneously from the high mechanical output of a robotic manual transmission and a rapid transition of transmission ratios by interlocking two transmissions in one another in the same casing. According to this configuration, the first transmission includes the even ratios, while the second includes the odd ratios. These so-called "dual-clutch transmissions" provide excellent transmission continuity of the power during gear shifting, since the ratio that follows the current ratio is pre-engaged. Thus, shifting up or down alternately calls on the clutch corresponding to the first transmission, then that corresponding to the second transmission, the two clutches never being engaged at the same time. However, dual-clutch transmissions remain heavier, more expensive and bulkier than traditional manual transmissions.

A large portion of the worldwide automobile market is equipped with so-called "automatic transmissions". These transmissions, primarily marketed in North America, are generally connected to the heat engine using a hydraulic coupler or a hyperkinetic converter also called "torque converter". As an alternative to the torque converter, said transmissions may be connected to the heat engine using a traditional automated dry or oil bath clutch. The automatic transmissions integrate a series of planetary gear sets whereof the rotation of the rings can be blocked by brakes, said rings thus blocked then transmitting the torque produced by the heat engine to the wheels of the vehicle. Automatic transmissions have the advantage of excellent progressivity in the transition of the ratios and good continuity of the power transmission. However, their output remains mediocre, since they involve considerable energy losses, whether due to the torque converter, any "lock-up" clutch, ratio selection clutches, and the various pump(s) and actuators that they include.

Another family of transmissions is called "continuously variable transmissions" (CVT). Continuously variable transmissions offer infinite ratios between two extreme ratios and generally transmit the work produced by the heat engine to the wheels of the vehicle via the friction between a trapezoidal belt and conical flank pulleys, or via the friction between the rollers of different shapes as found in the "toroidal" transmission produced by the company "Torotrak©" or the "Extroid©" transmission produced by the company "Nissan©". While the smallest transmission ratio of said transmission is non-zero, it is ordinarily necessary to attach a clutch or torque converter to it placed between the heat engine and said transmission to start the vehicle. Unless they are extremely, or even excessively expensive to produce, continuously variable transmissions generally have a lower mechanical output than that of manual transmissions with involute gear pairs. However, said transmissions offering complete transmission continuity and infinite transmission ratios, they allow the heat engine to operate as close as possible to its optimal output in an ordinary driving situation of the vehicle, or at its maximum peak power when the driver pushes the vehicle to obtain a maximal acceleration or speed.

Hydraulic continuously variable transmissions also exist comprising at least one transmitting variable displacement or fixed displacement hydraulic pump and at least one receiving variable displacement or fixed displacement hydraulic motor-pump, the transmitting pump or at least the or said motor-pumps having to be with variable displacement. The transmitting pumps and/or receiving motor-pumps used are generally based on axial pistons or on an internal or external gear pair system.

The ratio between the displacement of the transmitting pump and that of the receiving hydraulic motor-pump defines the transmission ratio, corrected for the volumetric efficiency of those two members. Hydraulic continuously variable transmissions offer infinite transmission ratios starting from a zero ratio if the smallest displacement offered by the transmitting pump is zero. In that case, no clutch or torque converter is necessary. Furthermore, it is possible to provide several receiving hydraulic motor-pumps for a same transmitting hydraulic pump. However, hydraulic continuously variable transmissions accommodate high speeds of revolution poorly and have the drawback of having a low average output, said output varying greatly based on the speed and torque to be transmitted. For that reason, hydraulic continuously variable transmissions are generally provided on slow vehicles such as construction vehicles and agricultural machines, since they are compact and flexible, the transmitting pump and the receiving hydraulic motor(s) being able to be connected to each other by rigid or flexible ducts.

Whatever the type, the transmissions may optionally cooperate with one or more secondary energy storage means, i.e., energy previously converted into mechanical work by the heat engine of the vehicle. Said storage means make it possible on the one hand to operate said engine as close as possible to its optimal output, and on the other hand to recover part of the kinetic energy from the vehicle during its deceleration or braking, or part of the gravitational energy accumulated by said vehicle when it goes down a slope. Once stored, said secondary energy may be used later to reaccelerate said vehicle or to maintain its speed when it is in motion irrespective of the profile of the path on which it travels. Said secondary energy storage means may in particular consist of an electrochemicalor electrostatic electricity storage device, the latter then being reusable by an electric engine, a flywheel storing the kinetic energy recoverable via a mechanical transmission or via an electrical generator powering the electric engine, or a fluid or pressurized gas reservoir that can be used to drive a receiving hydraulic or pneumatic motor.

The energy capacity, output, power, and number of storage-recovery cycles that the different secondary energy storage means allow over their lifetime are the main characteristics that determine their relevance and interest. Furthermore, the durability of the storage offered by said means makes the latter more or less effective in reducing the energy consumption of motor vehicles based on the frequency and type of journeys they perform. The cost per kilowatt hour of stored energy and/or per kilowatt of power and the mass and volume energy density of said secondary energy storage means also make them more or less suitable for motor vehicle propulsion, which calls for widespread marketing of said storage means to significantly reduce their carbon dioxide emissions worldwide.

The secondary energy storage form most commonly used is electricity. This storage is used on vehicles called "heat-electric hybrids", whether the latter are of the serial or parallel type, and irrespective of whether they are rechargeable. Electricity has the advantage of relatively high output over its entire production, storage and release chain, whether it involves the generator that produces said electricity from the mechanical work delivered by the heat engine or from the deceleration of the vehicle, the accumulators that store it, or the electric motor that converts it back into mechanical work. The electrochemical storage devices ordinarily used in this context can easily store the energy necessary for the vehicle to travel several kilometers, or even several tens of kilometers.

Used as secondary energy storage means, electricity nevertheless poses various problems, including the limited charge power of the electrochemical storage devices. The latter in fact only make it possible to store a limited fraction of the vehicle's kinetic energy during braking thereof, particularly regarding braking with a high deceleration. Another problem is that the lifetime of the storage devices is reduced to a limited number of charge-discharge cycles, whereas a very large number of braking operations are done over the lifetime of the motor vehicle. These two problems may be resolved through the use of electrostatic storage devices—also called "super capacitors"—but the latter are too expensive for wide scale use in the automotive field. Although they are more affordable, electrochemical storage devices nevertheless also remain expensive and require rare materials, while their manufacturing and recycling potentially pose various environmental problems. Furthermore, the higher the output of the electrical components of the propulsion system of a heat-electric hybrid motor vehicle is, the higher the cost to manufacture said components will be.

The use of a flywheel to store the secondary energy is known under the acronym "KERS" (Kinetic Energy Recovery System). These devices, primarily used in Formula I, are made up of a flywheel rotating at a high speed in a casing brought to a very low pressure, close to a vacuum. Said flywheel may temporarily be mechanically connected to the transmission of the vehicle using a continuously variable transmission, or indirectly using a generator and an electric motor. KER Shave the advantage of a high energy storage and recovery power, but on the other hand are expensive and potentially dangerous, generate unwanted gyroscopic effects, and only store the energy for a limited amount of time.

Secondary energy is stored using at least one pressure accumulator by various companies such as "Artemis Intelligent Power©", "INNAS©", "Bosch Rexroth©" and "Eaton©", known for its "HLA®" (Hydraulic Launch Assist™) launch assist system, the latter two companies focusing particularly on applications for heavy vehicles or construction vehicles. The vehicles thus equipped are generally referred to as "hydraulic hybrids", whether they are of the serial or parallel type. Upon request, the pressure accumulator used is connected either to a transmitting hydraulic motor-pump when the system is operating in storage mode, or to at least one receiving hydraulic motor-pump in recovery mode. Secondary energy storage using a pressure accumulator is difficult to apply to motor vehicles due to the high speeds of rotation of the heat engines used in those vehicles, said speeds being difficult to reconcile with the axial piston or radial piston hydraulic motor-pumps according to the state of the art, which are only capable of the necessary pressure and energy performance levels. Furthermore, the operating pressure of said motor-pumps remains relatively low, below 500 bar, which requires heavy and bulky pressure accumulators to store the secondary energy necessary for energy optimization of the vehicle, such accumulators being difficult to house in a private passenger vehicle.

In theory, however, the greatest reduction in fuel consumption is found through hydraulic hybridization due to its power, longevity and high storage-recovery output. In practice, when they are used to transmit mechanical work, hydraulic motor-pumps have a low output compared to that of involute gear pairs. Thus, the most common configuration is the parallel hydraulic hybrid, which comprises at least one hydraulic pump, a hydraulic motor-pump and hydraulic storage-recovery means alongside a conventional gear transmission. This type of configuration is generally found on heavy trucks operating at low speeds and making frequent stops and starts, such as garbage trucks and urban delivery trucks. However, it should be noted that the company "Peugeot-Citroen" has introduced a prototype thermal-hydraulic hybrid vehicle called "Hybrid Air" and based on the same architecture, i.e., with the parallel assembly of an automatic transmission and hydraulic braking energy storage-recovery pumps. The storage pressures remaining relatively low, the accumulators remain bulky and take up a large portion of the body understructure of the vehicle while only storing a very small quantity of energy. Despite this, the "Hybrid Air" concept has allowed "Peugeot-Citroën" to announce much lower fuel consumption levels compared to the state of the art.

In these fields of application, although internal or external gear pumps or vane pumps in particular exist, axial and radial piston hydraulic pumps offer the best output. Furthermore, it is possible to vary the displacement of these piston pumps, for example using a plate that may be more or less inclined, or a cage that may be more or less off-centered. To accommodate the continuously varying usage conditions of motor vehicles, said pumps must be able to operate under continuously variable speed, pressure and displacement conditions while preserving a high output which, in the current state of the state of the art, is not possible. In fact, according to the current state of the art, hydraulic piston pumps have an optimal output for a given speed, pressure and displacement. When one strays from these optimal operating conditions, the output of said pumps decreases rapidly, to the point that in the context of an automobile application, the benefit of the continuous gear ratio variation and of the recovery of the kinetic and gravitational energy of the vehicle is low or even zero, and even possibly negative.

The output of the hydraulic pumps is in particular determined by their sealing, which, being imperfect, implies the existence of leaks, for example at the pistons and the spool valve of said pumps. The output of the hydraulic pumps is also reduced on the one hand by the friction occurring in the contact zones between the moving parts and/or between the moving parts and the stationary parts making up said pumps, and on the other hand by the pressure losses occurring in the ducts of said pumps.

The use of hydraulic pumps suffers from various pitfalls and contradictions. A high pressure is favorable for the output of the hydraulic pumps, since it reduces the pressure losses thereof for a same duct definition. However, said high pressure reduces the volumetric efficiency of said pumps because not only are the leak flow rates of the latter increased for a same level of sealing, but said flow rates are higher relative to the flow rate of said pumps. Likewise, at isopressure, the more the displacement of a hydraulic pump is reduced to meet the instantaneous usage needs of a transmission, the greater its friction losses and sealing losses become relative to the work capacity transmitted by said pump.

However, producing a hydraulic transmission with secondary energy storage intended for automobiles encourages high pressures to favor the final output of said transmission as much as possible on the one hand, and to minimize the size of the secondary energy storage members on the other hand, whereas it is imperative in that context to have a hydraulic pump delivering a high output with low displacement, the vehicles most often being used at low speeds and low powers.

Furthermore, it will be noted that the need for high outputs remains, due in particular to the issues of controllability of the displacement of the various pumps and/or hydraulic motor-pumps used; issues of continuity of the power transmission, which must not be affected by the pulsations from the transmitting hydraulic pumps and the receiving hydraulic motor-pump(s); and the acoustic and cavitation erosion issues, the high operational pressures causing strong mechanical biases and potentially violent expansions of hydraulic fluid.

That is why it has been noted that hydraulic piston pumps have been subject to many developments to improve the functional and energy performance thereof. One of the most relevant embodiments is that by the company "Artemis Intelligent Power©", which has produced a piston pump having excellent sealing levels and low friction losses due to rapid solenoid valves that regulate the hydraulic fluid intakes-outputs and the effective capacity of several pump cylinders placed radially around a cam ring. These solenoid valves and the electronic elements that control them makeup the "Digital Displacement©" concept, which advantageously replaces the typical mechanical spool valves, which generate non-negligible leaks and significant friction losses. Furthermore, the hydraulic pump by "Artemis Intelligent Power©" considerably limits the radial forces to which its pistons are subjected, which limits the associated energy losses thereof in the same proportions, said pistons operating in cylinders articulated in spherical chambers that cover the end thereof.

However, the pump by "Artemis Intelligent Power©" offers an even more pulsed operation when the displacement of said pump is low, the reduction of said displacement being done by truncating the working travel of the pistons. This is even more sensitive given that—for cost and bulk reasons—said pump can only include a limited number of cylinders, in particular in the context of a transmission for motor vehicle use. Whichever hypothesis is selected, the hydraulic pump by "Artemis Intelligent Power©" remains relatively expensive to manufacture, and the reliability and electricity consumption of its input/output solenoid valves biased upon each revolution remain crucial points.

Similarly, the company "INNAS©" has developed its "Floating Cup" concept, which results in a variable displacement piston pump with a high peak output and generating low pulses. This pump is in particular provided to propel a motor vehicle according to the "Hybrid" hydraulic hybridization concept claimed by that company. Although effective under certain usage conditions, the "Floating Cup" pump has many leak passages, and its volumetric efficiency is greatly decreased as a result, particularly with partial displacements. This is in contradiction with the specifications of a hydraulic pump intended to propel a motor vehicle.

Despite the issues described above and the challenges related to those issues, it would be a decisive advantage to have a fixed or variable displacement hydraulic motor-pump inexpensive enough to manufacture and with a high enough energy output for all industrial, household or automotive applications. Such a motor-pump would in particular make it possible to produce continuously variable hydraulic transmissions with braking energy recovery that are efficient, compact and cost-effective enough to be applicable to motor vehicles. Aside from being used to transmit the work produced by reciprocating internal combustion engines, such transmissions would make it possible to use non-reciprocating heat engines such as turbine engines, the latter requiring great flexibility in adjusting the instantaneous transmission ratio, power assistance upon starting the vehicle to offset the response time of said turbine engines, and recovery of the rotational kinetic energy of the turbines making up said turbine engines when they slow down or stop rotating.

In order to resolve the various problems related to hydraulic pumps and motors in general, and to manual or automated transmissions, automatic transmissions or continuously variable transmissions, irrespective of whether those transmissions are coupled to an electric, inertial or pressure accumulator secondary energy storage device, the fixed or variable displacement hydraulic motor-pump according to the invention offers, depending on the selected embodiment:

Compatibility with very high operating pressures, possibly up to two thousand bar or more, with low viscosity hydraulic fluids;

Complete reversibility, making it possible to use said hydraulic motor-pump indifferently as a hydraulic pump and as a hydraulic motor, with a similar output in "pump" mode and "motor" mode;

A high-output mechanical configuration in particular with hydraulic pistons that are not subject to any radial force, and with reaction of the majority of the forces by link bearings;

An input/output spool valve having low hydraulic leaks and friction losses;

Good continuous controllability of the displacement of said hydraulic motor-pump from a zero displacement to a maximal displacement;

Relative ease of providing a large number of pistons distributed angularly so as to limit the pressure and flow rate variations at the input or output of said hydraulic motor-pump;

Good compatibility with the relatively high speeds of rotation of automobile heat engines;

A moderate cost.

In the specific context of the motor vehicle transmission, the fixed or variable displacement hydraulic motor-pump according to the invention provides:

A high hydraulic transmission output, close to that of manual transmissions with involute gear pairs, over an expanded speed and load range and compatible with all uses of a motor vehicle;

Vehicle take off from a stop without a clutch or torque converter, those two devices dissipating energy, with the possibility of a zero transmission ratio followed by infinite transmission ratios from that zero ratio up to a maximum transmission ratio;

A compact, powerful, robust, high-output secondary energy storage system, offering a number of storage-recovery cycles compatible with the entire lifetime of a motor vehicle, and capable of preserving a large majority of said secondary energy over long periods of time when said vehicle is stopped.

As a result of these first features, the fixed or variable displacement hydraulic motor-pump according to the invention in particular makes it possible to:

Cause the heat engines, and in particular those used to propel motor vehicles, to work as close as possible to their best output, by continuously adapting the transmission ratio between said engines and the wheels of said automobiles;

Store all or part of the mechanical work produced by the heat engines that are used to propel the motor vehicles when said engines offer a high output, to then restore said work under driving conditions of said motor vehicles where it is preferable to avoid using said engines due to their excessively low output, said storage and release being done at a high output;

Recover a significant part of the kinetic energy of the motor vehicles during braking or deceleration thereof, and/or the gravitational energy of said vehicles when they descend slopes, then to release said energy in the form of mechanical work during the reacceleration of said vehicles, to propel said vehicles.

Aside from these advantages, the fixed or variable displacement hydraulic motor-pump according to the invention provides, according to various embodiments, for:

Being able to load the reciprocating heat engines artificially upon cold engine start, i.e., to ask said engines for more power than necessary to propel the vehicle, that excess power on the one hand causing increased heat production at the exhaust of said engines, which accelerates the temperature increase of their pollutant post-treatment device, and on the other hand being converted into heat inside said engines to accelerate the temperature increase of the latter;

Performing the "stop and start" function, which provides for stopping the heat engines of motor vehicles when said vehicles are stopped, while offering a particularly rapid and powerful restart of said engines favoring the longevity of their hydrodynamic bearings, said "stop and start" function not—according to the invention—causing significant voltage drops in the power supply of said vehicles;

Propelling motor vehicles over distances of several meters or tens of meters without using their heat engine when the latter has been stopped using the "stop and start" function, this particularity reducing the number of restarts of said engine;

Assisting heat engines during motor vehicle takeoff from a stop, so as to offset the possible lack of torque of said engines due to their low displacement and/or high response time for their supercharging;

Facilitating the reduction of the displacement of motor vehicle heat engines—strategy intended to reduce the fuel consumption of said vehicles known by those skilled in the art under the term "downsizing"—in particular by simplifying the adaptation of supercharging of said engines, irrespective of whether that supercharging consists of one or more turbocharger(s) and/or mechanical compressor(s);

Assisting the heat engines during high power demands from the vehicles, so as to improve the performance of said vehicles;

Rotating one or more accessories installed on board motor vehicles, such as an air conditioning compressor, alternator, mechanical supercharging compressor, pump or any other member consuming mechanical work, with the heat engine running or stopped;

Filtering the torque variations at the output of the crankshaft of reciprocating internal combustion engines so as to reduce the sound and vibrational annoyances generated by said variations;

Assisting the rotation of the shaft connecting the turbine to the compressor of the turbocharger of the reciprocating internal combustion engines so as to accelerate the speed increase of said turbocharger in order to reduce the response time thereof;

Limiting the consequences of the response time of supercharging by the turbocharger of reciprocating internal combustion engines, by assisting the latter to propel vehicles when said supercharging does not allow said engines to deliver the desired torque in a short enough time, and by allowing said engines to increase their speed quickly to deliver the requested power and launch the turbine of said turbocharger.

Thus, the fixed or variable displacement hydraulic motor-pump according to the invention makes it possible to:

Greatly reduce fuel consumption and polluting emissions from motor vehicles, particularly when they are used in urban settings, in particular by:

Running their heat engines as close as possible to their best energy output or maximum power, irrespective of the driving conditions;

Accelerating heating upon cold start of their heat engine and their two-way or three-way catalytic converter so as on the one hand to reduce internal friction losses in the engine through rapid reduction of the viscosity of their lubricating oil, and on the other hand reduce the priming time for said catalytic converter;

Allowing, if necessary, regeneration of the particle filter under all circumstances and/or improving the operation of their selective catalytic reduction systems with the urea of nitrogen oxides, these devices most often being provided to control pollution from the exhaust gases of diesel engine vehicles;

Increase the acceleration performance of motor vehicles without changing the heat engine or the mass or resistance to forward motion characteristics thereof, by allowing said engine—during said acceleration—to operate continuously at maximum power on the one hand, and not to undergo the transmission discontinuities specific to the manual or automatic transmissions on the other hand;

Make reducing the weight of motor vehicles less essential to increase the performance and/or reduce the fuel consumption thereof, the effect of said weight on said performance and consumption being lessened by the recovery of kinetic and gravitational energy and the possibility of running the heat engines at their optimal output or power, this making it possible—with equal dynamic and energy performance levels—to increase the level of comfort and safety equipment and/or reduce the price of the motor vehicles;

Increase the comfort of motor vehicle passengers by accelerating heating of the passenger compartment of said vehicles while making it possible to eliminate secondary heating devices for the passenger compartment as sometimes provided in diesel vehicles;

Greatly decrease the use of conventional motor vehicle friction brakes, which reduces the wear thereof as well as maintenance operations, with the corresponding reduction in maintenance costs and the particulate pollution created by said brakes;

Eliminate the additional electrical power necessary for the "stop & start" function ordinarily entrusted to an electric starter;

Replace the differential axle assembly of motor vehicles with means allowing dynamic control of the torque applied to each of the drive wheels of said vehicles.

The fixed or variable displacement hydraulic motor-pump according to the invention further makes it possible, according to various embodiments, to:

Offer the drivers of any motor vehicle the choice between different control modes for the transmission of said vehicle, in particular to reproduce the driving conditions specific to the manual or automated, dual-clutch automatic, torque converter automatic, or continuously variable automatic transmissions, said drivers having infinite behaviors and steppings of the transmission ratios, preprogrammed or programmable, and able to be combined via any man-machine interfaces known by those skilled in the art, and said fixed or variable displacement hydraulic motor-pump according to the invention being controllable using any means—lever, vane, button or pedal—fixed or pluggable, interchangeable or retractable;

Give any motor vehicle an increased motor brake that can be adjusted to the liking of the driver so as to improve the driving comfort for said driver and save the brakes of the vehicle while reducing the risks of overheating of said brakes, so as to improve driver and passenger safety;

Impart a more dynamic nature to the heat engines by assisting them during their speed increases and braking them during their speed decreases.

Furthermore, the fixed or variable displacement hydraulic motor-pump according to the invention allows the use of one or more turbines to propel the motor vehicles as an alternative to the reciprocating internal combustion engine, particularly according to the configuration described in French patent application no. FR 12 59827 dated Oct. 15, 2012 and belonging to the applicant. This combination of means is expected to drastically reduce the fuel consumption of motor vehicles and the carbon dioxide emissions resulting therefrom, which are low relative to the best references in this field. This combination is also expected to reduce the polluting, acoustic and vibratory emissions of said vehicles under particularly favorable economic conditions.

It is understood that aside from its application to motor vehicle transmission systems, the fixed or variable displacement hydraulic motor-pump according to the invention may be applied to many industrial and/or household fields.

The other features of the present invention have been described in the description and the secondary claims that depend directly or indirectly on the primary claim.

The fixed or variable displacement hydraulic motor-pump according to the present invention comprises:

- At least one motor-pump central rotor that includes a central rotor power take-off and that is housed on or in a motor-pump frame, said rotor being able to rotate in at least one central rotor bearing comprised by said frame while remaining in as sealed contact as possible with at least one input/output spool valve kept approximately stationary relative to said frame, said spool valve being able to connect at least one hydraulic cylinder arranged radially or tangentially in said rotor with at least one internal input/output duct and at least one external input/output duct via an internal input/output central rotor channel and an input/output central rotor orifice arranged in the motor-pump central rotor, respectively, one of the ends of said ducts being secured directly or indirectly and sealably in the motor-pump frame, while the other end of said ducts is sealably secured in the input/output spool valve;
- At least one hydraulic piston able to move in translation in the hydraulic cylinder and able to push a guided hydraulic piston plunger or able to be pushed by the latter, said plunger being guided in translation by a plunger guide arranged radially or tangentially in the motor-pump central rotor;
- At least one tangential arm whereof one end is articulated in the motor-pump central rotor while the other end includes a tangential arm bearing face on plunger that can exert a force on a plunger path of contact on tangential arm included by the guided hydraulic piston plunger, the direction of said force being approximately tangential to the axis of rotation of said arm;
- At least one motor-pump peripheral rotor made up of at least one cylindrical peripheral rotor casing whereof at least one end ends with a peripheral rotor flange, said peripheral rotor being able to rotate in at least one peripheral rotor bearing supported by a peripheral rotor stator that is directly or indirectly secured to the motor-pump frame, the motor-pump central rotor being completely or partially housed inside said peripheral rotor;
- At least anti-friction means included by the tangential arm on its face situated opposite the tangential arm bearing face on plunger, said means bearing on the inner surface of the cylindrical peripheral rotor casing.

The fixed or variable displacement hydraulic motor-pump according to the present invention comprises a motor-pump peripheral rotor that is forced to rotate at the same speed as the motor-pump central rotor by an angular peripheral rotor synchro ring secured in rotation to a central rotor angular synchro ring included by the motor-pump central rotor by at least one angular synchronizing pinion rotating around at least one angular synchronizing pinion shaft comprised by the motor-pump frame.

The fixed or variable displacement hydraulic motor-pump according to the present invention comprises antifriction means that are made up of at least one tangential arm antifriction roller that can roll on the one hand on a tangential arm rolling track included by the tangential arm on its face situated opposite the tangential arm bearing face on plunger, and on the other hand on a peripheral rotor rolling track included by the inner surface of the peripheral rotor cylindrical casing, the travel of said roller being limited simultaneously relative to the tangential arm rolling track and the peripheral rotor rolling track by at least one tangential arm roller rack included by the tangential arm rolling track and by at least one peripheral rotor roller ring included by the peripheral roller rolling track, said rack and said ring simultaneously cooperating with at least one roller pinion included by said roller.

The fixed or variable displacement hydraulic motor-pump according to the present invention comprises antifriction means made up of at least one tangential arm friction pad included by the tangential arm on its face situated opposite the tangential arm bearing face on plunger, said pad being able to come into contact with a peripheral rotor friction track included by the inner surface of the peripheral rotor cylindrical casing.

The fixed or variable displacement hydraulic motor-pump according to the present invention comprises a hydraulic piston that comprises a plunger ball joint on hydraulic piston on its circular face that is furthest from the motor-pump central rotor, said ball joint being made up of a hollow or raised truncated sphere shape that cooperates with a hydraulic piston ball joint on plunger comprised by the hydraulic piston guided plunger, said ball joint also being made up of a hollow or raised truncated sphere shape, while the two truncated sphere shapes are complementary and constitute a ball joint connection between said piston and said plunger.

The fixed or variable displacement hydraulic motor-pump according to the present invention comprises a hydraulic piston guided plunger that comprises a brace placed in the extension of the hydraulic piston, and a strut mounted secured to said brace and perpendicular to the latter, said strut bearing the plunger path of contact on tangential arm, while each of its two ends can slide in the plunger guide.

The fixed or variable displacement hydraulic motor-pump according to the present invention comprises a motor-pump central rotor that includes a cylindrical axle housing in which a tangential arm axle is housed whereas the tangential arm is passed through by said axle so as to be articulated in the motor-pump central rotor.

The fixed or variable displacement hydraulic motor-pump according to the present invention comprises a motor-pump central rotor that includes a tangential arm return spring that bears on the one hand on said rotor and on the other hand on the tangential arm.

The fixed or variable displacement hydraulic motor-pump according to the present invention comprises a peripheral rotor rolling track that includes at least one hollow or protruding guide rail that cooperates with at least one hollow or protruding guide groove included by the tangential arm antifriction roller.

The fixed or variable displacement hydraulic motor-pump according to the present invention comprises a central rotor bearing that comprises an inner central rotor bearing track provided with at least one central rotor inner bearing ring, said track being secured to the motor-pump central rotor, on the one hand, and an outer central rotor bearing track provided with at least one central rotor outer bearing ring, said track being secured to the motor-pump frame, on the other hand, whereas at least three central rotor bearing rollers can simultaneously roll on the central rotor inner bearing track and on the central rotor outer bearing track and remain at a constant distance from each other owing to at least one roller pinion included by each central rotor bearing roller and which cooperates with said inner and outer rings.

The fixed or variable displacement hydraulic motor-pump according to the present invention comprises a central rotor inner bearing track and/or a central rotor outer bearing track that includes at least one hollow or protruding guide rail that cooperates with at least one hollow or protruding guide groove included by the central rotor bearing rollers.

The fixed or variable displacement hydraulic motor-pump according to the present invention comprises a peripheral rotor bearing that comprises a peripheral rotor inner bearing track provided with at least one peripheral rotor inner bearing ring, said track being secured to the motor-pump peripheral rotor, on the one hand, and a peripheral rotor outer bearing track provided with at least one peripheral rotor outer bearing ring, said track being secured to the peripheral rotor stator, on the other hand, whereas at least three peripheral rotor bearing rollers can roll simultaneously on the peripheral rotor inner bearing track and the peripheral rotor outer bearing track and remain at a constant distance from each other owing to at least one roller pinion included by each peripheral rotor bearing roller and which cooperates with said inner and outer rings.

The fixed or variable displacement hydraulic motor-pump according to the present invention comprises a peripheral rotor inner bearing track and/or a peripheral rotor outer bearing track that includes at least one hollow or protruding guide rail that cooperates with at least one hollow protruding guide groove included by the peripheral rotor bearing rollers.

The fixed or variable displacement hydraulic motor-pump according to the present invention comprises an input/output spool valve that is prevented from rotating with the motor-pump central rotor and is kept in rotation relative to the motor-pump frame by at least one lug or tie rod directly or indirectly fastened to the motor-pump frame.

The fixed or variable displacement hydraulic motor-pump according to the present invention comprises an input/output spool valve that is a cylindrical stator housed with slight play in a stator cylinder arranged at the center of the motor-pump central rotor and coaxially to the latter, said stator containing an inner duct chamber that communicates on the one hand with the inner input/output duct, and on the other hand with an inner duct angular input/output manifold included by said stator in its periphery via an inner input/output spool valve channel, whereas said stator also contains an outer duct chamber that communicates on the one hand with the outer input/output duct, and on the other hand with an outer duct angular input/output manifold also included by said stator in its periphery via another inner input/output spool valve channel.

The fixed or variable displacement hydraulic motor-pump according to the present invention comprises a cylindrical stator that includes, next to the inner duct input/output angular manifold, at least one outer duct radial force equalizing groove that communicates with the outer duct chamber via a spool valve equalizing inner channel whereas said stator also includes at least one inner duct radial force equalizing groove that communicates with the inner duct chamber via another spool valve equalizing inner channel, said groove being situated next to the outer duct angular input/output manifold.

The fixed or variable displacement hydraulic motor-pump according to the present invention comprises a cylindrical stator that includes an axial sealing groove near at least one of its axial ends.

The fixed or variable displacement hydraulic motor-pump according to the present invention comprises an input/output spool valve that is an axial stator made up of a distributing flange and an equalizing flange placed axially on either side of the motor-pump central rotor respectively across from a distribution face and an equalizing face formed on said rotor, said flanges being mechanically connected to each other via a central axial stator hub that axially passes through said central rotor via a stator cylinder arranged at the center of said central rotor and coaxially thereto, said stator containing an inner duct chamber that communicates on the one hand with the inner input/output duct, and on the other hand with an inner duct input/output angular manifold axially arranged on the inner face of the distributing flange via an inner spool valve input/output channel, whereas said stator also contains an outer duct chamber that communicates on the one hand with the outer input/output duct, and on the other hand with an outer duct input/output angular manifold also arranged axially on the inner face of the distributing flange via another inner spool valve input/output channel.

The fixed or variable displacement hydraulic motor-pump according to the present invention comprises an inner duct chamber that communicates with an inner duct axial force equalizing groove arranged axially on the inner face of the equalizing flange via a spool valve equalizing inner channel, whereas the outer duct chamber communicates with an outer duct axial force equalizing groove also arranged axially on the inner face of the equalizing flange via another inner spool valve equalizing channel.

The fixed or variable displacement hydraulic motor-pump according to the present invention comprises a distributing flange and/or an equalizing flange that includes a radial sealing groove at least at one of its radial ends.

The fixed or variable displacement hydraulic motor-pump according to the present invention comprises an axial stator central hub that includes an axial sealing groove at least at one of its axial ends or at any point along its length.

The fixed or variable displacement hydraulic motor-pump according to the present invention comprises all or part of the inner duct input/output angular manifold, the outer duct input/output angular manifold, the outer duct radial force equalizing groove, the inner duct radial force equalizing groove, the axial sealing groove, the inner duct axial force equalizing groove, the outer duct axial force equalizing groove or the radial sealing groove, which is provided with a spool valve groove segment.

The fixed or variable displacement hydraulic motor-pump according to the present invention comprises a spool valve groove segment that has at least one flank segment that laterally establishes sealing with the cylindrical stator or the axial stator, and at least one segment sealing line which on the one hand comes into contact with the motor-pump central rotor to form sealing, and which on the other hand is subjected to a force that tends to press it on said rotor due to the thrust exerted by a pressurized motor-pump oil contained by the cylindrical stator or the axial stator on the spool valve groove segment, said force being limited due to a small sprayed surface subjected to the pressure of said oil offered by said segment, which results from a segment force reacting shoulder included by said segment that cooperates with another shoulder arranged in the cylindrical stator or in the axial stator.

The fixed or variable displacement hydraulic motor-pump according to the present invention comprises a spool valve groove segment that is kept in contact with the motor-pump central rotor by a segment groove bottom spring.

The fixed or variable displacement hydraulic motor-pump according to the present invention comprises a spool valve groove segment that is made up of two half-segments that each have at least one segment flank kept in contact with the cylindrical stator or with the axial stator by a segment separating spring.

The fixed or variable displacement hydraulic motor-pump according to the present invention comprises an inner input/output duct that is secured in the input/output spool valve and/or in the motor-pump frame by one or the other of the ends of said duct using at least one fixed duct covering ball joint and/or at least one sliding duct covering ball joint, said ball joint having a covering ball joint step that may rest on a covering ball joint seat.

The fixed or variable displacement hydraulic motor-pump according to the present invention comprises a fixed duct covering ball joint that is kept in contact with its covering ball joint seat by a covering ball joint spring that bears on the one hand on the input/output spool valve or on the motor-pump frame or on a sliding duct covering ball joint, and on the other hand directly or indirectly on said fixed covering ball joint.

The fixed or variable displacement hydraulic motor-pump according to the present invention comprises a sliding duct covering ball joint that is made up of at least one sliding covering half-ball joint axially passed through by the inner input/output duct, said half-ball joint being able to translate axially and sealably relative to said inner duct, whereas said half-ball joint is kept in contact with its covering ball joint seat by a covering ball joint spring that bears on the one hand on the input/output spool valve or on the motor-pump frame or on another sliding covering half-ball joint, and on the other hand directly or indirectly on said sliding covering half-ball joint.

The fixed or variable displacement hydraulic motor-pump according to the present invention comprises an outer input/output duct that is secured in the input/output spool valve and/or in the motor-pump frame by one or the other of the ends of said duct using at least one fixed duct covering ball joint, said ball joint having a covering ball joint step that can rest on a covering ball joint seat.

The fixed or variable displacement hydraulic motor-pump according to the present invention comprises an inner duct chamber that is closed by an inner duct plug.

The fixed or variable displacement hydraulic motor-pump according to the present invention comprises an outer duct chamber that is closed by an outer duct plug that is passed through by said outer input/output duct.

The fixed or variable displacement hydraulic motor-pump according to the present invention comprises an inner input/output duct that is housed completely or partially inside the outer input/output duct.

The fixed or variable displacement hydraulic motor-pump according to the present invention comprises a motor-pump frame that comprises a connecting satellite in which the inner input/output duct and/or the outer input/output duct are secured.

The fixed or variable displacement hydraulic motor-pump according to the present invention comprises a peripheral rotor stator that is articulated on the angular synchronizing pinion axle, around which it can rotate under the action of a displacement varying servomotor.

The fixed or variable displacement hydraulic motor-pump according to the present invention comprises a displacement varying servomotor that is a rotary electric servomotor motor that can rotate—in one direction or the other and by means of a servomotor reducing gear—a displacement-varying ring driving pinion, said pinion being able to rotate in a bearing arranged in the motor-pump frame and being able to rotate a displacement-varying ring secured to the peripheral rotor stator, the pitch circle of said ring being centered on the angular synchronizing pinion axle.

The fixed or variable displacement hydraulic motor-pump according to the present invention comprises rephasing means that are inserted between the peripheral rotor angular synchro ring and the central rotor angular synchro ring.

The fixed or variable displacement hydraulic motor-pump according to the present invention comprises rephasing means that are made up of at least one intermediate rephasing gear pair including at least one rephasing toothed wheel rotating around at least one rephasing axle secured to the peripheral rotor stator, said gear pair being inserted between the peripheral rotor angular synchro ring and the angular synchronizing pinion.

The fixed or variable displacement hydraulic motor-pump according to the present invention comprises an inner input/output duct and an outer input/output duct that are connected to the input or the output, respectively, of at least one second fixed or variable displacement hydraulic motor-pump, the fixed or variable displacement hydraulic motor-pump and the second fixed or variable displacement hydraulic motor-pump together making up a hydraulic transmission device.

The fixed or variable displacement hydraulic motor-pump according to the present invention comprises a central rotor power take-off of the fixed or variable displacement motor-pump that is mechanically connected to at least one drive motor included by a motor vehicle, whereas the second fixed or variable displacement hydraulic motor-pump is mechanically connected to at least one driving wheel or track included by said vehicle, or vice versa.

The fixed or variable displacement hydraulic motor-pump according to the present invention comprises an inner input/output duct that can be connected with at least one high-pressure accumulator by at least one inner duct high-pressure accumulator valve.

The fixed or variable displacement hydraulic motor-pump according to the present invention comprises an outer input/output duct that can be connected with at least one high-pressure accumulator by at least one outer duct high-pressure accumulator valve.

The fixed or variable displacement hydraulic motor-pump according to the present invention comprises an inner input/output duct that can be connected with at least one low-pressure accumulator by at least one inner duct low-pressure accumulator valve.

The fixed or variable displacement hydraulic motor-pump according to the present invention comprises an outer input/output duct that can be connected with at least one low-pressure accumulator by at least one outer duct low-pressure accumulator valve.

The fixed or variable displacement hydraulic motor-pump according to the present invention comprises a high-pressure accumulator and/or a low-pressure accumulator that comprises at least one accumulator separator piston able to move sealably in a blind accumulator cylinder, said piston delimiting, with said cylinder, a gas compartment containing a pressurized gas and oil compartment containing a motor-pump oil, the latter compartment being able to be connected with the inner input/output duct and/or the outer input/output duct.

The fixed or variable displacement hydraulic motor-pump according to the present invention comprises an oil compartment that includes an accumulator-closing gate that the accumulator separator piston can press on an accumulator gate seat by pushing on a high-stiffness resisting spring inserted between said piston and said gate, so as to sealably isolate said compartment from the inner input/output duct and/or the outer input/output duct, said gate cooperating—unlike the high-stiffness resisting spring—with a low-stiffness resisting spring that tends to separate said gate from said seat.

The fixed or variable displacement hydraulic motor-pump according to the present invention comprises an accumulator separator piston that can push on the high-stiffness resisting spring by means of a high-stiffness spring plunger that is guided in longitudinal translation by a gate and plunger guide secured to the high-pressure accumulator and/or the low-pressure accumulator, said gate guide also guiding the accumulator closing gate and including a plunger stop that determines the maximum travel of the high-stiffness spring plunger toward the accumulator separator piston.

The fixed or variable displacement hydraulic motor-pump according to the present invention comprises a gate and plunger guide that includes at least one radial gate guide orifice that connects the oil compartment with the accumulator gate seat so as to allow the motor-pump oil to circulate between the inner input/output duct and/or the outer input/output duct and said oil compartment.

The fixed or variable displacement hydraulic motor-pump according to the present invention comprises a high-pressure accumulator and/or a low-pressure accumulator that is connected to the inner input/output duct and/or the outer input/output duct by means of an accumulator locking valve that can sealably isolate said accumulator from said inner duct and/or said outer duct.

The fixed or variable displacement hydraulic motor-pump according to the present invention comprises a low-pressure accumulator that is supplied with a motor-pump oil by at least one low-pressure pump driven by a low-pressure pump motor, the intake duct of said pump being connected to a motor-pump oil reservoir whereas its discharge duct is connected to said accumulator.

The fixed or variable displacement hydraulic motor-pump according to the present invention comprises an inner input/output duct that can be connected, by an inner duct exchanger-dissipater valve, with at least one exchanger-dissipater inner duct included by a pressure loss exchanger-dissipater, said duct comprising at least one outer dissipater heat exchange surface that is in contact with a coolant gas or a coolant liquid.

The fixed or variable displacement hydraulic motor-pump according to the present invention comprises an outer input/output duct that can be connected, by an outer duct exchanger-dissipater valve, with at least one inner exchanger-dissipater duct included by a pressure loss exchanger-dissipater, said duct comprising at least one outer dissipater heat exchange surface that is in contact with a coolant gas or a coolant liquid.

The fixed or variable displacement hydraulic motor-pump according to the present invention comprises an inner input/output duct that can be connected with a secondary hydraulic motor by an inner duct secondary motor valve.

The fixed or variable displacement hydraulic motor-pump according to the present invention comprises an outer input/output duct that can be connected with a secondary hydraulic motor by an outer duct secondary motor valve.

The fixed or variable displacement hydraulic motor-pump according to the present invention comprises a secondary hydraulic motor that is made up of at least one hydraulic turbine mounted on a hydraulic turbine shaft that includes at least one hydraulic turbine blade on which at least one hydraulic turbine injector can axially and/or radially spray a jet of a motor-pump oil.

The fixed or variable displacement hydraulic motor-pump according to the present invention comprises a motor-pump management computer that controls the displacement-varying servomotor to control the displacement of the fixed or variable displacement hydraulic motor-pump, including that making up the hydraulic transmission device, irrespective of whether the latter is integrated into the motor vehicle, said computer also being able to command the inner duct high-pressure accumulator valve and/or the outer duct high-pressure accumulator valve and/or the inner duct low-pressure accumulator valve and/or the outer duct low-pressure accumulator valve and/or the accumulator locking valve and/or the low-pressure pump motor and/or the inner duct exchanger-dissipater valve and/or the outer duct exchanger-dissipater valve and/or the inner duct secondary motor valve and/or the outer duct secondary motor valve.

The fixed or variable displacement hydraulic motor-pump according to the present invention comprises a motor-pump management computer that is connected, by wired, lighted or electromagnetic information transmission means, to at least one shifting lever and/or at least one shifting vane and/or at least one shifting button and/or at least one clutch pedal and/or at least one brake pedal and/or at least one accelerator pedal included by a driving station comprised by the motor vehicle.

The fixed or variable displacement hydraulic motor-pump according to the present invention comprises a motor-pump management computer that is connected, by wired, lighted or electromagnetic information transmission means, to at least one transmission configuration button or knob and/or a transmission configuration screen and/or a transmission configuration microphone and/or a transmission configuration speaker included by a driving station comprised by said motor vehicle.

BRIEF DESCRIPTION OF THE DRAWINGS

The description that follows in light of the appended drawings provided as non-limiting examples make it possible to better understand the invention, the features thereof, and the advantages it may procure.

DETAILED DESCRIPTION OF THE INVENTION

FIGS. 1 to 33 show the fixed or variable displacement hydraulic motor-pump 1, various details of its components, its alternatives and its accessories.

Figure 7:
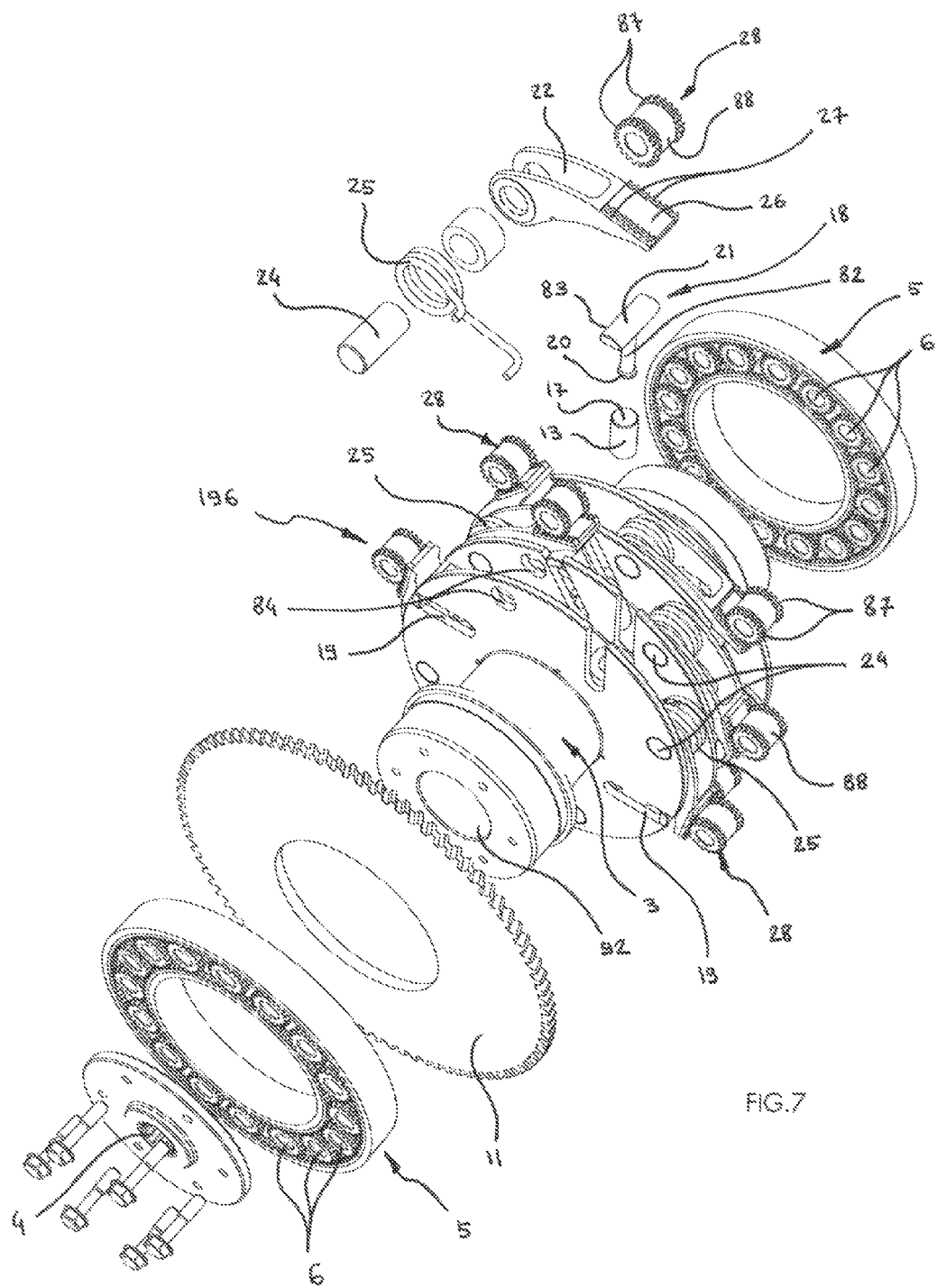
FIG. 7 is an exploded view of the motor-pump central rotor of the fixed or variable displacement hydraulic motor-pump according to the invention, and the main components with which it cooperates.

The hydraulic motor-pump 1 according to the invention comprises at least one motor-pump central rotor 3, the details of which are shown in FIG. 7, which includes a central rotor power takeoff 4 and which is housed on or in a motor-pump frame 2, said rotor 3 being able to rotate in at least one central rotor bearing 5 comprised by said frame 2 while remaining in the most sealed possible contact with at least one input/output spool valve 43 kept approximately stationary relative to said frame 2, said spool valve 43 being able to connect at least one hydraulic cylinder 14 arranged radially or tangentially in said rotor 3 with at least one inner input/output duct 57 and at least one outer input/output duct 58 via a central rotor input/output inner channel 15 and a central rotor input/output orifice 16 formed in the motor-pump central rotor 3, respectively, one of the ends of said ducts 57, 58 being directly or indirectly and sealably secured in the motor-pump frame 2, while the other end of said ducts 57, 58 is sealably secured in the input/output spool valve 43.

According to the hydraulic motor-pump 1 according to the invention, the central rotor bearing 5 maybe made up of a hydrodynamic or hydrostatic bearing, a ball or rolling bearing, of any type, a gas or magnetic bearing or any other bearing known by those skilled in the art. It will be noted that the motor-pump frame 2 can serve as a motor-pump casing or cooperate with a motor-pump casing attached on or around said frame 2 that protects the main components of the hydraulic motor-pump 1 from the outside environment, while protecting said environment from sprays in particular of the motor-pump oil 14 contained in said motor-pump 1. Furthermore, said motor-pump casing may completely or partially form a motor-pump oil reservoir 121 in which at least part of a motor-pump oil 114 is stored that the hydraulic motor-pump 1 needs to operate, while the various mechanical members of said motor-pump 1 may in particular be lubricated by splashing in said oil 114.

It will be noted that, according to one particular embodiment of the hydraulic motor-pump 1 according to the invention, the inner input/output duct 57 and/or the outer input/output duct 58 may include a check valve only allowing the motor-pump oil 114 circulating in said ducts 57, 58 to travel in one direction, whereas the latter may—in addition to or in place of said check valve—comprise a closing valve. Furthermore, the inner input/output duct 57 and/or the outer input/output duct 58 may include a pulsation dampener for example formed by a low-capacity hydraulic accumulator. The central rotor power takeoff 4 may be integral with the motor-pump central rotor 3 or be fastened on the latter, and maybe made up of a tripod or multi pod, with a male or female splined pin, a Cardan joint, a homo kinetic joint, a metal or non-metal flange, and in general, any coupling device making it possible to transmit a rotational movement from one part to another.

Furthermore, as shown in FIGS. 4 to 7, the hydraulic motor-pump 1 according to the invention comprises at least one hydraulic piston 13 capable of translating in the hydraulic cylinder 14 and able to push a guided hydraulic piston plunger 18 or able to be pushed by the latter, the translation of said plunger 18 being guided by a plunger guide 19 formed radially or tangentially in the motor-pump central rotor 3, said hydraulic piston 13 causing—during its back-and-forth movement—a motor-pump oil 114 to circulate between the inner input/output duct 57 and the outer input/output duct 58, and in particular being able to include, on its periphery, one or more sealing segment(s) of any type known by those skilled in the art, and/or patterns causing a pressure drop.

The hydraulic motor-pump 1 according to the invention also includes at least one tangential arm 22 particularly shown in FIGS. 4 to 7, one end of which is articulated in the motor-pump central rotor 3 while the other end includes a tangential arm bearing face on plunger 23 that may exert a force on a plunger on tangential arm path of contact 21 included by the guided hydraulic piston plunger 18, the direction of said force being approximately tangential to the axis of rotation of said arm 22, the profile of the tangential arm bearing face on plunger 23 and that of the plunger on tangential arm path of contact 21 being calculated so that on the one hand, the Hertz pressure to which those two surfaces in contact 23, 21 are subjected is as low as possible, and on the other hand so that the relative movement of said face 23 relative to said path 21 is as small as possible so as to reduce the friction losses generated at the contact between said face 23 and said path 21.

Figure 8:
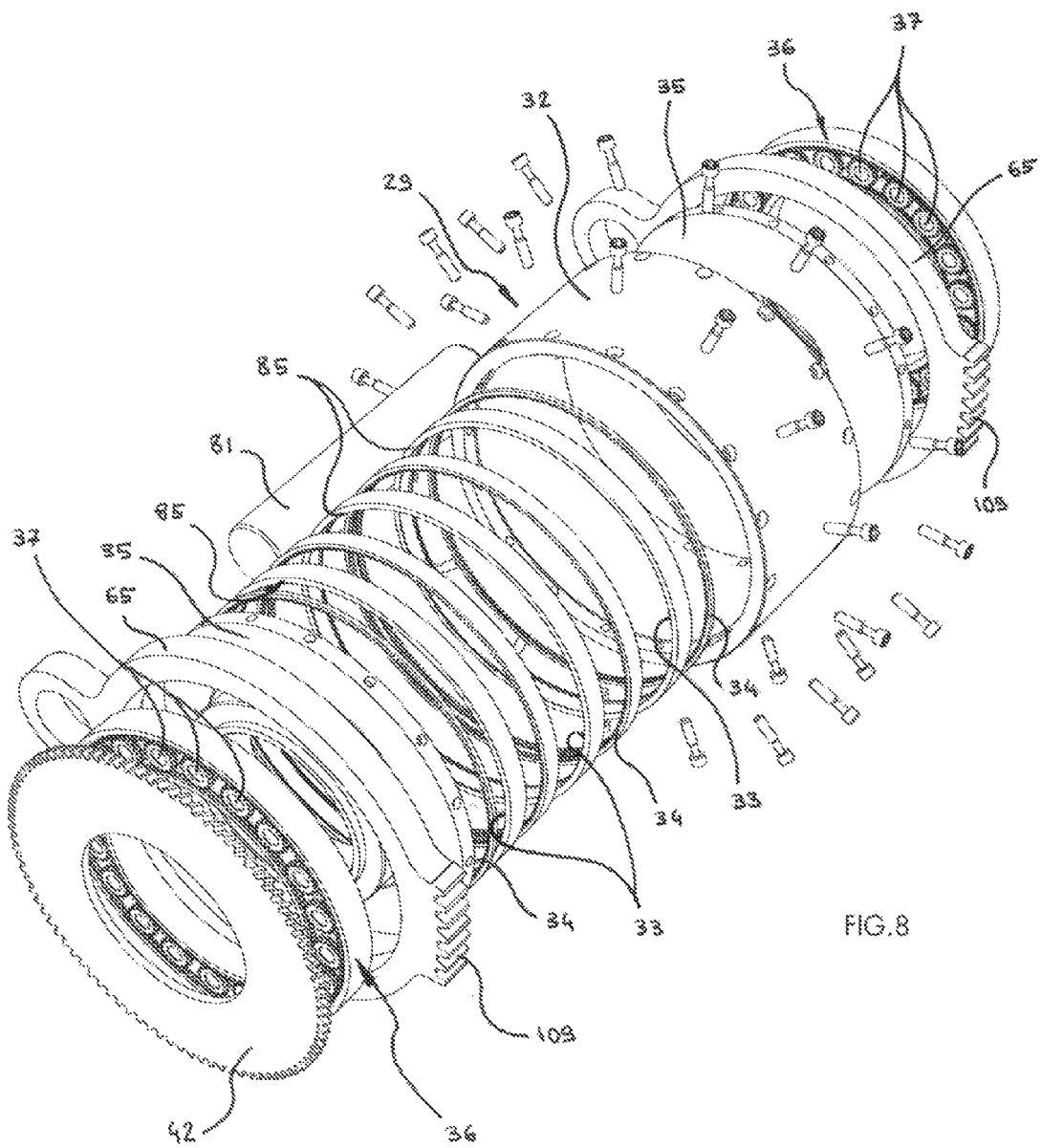
FIG. 8 is an exploded view of the motor-pump peripheral rotor of the fixed or variable displacement hydraulic motor-pump according to the invention, and the main components with which it cooperates.

The hydraulic motor-pump 1 according to the invention also comprises at least one motor-pump peripheral rotor 29 as shown in FIG. 8, made up of at least one peripheral rotor cylindrical casing 32 whereof at least one end ends with a peripheral rotor flange 35, said peripheral rotor 29 rotating in at least one peripheral rotor bearing 36 borne by a peripheral rotor stator 65 that is directly or indirectly secured to the motor-pump frame 2, the motor-pump central rotor 3 being completely or partially housed inside said peripheral rotor 29.

According to one particular embodiment of the hydraulic motor-pump 1 according to the invention, the peripheral rotor flange 35 may either be made from the same material billet as the peripheral rotor cylindrical casing 32, or maybe fastened to the latter by screwing, welding, crimping, or any other mechanical fastening method known by those skilled in the art.

The hydraulic motor-pump 1 according to the invention also comprises antifriction means 196 included by the tangential arm 22 on the face thereof situated opposite the tangential arm bearing face on plunger 23, said means 196 bearing on the inner surface of the peripheral rotor cylindrical casing 32.

It will be noted in FIGS. 3, 4, 7, 8 and 22 that the hydraulic motor-pump 1 according to the invention comprises a motor-pump peripheral rotor 29 that may be forced to rotate at the same speed as the motor-pump central rotor 3 by an peripheral rotor angular synchro ring 42 secured in rotation to a central rotor angular synchro ring 11 included by the motor-pump central rotor 3, by at least one angular synchronizing pinion 12 rotating around at least one angular synchronizing pinion axle 81 comprised by the motor-pump frame 2.

According to one particular embodiment of the hydraulic motor-pump 1 according to the invention, the gear device formed by the peripheral rotor angular synchro ring 42, the central rotor angular synchro ring 11 and the angular synchronizing pinion 12 may be replaced by at least one chain, belt, shaft, or any other transmission means known by those skilled in the art.

As shown in FIGS. 3 to 7, [in] the hydraulic motor-pump 1 according to the invention, the anti-friction means 196 are made up of at least one tangential arm antifriction roller 28 that can roll on the one hand on a tangential arm rolling track 26 included by the tangential arm 22 on the face thereof situated opposite the tangential arm bearing face on plunger 23, and on the other hand on a peripheral rotor rolling track 33 included by the inner surface of the peripheral rotor cylindrical casing 32, the movement of said roller 28 simultaneously being limited relative to the tangential arm rolling track 26 and the peripheral rotor rolling track 33 by at least one tangential arm roller rack 27 included by the tangential arm rolling track 26 and by at least one peripheral rotor roller ring 34 included by the peripheral rotor rolling track 33, said rack 27 and said ring 34 simultaneously cooperating with at least one roller pinion 87 included by said roller 28.

According to one particular embodiment of the hydraulic motor-pump 1 according to the invention, the tangential arm roller rack 27 and the peripheral rotor roller ring 34 can be separated from the rolling tracks 26, 33 with which they cooperate so as to allow the manufacture and/or assembly thereof independently, while the peripheral rotor roller ring may for example be discontinuous such that only the angular sectors of said ring 34 that actually cooperate with the tangential arm antifriction roller 28 are provided with teeth.

It will further be noted that the tangential arm rolling track 26 may include at least one hollow or protruding guide rail that cooperates with at least one hollow or protruding guide groove 86 included by the tangential arm anti-friction roller 28, said rail and said groove 86 guaranteeing the axial maintenance in position of said antifriction roller 28 relative to the hydraulic motor-pump 1 according to the invention.

It will also be noted that preferably, the rolling diameter of the tangential arm antifriction roller 28 is substantially equal to that of the pitch circle of the roller pinion 87, the inside diameter of the peripheral rotor rolling track 33 is substantially equal to that of the pitch circle of the peripheral rotor roller ring 34, while the pitch line of the tangential arm roller rack 27 coincides with the functional surface of the tangential arm rolling track 26.

According to one particular embodiment of the hydraulic motor-pump 1 according to the invention, the roller pinion 87 may either be made in the same material billet as the tangential arm antifriction roller 28 itself, or attached on the latter by bracing, crimping, welding, or any other means known by those skilled in the art making it possible to fasten said pinion 87 on said roller 28. It will be noted that this embodiment of the tangential arm antifriction roller 28 may also apply to a central rotor bearing roller 6 and/or a peripheral rotor bearing roller 37 that may also be included by the hydraulic motor-pump 1.

Figure 22:
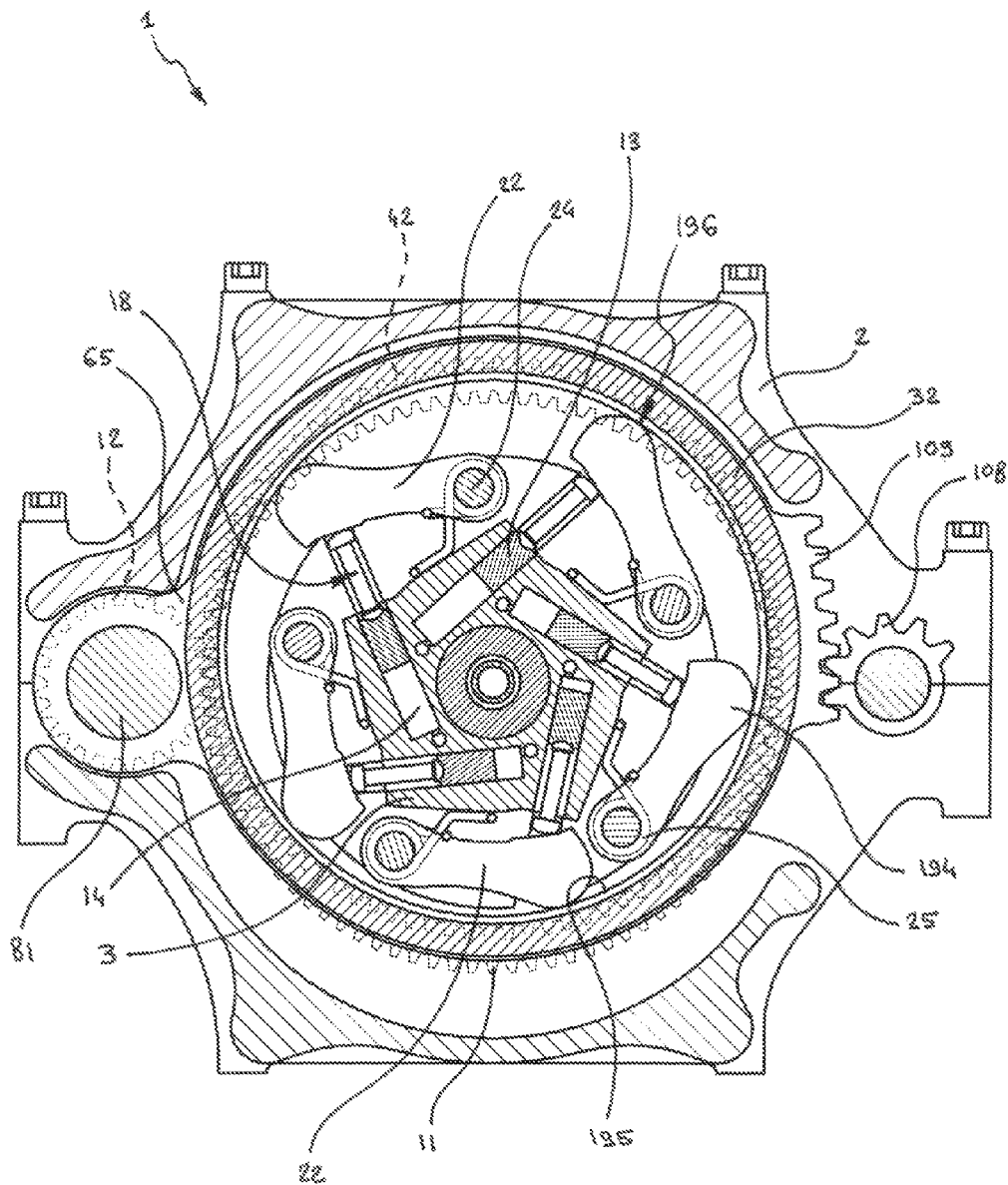
FIG. 22 is a diagrammatic cross-section of the fixed or variable displacement hydraulic motor-pump according to the invention whereof the tangential arms are provided with a tangential arm friction pad that cooperates with a peripheral rotor friction track.

FIG. 22 illustrates an alternative of the fixed or variable displacement hydraulic motor-pump 1 whereof the antifriction means 196 are formed by tangential arm friction pads 194.

According to this particular alternative of the hydraulic motor-pump 1 according to the invention, said motor-pump 1 comprises at least one tangential arm friction pad 194 included by the tangential arm 22 on the face thereof situated opposite the tangential arm bearing face on plunger 23 that may come into contact with a peripheral rotor friction track 195 included by the inner surface of the peripheral rotor cylindrical casing 32.

According to one particular embodiment of the hydraulic motor-pump 1 according to the invention, the tangential arm friction pad 194 and/or the peripheral rotor friction pad 194 may be nitrided, cemented and/or coated with DLC (Diamond-Like Carbon) or any other hard coating and/or coating with a low friction coefficient. It will also be noted that the tangential arm friction pad 194 may be an independent piece attached on the tangential arm 22 by screwing, welding, crimping, or any other mechanical fastening method known by those skilled in the art.

As illustrated in FIG. 7, the fixed or variable displacement hydraulic motor-pump 1 according to the invention may provide a hydraulic piston 13 that comprises a plunger ball joint on hydraulic piston 17 on its circular face that is furthest from the motor-pump central rotor 3, said ball joint 17 being made up of a hollow or raised truncated sphere shape that cooperates with a hydraulic piston ball joint on plunger 20 comprised by the hydraulic piston guided plunger 18, said ball joint 20 also being made up of a hollow or raised truncated sphere shape, while the two truncated sphere shapes are complementary and constitute a rolling connection between said piston 13 and said plunger 18.

Furthermore, the hydraulic piston guided plunger 18 may comprise a brace 82 that is clearly shown in FIG. 7 and that is placed in the extension of the hydraulic piston 13, and a strut 83 mounted secured to said brace 82 and perpendicular to the latter, said strut 83 bearing the plunger path of contact on tangential arm 21 while each of its two ends can slide in the plunger guide 19. It will be noted that according to one particular embodiment of the hydraulic motor-pump 1 according to the invention, the strut 83 may be pre-stressed so that when the tangential arm bearing face on plunger 23 exerts its maximum force on the plunger path of contact on tangential arm 21, the contact pressure between said face 23 and said path 21 is distributed as uniformly as possible. It will further be noted that said face 23 and/or said path 21 may be nitrided, cemented and/or coated with DLC (Diamond-Like Carbon), or any other hard coating and/or coating with a low friction coefficient.

FIG. 7 shows that the motor-pump central rotor 3 includes a cylindrical axle housing 84 in which a tangential arm axle 24 is housed, while the tangential arm 22 is crossed through by said axle 24 so as to be articulated in the motor-pump central rotor 3. It will further be noted that the cylindrical axle housing 84 may either be formed directly in the material of the motor-pump central rotor 3, or formed in a piece fastened on said rotor 3 by screwing, welding, or any other fastening means known by those skilled in the art.

Consequently, the motor-pump central rotor 3 may include a tangential arm return spring 25 that bears on the one hand on said rotor 3, and on the other hand on the tangential arm 22, said spring 25 tending—by the force that it produces—to separate said arm 22 from said rotor 3 and being able to work by compression, traction or torsion and to be of the helical, blade, or any other type known by those skilled in the art (FIG. 7).

As shown in FIG. 8, the peripheral rotor rolling track 33 may include at least one hollow or protruding guide rail 85 that cooperates with at least one hollow or protruding guide groove 86 included by the tangential arm antifriction roller 28, said rail 85 and said groove 86 guaranteeing the axial maintenance in position of said antifriction roller 28 relative to the hydraulic motor-pump 1 according to the invention.

According to one particular embodiment of the fixed or variable displacement hydraulic motor-pump 1 illustrated in FIGS. 1 to 4 and FIG. 7, the central rotor bearing 5 may comprise a central rotor bearing inner track 7 provided with at least one central rotor bearing inner ring 9, said track 7 being secured to the motor-pump central rotor 3, on the one hand, and an outer central rotor bearing track 8 provided with at least one central rotor bearing outer ring 10, said track 8 being secured to the motor-pump frame 2, on the other hand, while at least three central rotor bearing rollers 6 can roll at simultaneously on the central rotor bearing inner track 7 and the central rotor bearing outer track 8 and remain at a constant distance from one another owing to at least one roller pinion 87 included by each central rotor bearing roller 6 and that cooperates with said inner 9 and outer 10 rings.

According to one particular embodiment of the hydraulic motor-pump 1 according to the invention, the central rotor bearing inner ring 9 and the central rotor bearing outer ring 10 can be separated from the inner 7 and outer 8 central rotor bearing tracks with which they cooperate so as to allow them to be manufactured and/or assembled independently. It will be noted that preferably, the rolling diameter of the central rotor bearing rollers 6 is substantially equal to that of the pitch circle of the roller pinion 87 included by each said central rotor bearing roller 6, the outer diameter of the central rotor bearing inner track 7 is substantially equal to that of the pitch circle of the central rotor bearing inner ring 9, while the inner diameter of the central rotor bearing outer track 8 is substantially equal to that of the pitch circle of the central rotor bearing outer ring 10.

Furthermore, the central rotor bearing inner track 7 and/or the central rotor bearing outer track 8 may include at least one hollow or protruding guide rail 85 that cooperates with at least one hollow or protruding guide groove 86 included by the central rotor bearing rollers 6, said rail 85 and said groove 86 having complementary shapes and guaranteeing the axial maintenance in position of said bearing rollers 6 relative to the hydraulic motor-pump 1 according to the invention, whereas, according to one particular embodiment of said motor-pump 1, the guide rail 85 and/or the guide groove 86 may be separated from the inner 7 and outer 8 central rotor bearing tracks with which they cooperate so as to allow them to be manufactured and/or assembled independently.

Figure 9:
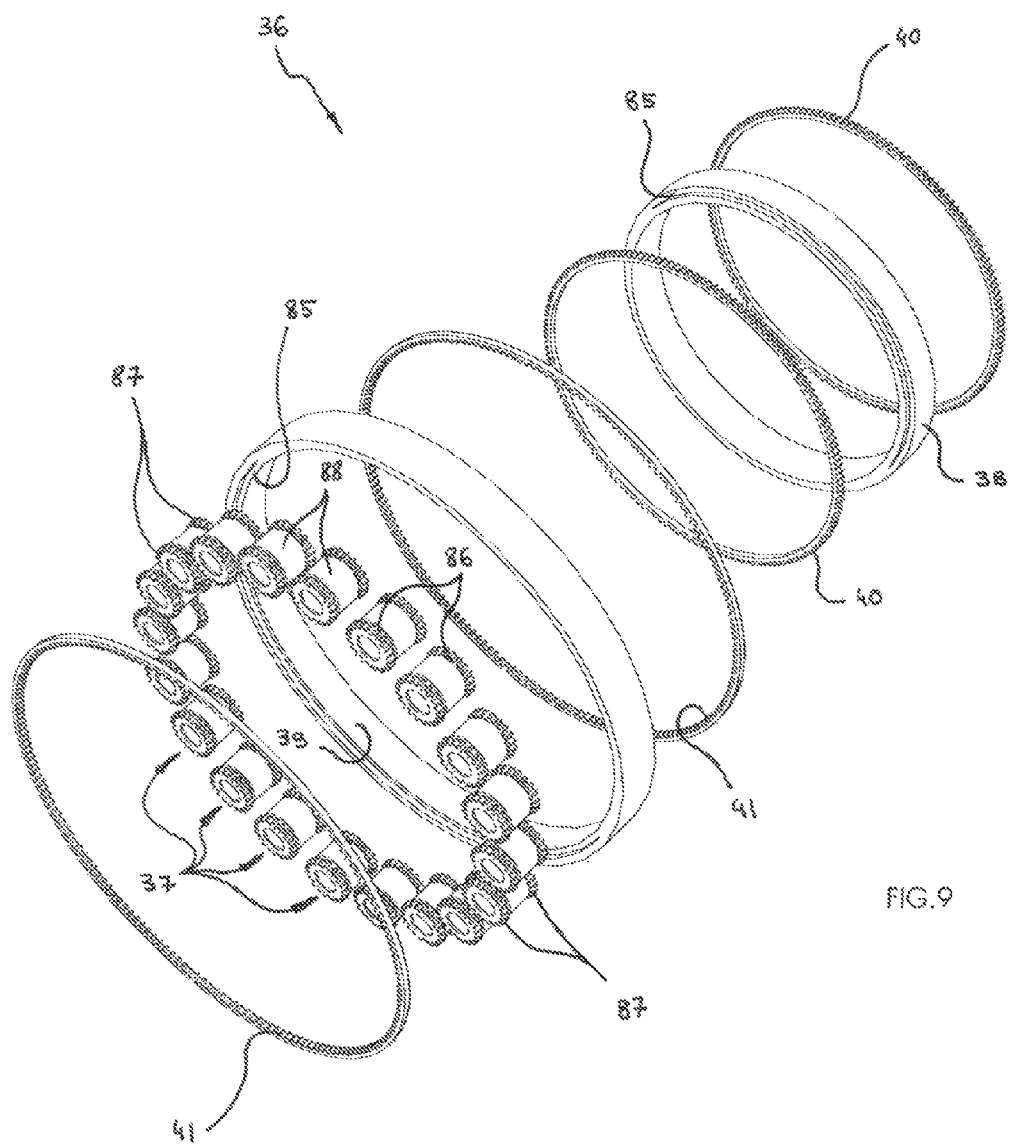
FIG. 9 is an exploded view of the bearing of the motor-pump peripheral rotor of the fixed or variable displacement hydraulic motor-pump according to the invention.

As illustrated in FIG. 9, the peripheral rotor bearing 36 may on the one hand comprise a peripheral rotor bearing inner track 38 provided with at least one peripheral rotor bearing inner ring 40, said track 38 being secured to the motor-pump peripheral rotor 29, and on the other hand, a peripheral rotor bearing outer track 39, provided with at least one peripheral rotor bearing outer ring 41, said track 39 being secured to the peripheral rotor stator 65, while at least three peripheral rotor bearing rollers 37 can roll simultaneously on said peripheral rotor bearing inner track 38 and on the peripheral rotor bearing outer track 39 and remain at a constant distance from one another owing to at least one roller pinion 87 included by each peripheral rotor bearing roller 37 and which cooperates with said inner 40 and outer 41 rings.

According to one particular embodiment of the hydraulic motor-pump 1 according to the invention illustrated in FIG. 9, the peripheral rotor bearing inner ring 40 and the peripheral rotor bearing outer ring 41 may be separated from the inner 38 and outer 39 peripheral rotor bearing tracks with which they cooperate so as to allow them to be manufactured and/or assembled independently. It will be noted that preferably, the rolling diameter of the peripheral rotor bearing rollers 37 is substantially equal to that of the pitch circle of the roller pinion 87 included by each said peripheral rotor bearing roller 37, the outer diameter of the peripheral rotor bearing inner track 38 is substantially equal to that of the pitch circle of the peripheral rotor bearing inner ring 40, while the inner diameter of the peripheral rotor bearing outer track 39 is substantially equal to that of the pitch circle of the peripheral rotor bearing outer ring 41.

It will be noted that the peripheral rotor bearing inner track 38 and/or the peripheral rotor bearing outer track 39 may include at least one hollow or protruding guide rail 85 that cooperates with at least one hollow or protruding guide groove 86 included by the peripheral rotor bearing rollers 37, said rail 85 and said groove 86 having a complementary shape and guaranteeing the maintenance in axial position of said bearing rollers 37 relative to the hydraulic motor-pump 1 according to the invention, whereas, according to one particular embodiment of said motor-pump 1, the guide rail 85 and/or the guide groove 86 can be separated from the inner 38 and outer 39 peripheral rotor bearing tracks with which they cooperate so as to allow them to be manufactured and/or assembled independently.

The fixed or variable displacement hydraulic motor-pump 1 according to the invention may comprise an input/output spool valve 43 that is prevented from rotating with the motor-pump central rotor 3 and is kept rotating relative to the motor-pump frame 2 by at least one lug or connecting rod directly or indirectly fastened to the motor-pump frame 2, the fastening of said lug and/or connecting rod to said frame 2 being able to provide several degrees of freedom to accommodate the operation of the hydraulic motor-pump 1 according to the invention, whereas said lug and/or connecting rod may be replaced by any other mechanical means making it possible to stop the rotation of the input/output spool valve 43 along the axis of rotation of the motor-pump central rotor 3.

It will be noted that according to one particular embodiment of the hydraulic motor-pump 1 according to the invention, the connecting rod may be connected to the peripheral rotor stator 65 such that when the latter rotates under the action of a displacement-varying servomotor 68, said connecting rod simultaneously rotates the input/output spool valve 43 relative to the motor-pump frame 2, in the same direction, and with a similar angular amplitude.

Figure 10:
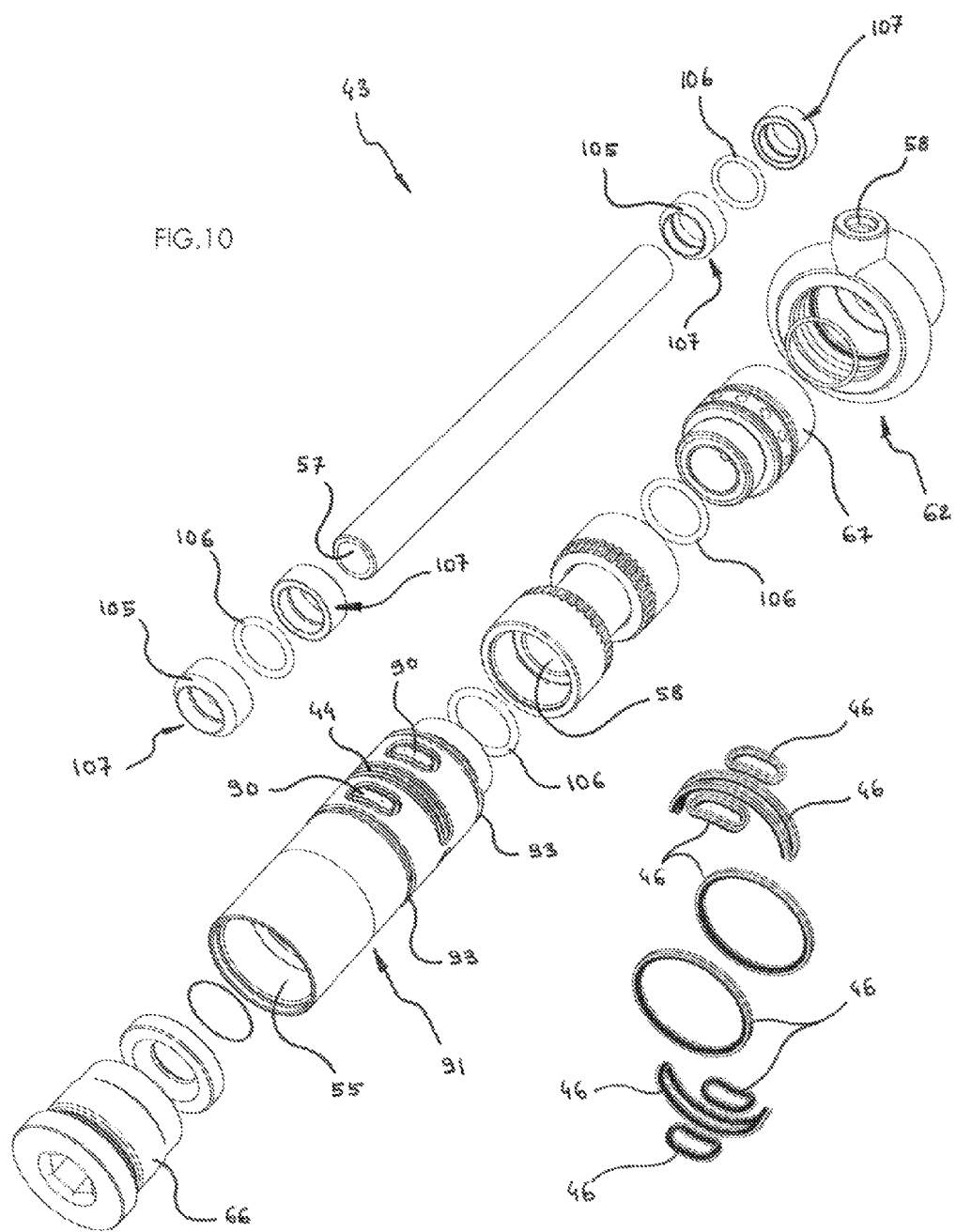
FIG. 10 is an exploded view of the input/output spool valve of the fixed or variable displacement hydraulic motor-pump according to the invention, said spool valve being made up of a cylindrical stator.
Figure 11:
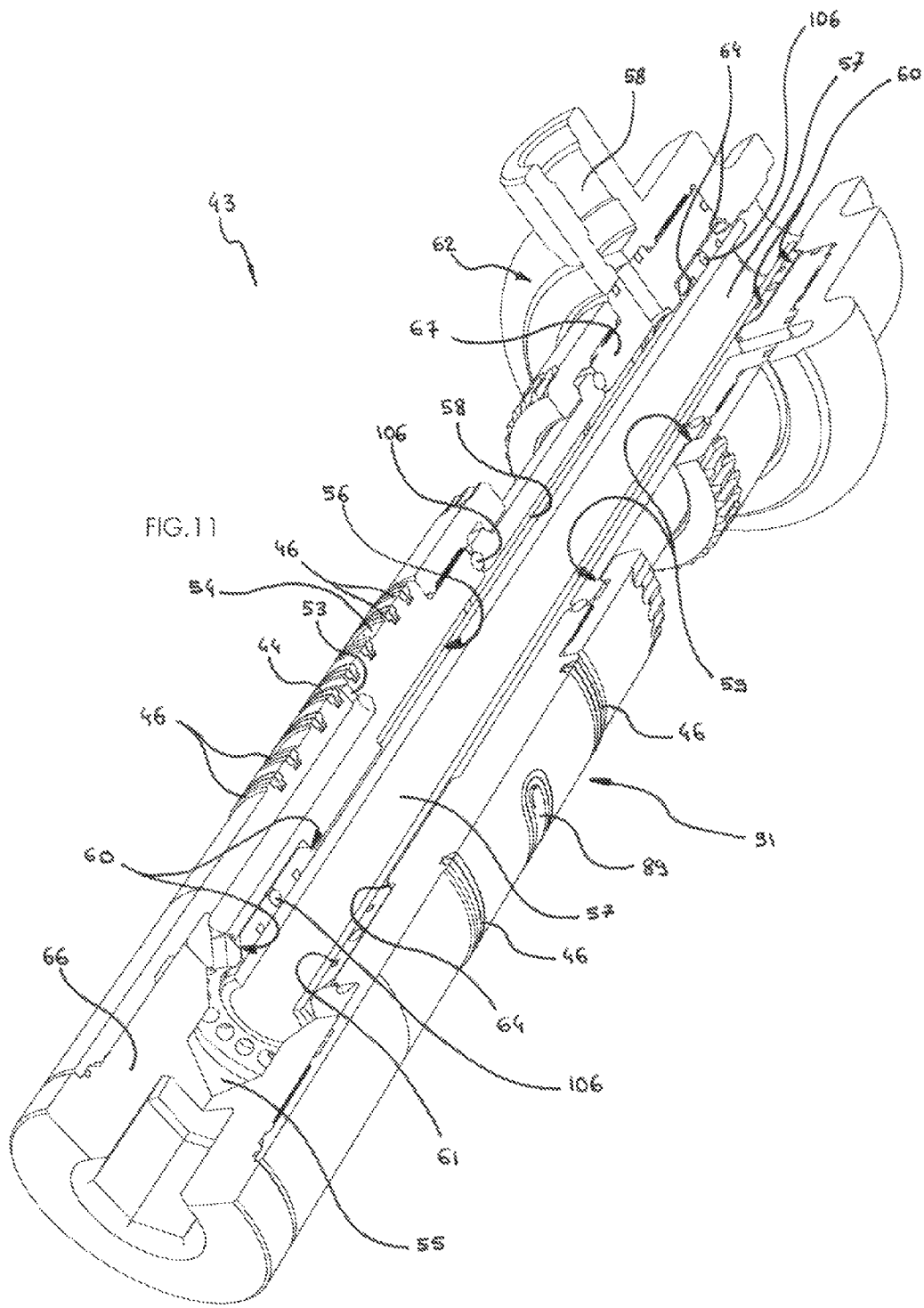
FIG. 11 is a cutaway view of the input/output spool valve of the fixed or variable displacement hydraulic motor-pump according to the invention, said spool valve being made up of a cylindrical stator.

As shown by FIGS. 10 and 11, the input/output spool valve 43 is a cylindrical stator 91 housed with slight play in a stator cylinder 92 formed at the center of the motor-pump central rotor 3 and coaxially thereto, said stator 91 containing an inner duct chamber 55 that communicates on the one hand with the inner input/output duct 57, and on the other hand with an inner duct input/output angular manifold 44 included by said stator 91 on its periphery via a spool valve input/output inner channel 53, while said stator 91 also contains an outer duct chamber 56 that communicates on the one hand with the outer input/output duct 58 and on the other hand with an outer duct input/output angular manifold 89 also included by said stator 91 in its periphery via another inner spool valve input/output channel 53, the angular manifolds 44 and 89 for example being made up of radial grooves that are formed on an angular portion substantially smaller than 125° and which are angularly offset relative to one another by approximately 180°, and across from which the central rotor input/output orifice 16 periodically becomes positioned during the rotation of the motor-pump central rotor 3 so as to allow a motor-pump oil 114 to circulate between said duct chambers 55, 56 and the hydraulic cylinder 14.

It will be noted that the cylindrical stator 91 includes, on the side of the inner duct input/output angular manifold 44, at least one outer duct radial force equalizing groove 90 that communicates with the outer duct chamber 56 via a spool valve equalizing inner channel 54, while said stator 91 also includes at least one inner duct radial force equalizing groove 45 that communicates with the inner duct chamber 55 via another spool valve equalizing inner channel 54, said groove 45 being situated next to the outer duct input/output angular manifold 89 and the surface of the outer duct radial force equalizing groove 90 being calculated so that the radial force produced on the stator 91 by the pressure prevailing in the outer duct input/output angular manifold 89 is substantially equal to the antagonistic radial force produced on the stator 91 by the pressure prevailing in said equalizing groove 90.

This strategy may apply identically regarding the inner duct radial force equalizing groove 45, which may offset the radial force produced on the stator 91 by the inner duct input/output angular manifold 44.

As shown in FIG. 10, the cylindrical stator 91 may include an axial sealing groove 93 near at least one of its axial ends.

Figure 18:
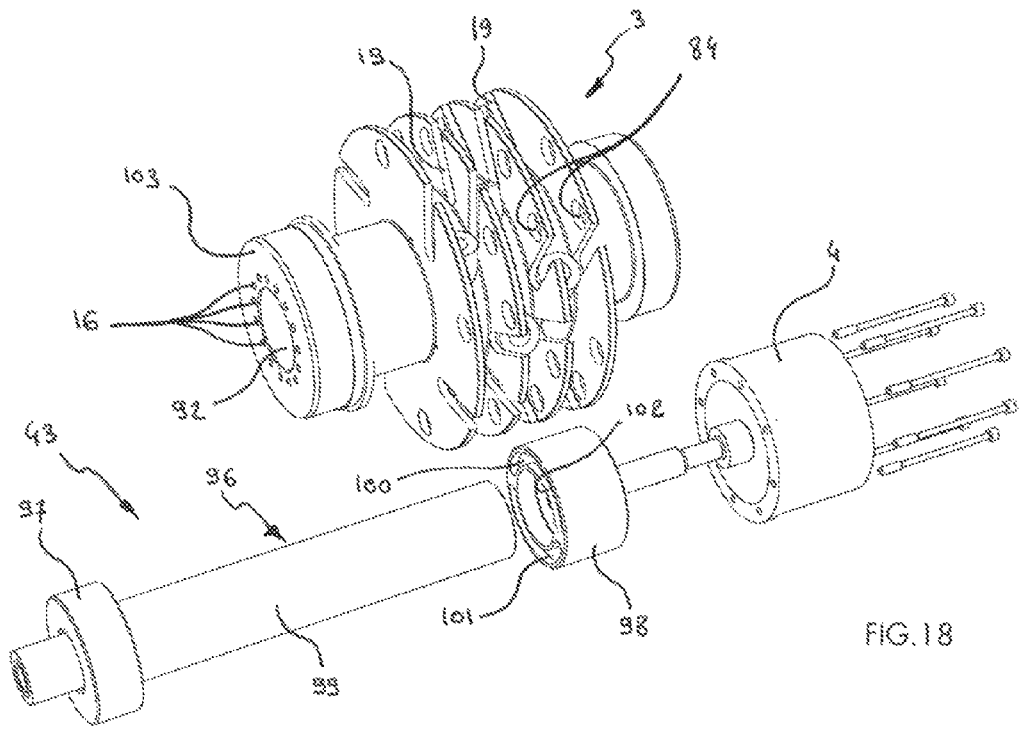
FIGS. 18 and 19 are exploded right lateral and left lateral views, respectively, of the motor-pump central rotor and its central rotor power takeoff of the fixed or variable displacement hydraulic motor-pump according to the invention, and the input/output spool valve of said motor-pump, said spool valve being made up of an axial stator.
Figure 19:
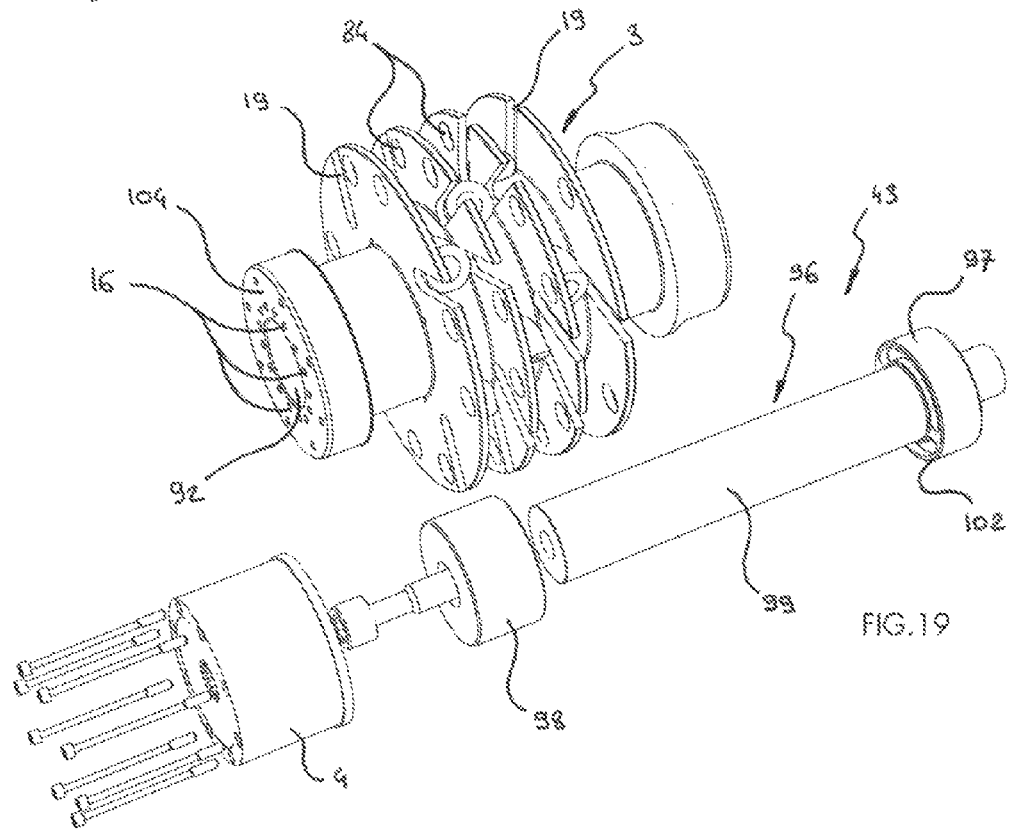

It will be noted that according to one particular embodiment of the fixed or variable displacement hydraulic motor-pump 1 according to the invention illustrated in FIGS. 18 and 19, the input/output spool valve 43 may be an axial stator 96 made up of a distributing flange 97 and an equalizing flange 98 that are placed axially on either side of the motor-pump central rotor 3, across from a distribution face 103 and an equalizing face 104 formed on said rotor 3, respectively, said flanges 97, 98 being mechanically connected to each other by an axial stator central hub 99 that passes axially through said central rotor 3 via a stator cylinder 92 arranged at the center of said central rotor 3 and coaxially thereto, said stator 96 containing an inner duct chamber 55 that communicates on the one hand with the inner input/output duct 57, and on the other hand with an inner duct input/output angular manifold 44 arranged axially on the inner face of the distributing flange 97 via a spool valve input/output inner channel 53, while said stator 96 also contains an outer duct chamber 56 that communicates on the one hand with the outer input/output duct 58, and on the other hand with an outer duct input/output angular manifold 89 also arranged axially on the inner face of the distributing flange 97 via another spool valve input/output inner channel 53, the angular manifolds 44 and 89 for example being made up of axial grooves arranged on said inner face over an angular portion substantially smaller than 180° and angularly offset relative to one another by approximately 180°, and which are found regularly positioned across from the central rotor input/output orifice 16 during the rotation of the motor-pump central rotor 3 so as to allow a motor-pump oil 114 to circulate between the duct chambers 55, 56 and the hydraulic cylinder 14.

FIGS. 18 and 19 show that the inner duct chamber 55 communicates with an inner duct axial force equalizing groove 100 arranged axially on the inner face of the equalizing flange 98 via a spool valve equalizing inner channel 54, while the outer duct chamber 56 communicates with an outer duct axial force equalizing groove 101 also arranged axially on the inner face of the equalizing flange 98 via another spool valve equalizing inner channel 54, the surface of the outer duct axial force equalizing groove 101 being calculated so that the axial force produced on the axial stator 96 by the pressure prevailing in the outer duct input/output angular manifold 89 is substantially equal to the antagonistic axial force produced on said stator 96 by the pressure prevailing in said equalizing groove 101. This strategy may apply identically regarding the inner duct axial force equalizing groove 100, such that the latter produces, on the stator 96, a force of the same intensity as that produced by the inner duct input/output angular manifold 44 on said stator 96.

Furthermore, as shown in FIGS. 18 and 19, the distributing flange 97 and/or the equalizing flange 98 includes a radial sealing groove 102 at least at one of its radial ends.

It will be noted that the axial stator central hub 99 may include an axial sealing groove 93 at least at one of its axial ends or at any point along its length.

As illustrated in FIG. 10, all or part of the inner duct input/output angular manifold 44, the outer duct input/output angular manifold 89, the outer duct radial force equalizing groove 90, the inner duct radial force equalizing groove 45, the axial sealing groove 93, the inner duct axial force equalizing groove 100, the outer duct axial force equalizing groove 101 or the radial sealing groove 102, may be provided with a spool valve groove segment 46 that prevents an excessive quantity of pressurized motor-pump oil 114 from leaking between the cylindrical stator 91 and the stator cylinder 92, or between the distributing flange 97 and the distribution face 103 and/or between the equalizing flange 98 and equalizing face 104, said segment 46 being able to be of any type known by those skilled in the art, irrespective of the material, the geometry or treatment of the surface, which may for example be nitrided, cemented and/or coated with DLC (Diamond-Like Carbon) or any other hard coating and/or coating with a low friction coefficient.

Figure 12:
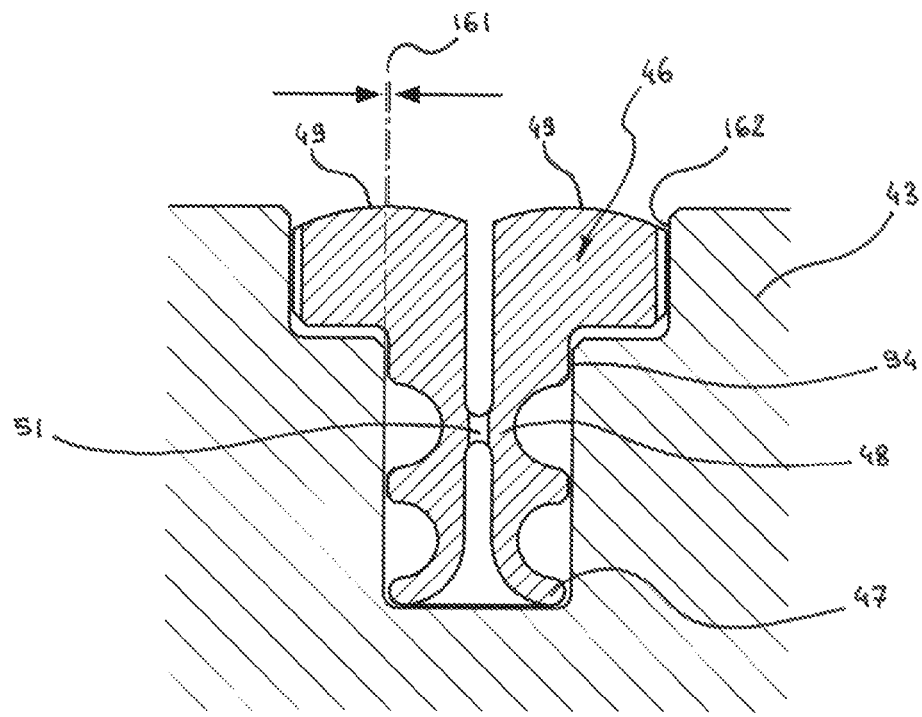
FIGS. 12 and 13 are diagrammatic cross-sectional and three-dimensional views, respectively, of the spool valve groove segment of the fixed or variable displacement hydraulic motor-pump according to the invention.
Figure 13:
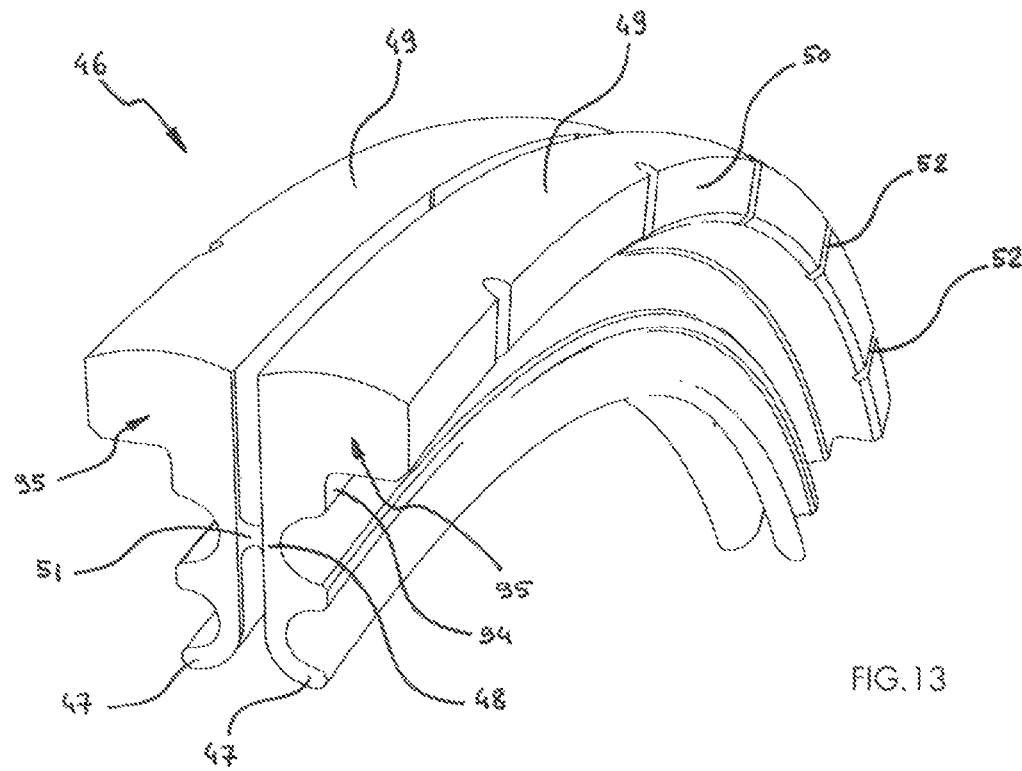
Figure 14:
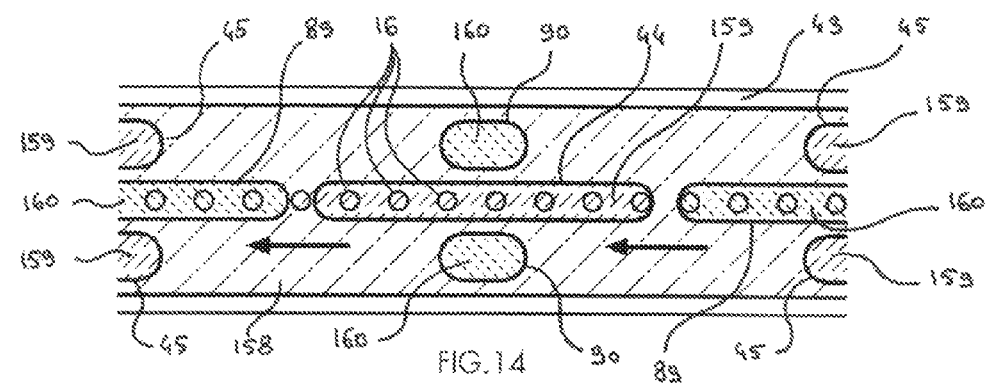
FIGS. 14 to 17 diagrammatically show the developed surface of the cylindrical stator of the fixed or variable displacement hydraulic motor-pump according to the invention, said figures being organized sequentially so as to illustrate the movement and the different positions that result therefrom of the central rotor input/output orifices relative to the inner duct input/output angular manifold and the outer duct input/output angular manifold included by said surface.
Figure 15:
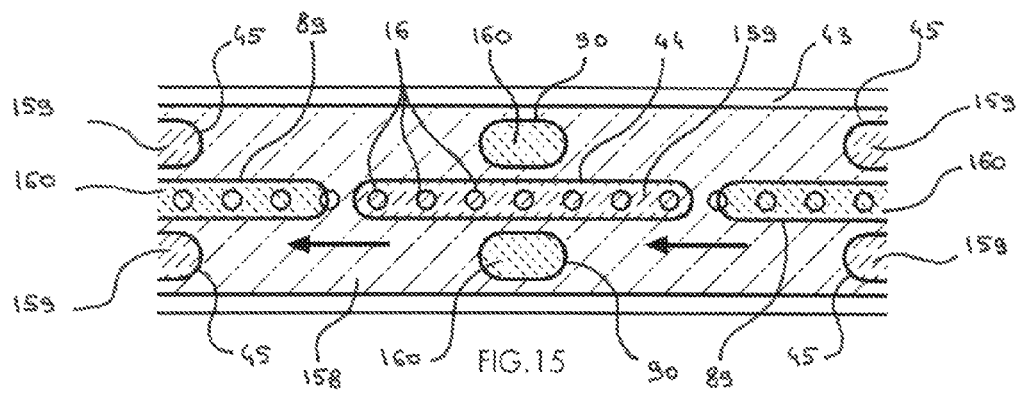
Figure 16:
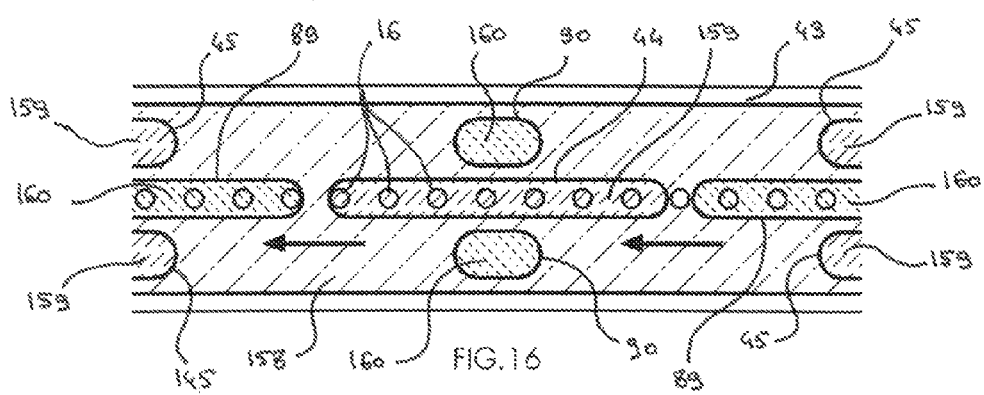
Figure 17:
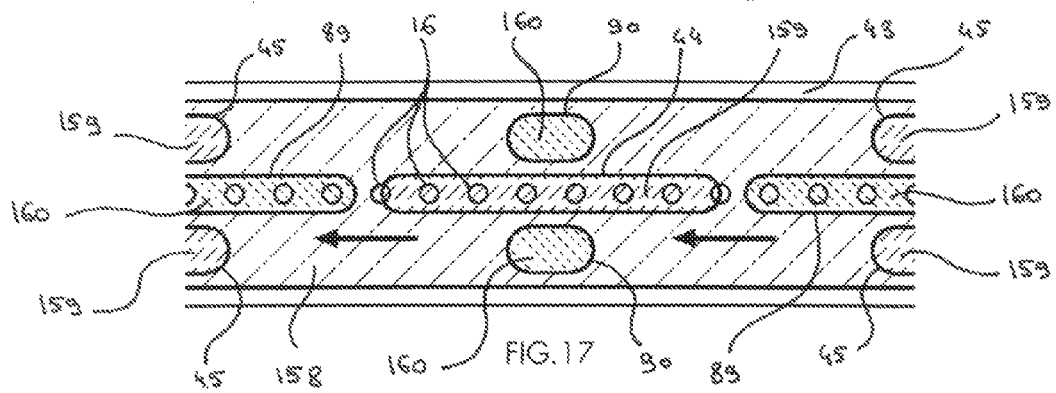

As shown in FIGS. 12 and 13, the fixed or variable displacement hydraulic motor-pump 1 provides that the spool valve groove segment 46 may have at least one segment flank 94 that laterally establishes sealing with the cylindrical stator 91 or the axial stator 96, and at least one segment sealing line 49 which on the one hand comes into contact with the motor-pump central rotor 3 to form sealing, and on the other hand is subject to a force that tends to press it on said rotor 3 due to the thrust exerted by a pressurized motor-pump oil 114 contained by the cylindrical stator 91 or the axial stator 96 on the spool valve groove segment 46, said force being limited due to a small sprayed surface 161 subjected to the pressure of said oil 114 offered by said segment 46 that results from a segment force reacting shoulder 50 included by said segment 46 that cooperates with another shoulder 162 formed in the cylindrical stator 91 or in the axial stator 96, said shoulders 50, 162 making it possible simultaneously to give said segment 46 a sufficient width and stiffness at the segment sealing line 49, limit said sprayed surface 161, and limit the Hertz pressure exerted by said sealing line 49 on the motor-pump central rotor 3.

It will be noted that according to one particular embodiment of the hydraulic motor-pump 1 according to the invention, the spool valve groove segment 46 maybe made up of two half-segments 95, the first half-segment 95 preventing the motor-pump oil 114 from leaving the angular manifold 44, 89 or the equalizing groove 90, 45, whereas the second prevents said oil 114 from entering therein. It will be noted that the segment force reacting shoulder 50 may include at least one segment decompression recess 52, while the two half-segments 95 may either be independent of one another, or be made from the same material billet. In that case, it is possible to provide—as clearly shown in FIGS. 12 and 13—one or more segment decompression orifice(s) 51 radially arranged between the two half-segments 95.

It will be noted that the spool valve groove segment 46 may be kept in contact with the motor-pump central rotor 3 by a segment groove bottom spring 47 that maybe made up of a corrugated metal strip, a helical spring, with any shape whatsoever appropriate for the profile of the segment foot that works as a spring as illustrated in FIGS. 12 and 13, or any other means known by those skilled in the art and making it possible to produce a spring providing the most uniform possible thrust over said segment 46 to keep it in contact with the motor-pump central rotor 3, the surface of the latter for example being able to be nitrided, cemented and/or coated with DLC (Diamond-Like Carbon) or any other hard coating and/or coating with a low friction coefficient, regarding at least the part of said central rotor 3 that is exposed to contact with said segment 46.

It will also be noted that the spool valve groove segment 46 may be made up of two half-segments 95 that each have at least one segment flank 94 kept in contact with the cylindrical stator 91 or the axial stator 96 by a segment separator spring 48 that may be made up of at least one corrugated metal strip, at least one helical spring, of any shape whatsoever suitable for the section profile of said segment 46, said shape working as a spring as illustrated in FIGS. 12 and 13, or any other means known by those skilled in the art and making it possible to produce a spring providing the most uniform possible thrust on said segment flanks 94 to keep them in contact with said cylindrical stator 91 or said axial stator 96.

According to one particular embodiment of the fixed or variable displacement hydraulic motor-pump 1 according to the invention illustrated in FIGS. 10 and 11, the inner input/output duct 57 is secured in the input/output spool valve 43 and/or in the motor-pump frame 2 by one or the other of the ends of said duct 57 using at least one fixed duct covering ball joint 59 and/or at least one sliding duct covering ball joint 60, said ball joint 59, 60 having a covering ball joint step 105 that can rest on a covering ball joint seat 64 so as to produce—with the input/output spool valve 43 and/or the motor-pump frame 2—sealing on the one hand, and a ball joint connection on the other hand, said step 105 and/or said seat 64 having a truncated sphere shape.

It will be noted that, according to one particular embodiment of the hydraulic motor-pump 1 according to the invention, the covering ball joint step 105 and the covering ball joint seat 64 may be nitrided, cemented and/or coated with DLC (Diamond-Like Carbon), or any other hard coating and/or coating with a low friction coefficient.

It will also be noted that the fixed duct covering ball joint 59 may be kept in contact with its covering ball joint seat 64 by a covering ball joint spring that bears on the one hand on the input/output spool valve 43 or on the motor-pump frame 2 or on a sliding duct covering ball joint 60, and on the other hand, directly or indirectly on said fixed covering ball joint 59, said spring being able to be a helical spring, a corrugated elastic washer or "Belleville" washer, or any other spring of any type, geometry or material.

As illustrated by FIGS. 10 and 11, the sliding duct covering ball joint 60 maybe made up of at least one sliding covering half-ball joint 107 axially passed through by the inner input/output duct 57, said half-ball joint 107 being able to translate axially and sealably relative to said inner duct 57, whereas said half-ball joint 107 is kept in contact with its covering ball joint seat 64 by a covering ball joint spring 106 that can bear on the one hand on the input/output spool valve 43 or on the motor-pump frame 2 or on another sliding covering half-ball joint 107, and on the other hand, directly or indirectly on said sliding covering half-ball joint 107, said spring 106 in particular being able to be a helical spring, a corrugated elastic washer or "Belleville" washer, or any other spring of any type, geometry or material.

According to one particular embodiment of the hydraulic motor-pump 1 according to the invention, the inner cylindrical surface of the sliding covering half-ball joint 107 or the outer cylindrical surface of the inner input/output duct 57 may include a groove in which a sliding covering ball joint 61 is housed that prevents any leakage of motor-pump oil 114 between said half-ball joint 107 and said duct 57.

It will be noted that the outer input/output duct 58 may be secured in the input/output spool valve 43 and/or in the motor-pump frame 2 by one or the other of the ends of said duct 58 using at least one fixed duct covering ball joint 59, said ball joint 59, 60 having a covering ball joint step 105 that can rest against a covering ball joint seat 64 so as to produce—with the input/output spool valve 43 and/or the motor-pump frame 2—sealing on the one hand, and a ball joint connection on the other hand, said step 105 and/or said seat 64 having a truncated sphere shape.

It will be noted that, according to one particular embodiment of the hydraulic motor-pump 1 according to the invention, the covering ball joint step 105 and the covering ball joint seat 64 may be nitrided, cemented and/or coated with DLC (Diamond-Like Carbon) or any other hard coating and/or coating with a low friction coefficient.

FIGS. 10 and 11 show that the inner duct chamber 55 may be closed by an inner duct plug 66 that may or may not—depending on the selected embodiment of the hydraulic motor pump 1 according to the invention—be passed through by the inner input/output duct 57, and include a covering ball joint seat 64 that cooperates with a fixed duct covering ball joint 59 or a sliding duct covering ball joint 60 included by said inner duct 57.

Furthermore, the outer duct chamber 56 may be closed by an outer duct plug 67 that is passed through by the outer input/output duct 58, said plug 67 being able—depending on the selected embodiment of the hydraulic motor-pump 1 according to the invention—to include a covering ball joint seat 64 that cooperates with a fixed duct covering ball joint 59 or a sliding duct covering ball joint 60 included by said outer duct 58.

It will be noted that the inner input/output duct 57 may be housed entirely or partially inside the outer input/output duct 58, the working section of the latter through which a motor-pump oil 114 circulates that is pumped by the hydraulic motor-pump 1 according to the invention thus being decreased from the total section of the inner input/output duct 57.

FIGS. 10 and 11 as well as FIGS. 28 to 31 show that the motor-pump frame 2 may comprise a connection satellite 62 in which the inner input/output duct 57 and/or the outer input/output duct 58 are secured.

Figure 1:
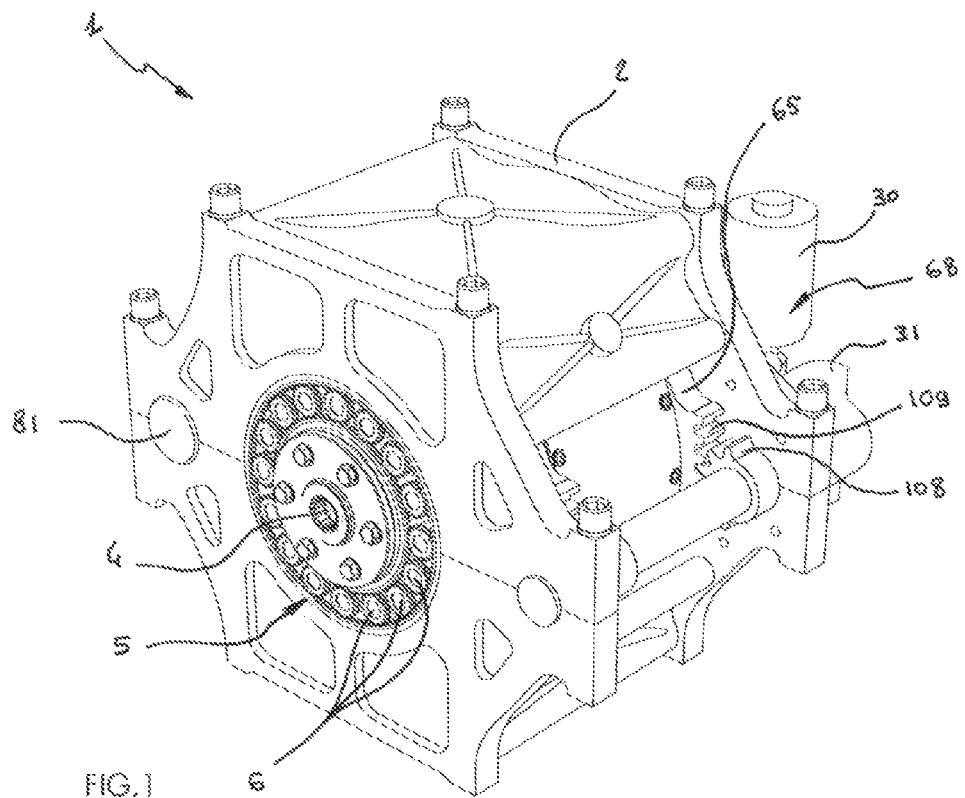
FIGS. 1 and 2 are three-dimensional views of the fixed or variable displacement hydraulic motor-pump according to the invention, seen from the front and the rear, respectively.
Figure 2:
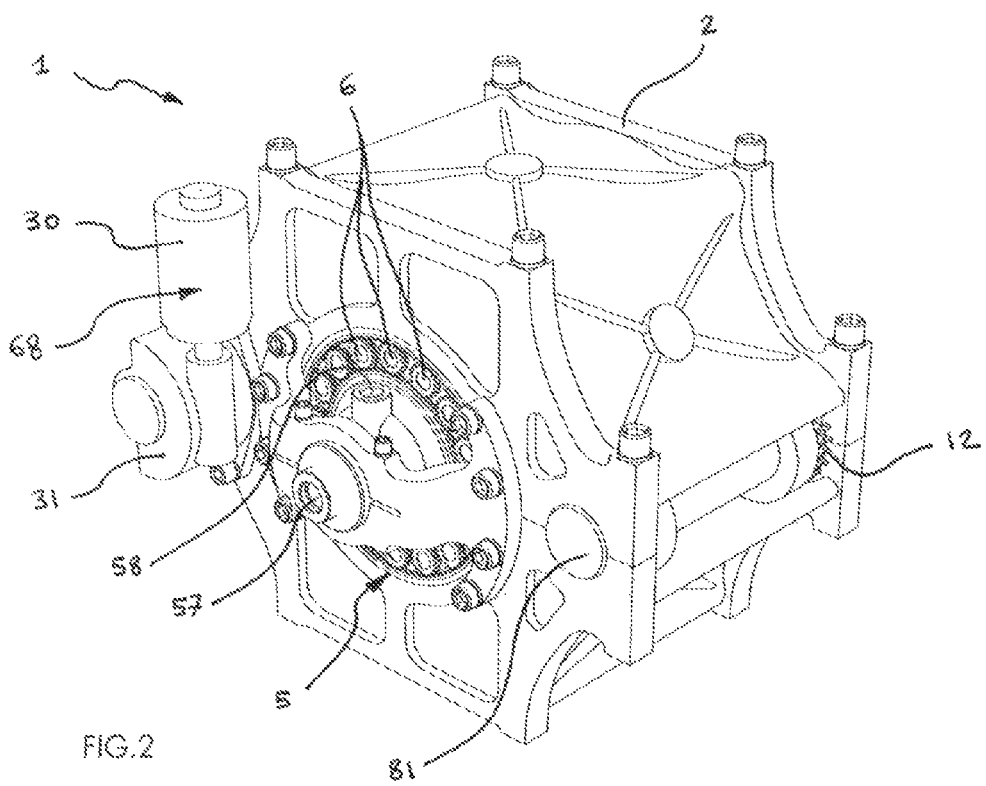
Figure 3:
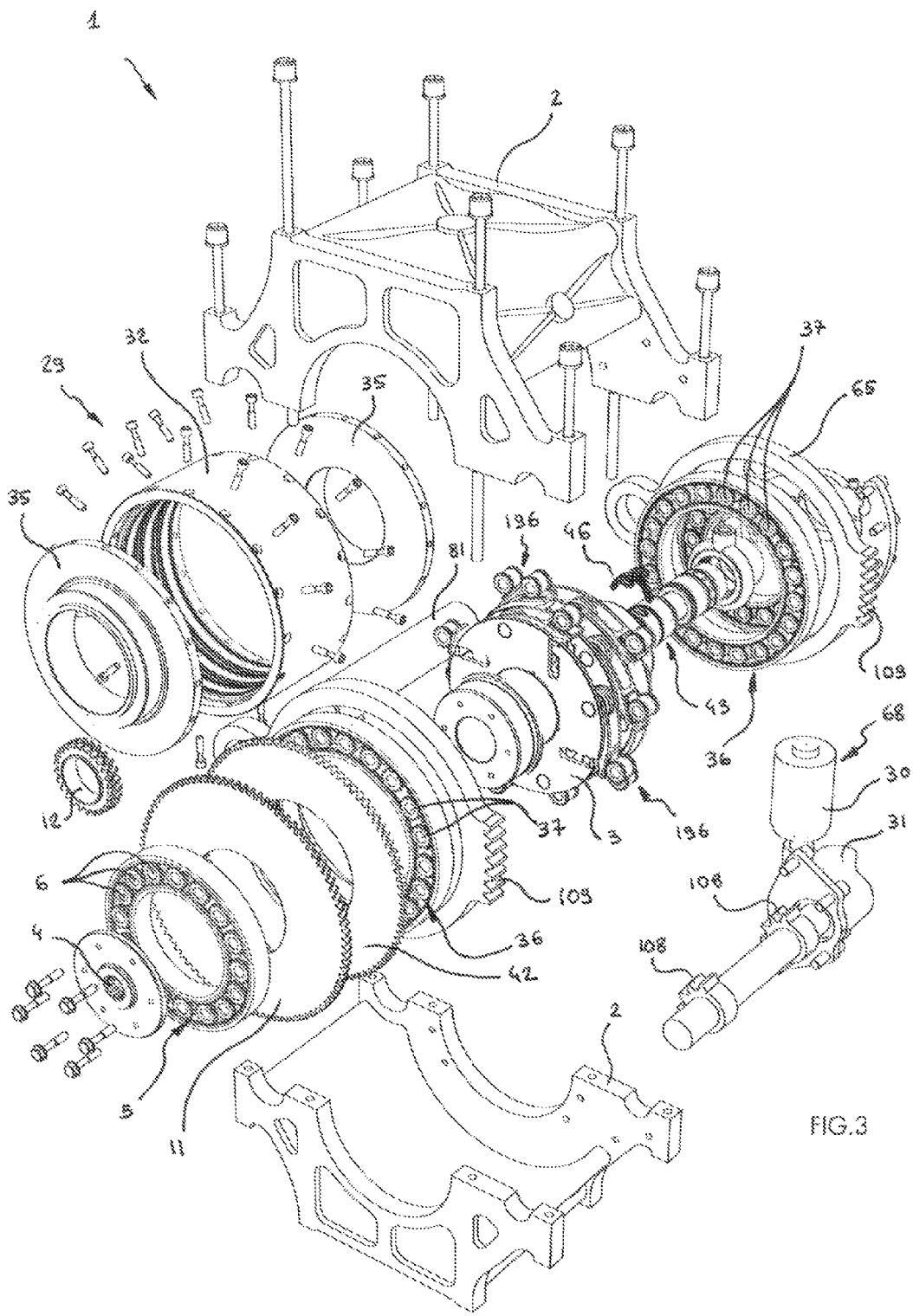
FIG. 3 is an exploded view of the fixed or variable displacement hydraulic motor-pump according to the invention.
Figure 4:
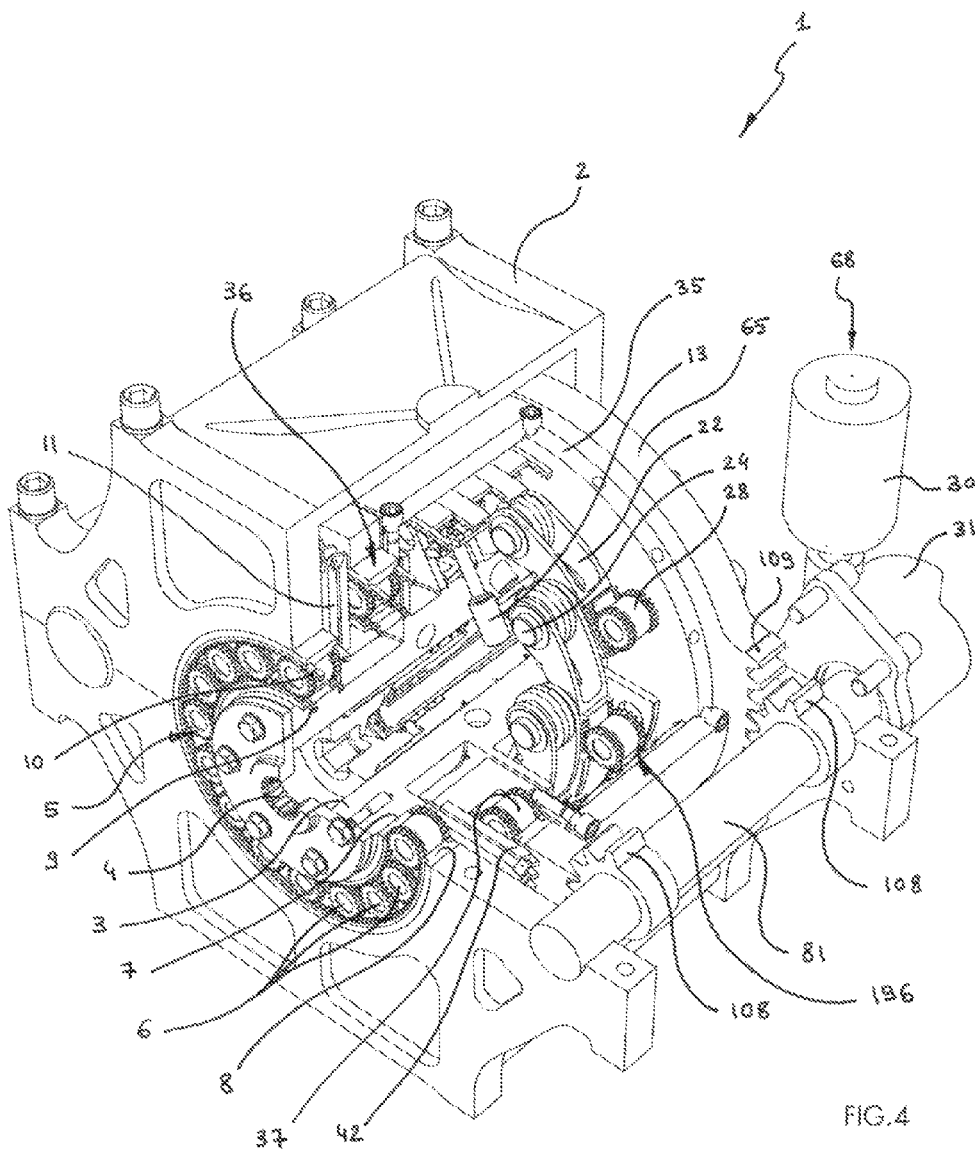
FIG. 4 is a cutaway view of the fixed or variable displacement hydraulic motor-pump according to the invention.
Figure 5:
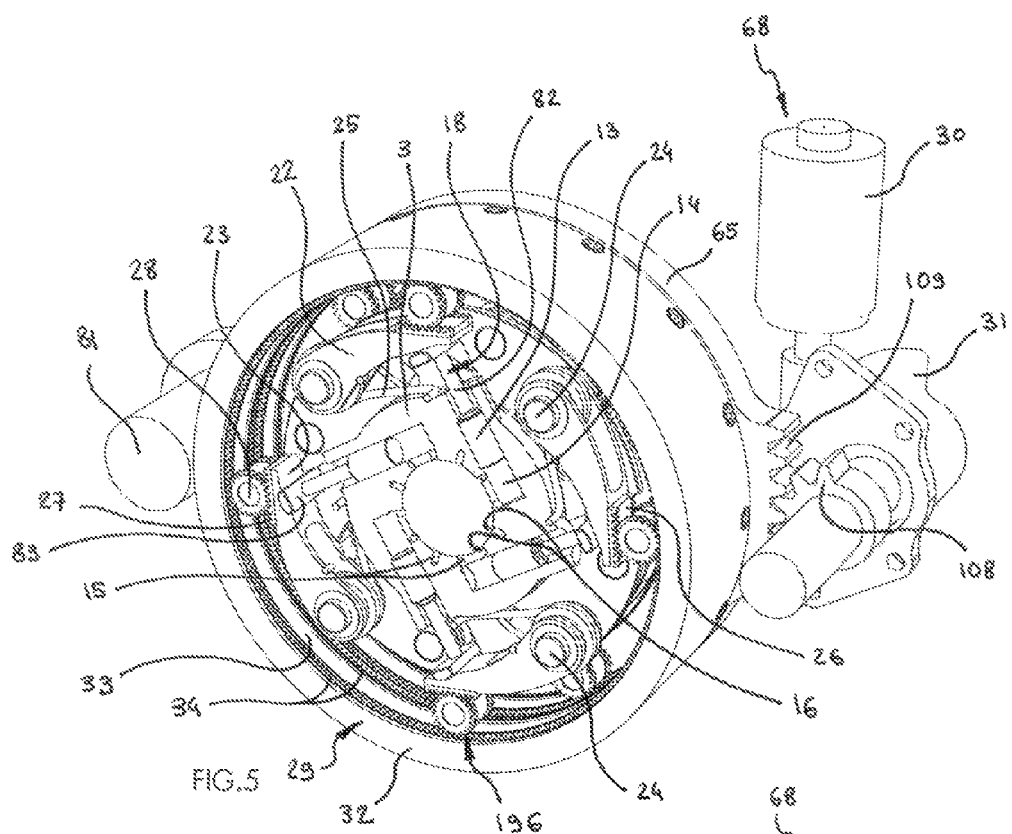
FIGS. 5 and 6 are three-dimensional cross-sectional views of the fixed or variable displacement hydraulic motor-pump according to the invention at zero displacement and maximum displacement, respectively, without the motor-pump frame of the latter.
Figure 6:
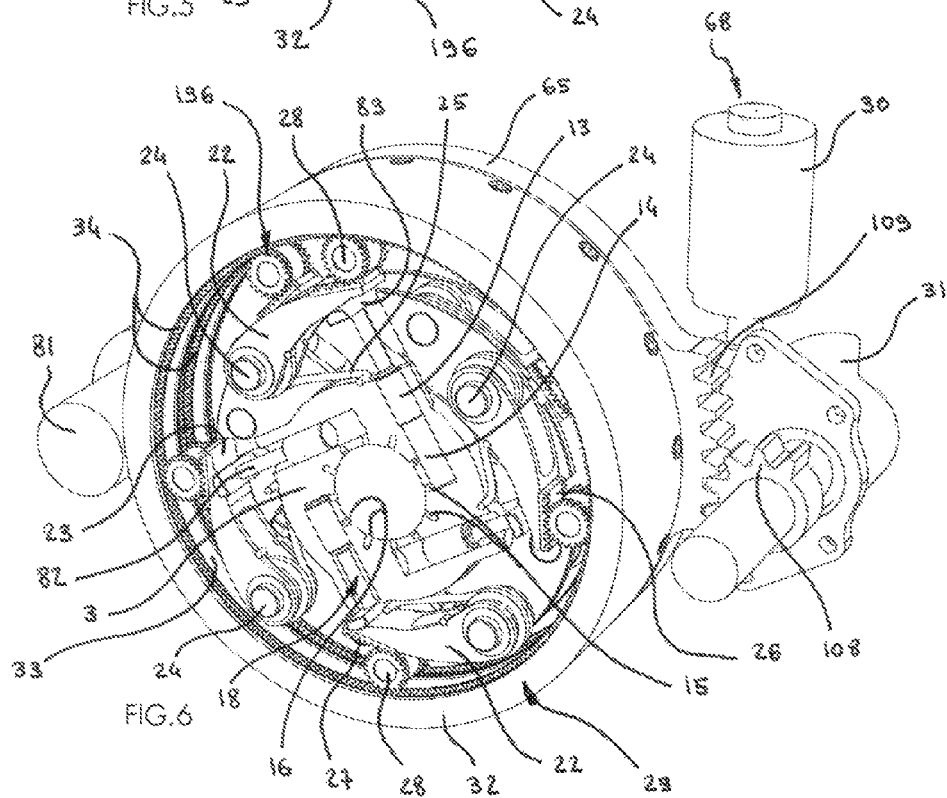

According to one particular embodiment of the hydraulic motor pump 1 according to the invention shown in FIGS. 1 to 6, FIG. 8 and FIG. 22, the peripheral rotor stator 65 is articulated on the angular synchronizing pinion axle 81 around which it can rotate under the action of a displacement-varying servomotor 68, said servomotor 68 thus being able to pivot said stator 65 by several degrees around said pinion axle 81 so as to make said stator 65 more or less off-centered relative to the motor-pump central rotor 3 so that the hydraulic piston 13 performs a translational movement in the hydraulic cylinder 14 with a greater or lesser amplitude from a zero amplitude corresponding to a zero displacement of the hydraulic motor-pump 1 according to the invention shown in FIG. 5, up to a maximum amplitude corresponding to a maximum displacement of said motor-pump 1 shown in FIG. 6.

It will be noted that the displacement-varying servomotor 68 may be a single- or double-acting hydraulic cylinder, an electric actuator with a screw, or any other actuator known by those skilled in the art making it possible to pivot the peripheral rotor stator 65 around the angular synchronizing pinion axle 81.

As illustrated in FIGS. 1 to 6, the displacement-varying servomotor 68 may be a servomotor rotary electric motor 30 that can rotate a displacement-varying ring driving pinion 108 in one direction or the other using a servomotor reducing gear 31, said pinion 108 being able to rotate in a bearing formed in the motor-pump frame 2 and being able to rotate a displacement-varying ring 109 secured to the peripheral rotor stator 65, the pitch circle of said ring 109 being centered on the angular synchronizing pinion axle 81.

It will be noted that the servomotor rotary electric motor 30 may use alternating or direct current, may or may not be of the stepping type, synchronous or asynchronous, with permanent magnets or brushes, and in general, of any type known by those skilled in the art and controlled by an electronic management device that operates using control software. According to one particular embodiment of the hydraulic motor-pump 1 according to the invention, the servomotor reducing gear 31 maybe made up of a cascade of pinions, and/or at least one planetary gear set and/or at least one worm screw and may be connected to the servomotor rotary electric motor 30 on the one hand and/or to the displacement-varying ring-driving pinion 108 on the other hand by a transmission shaft that may or may not be provided with a Cardan joint or a homo kinetic joint that does or does not cooperate with a chain, belt, or any other mechanical transmission means known by those skilled in the art.

Figure 20:
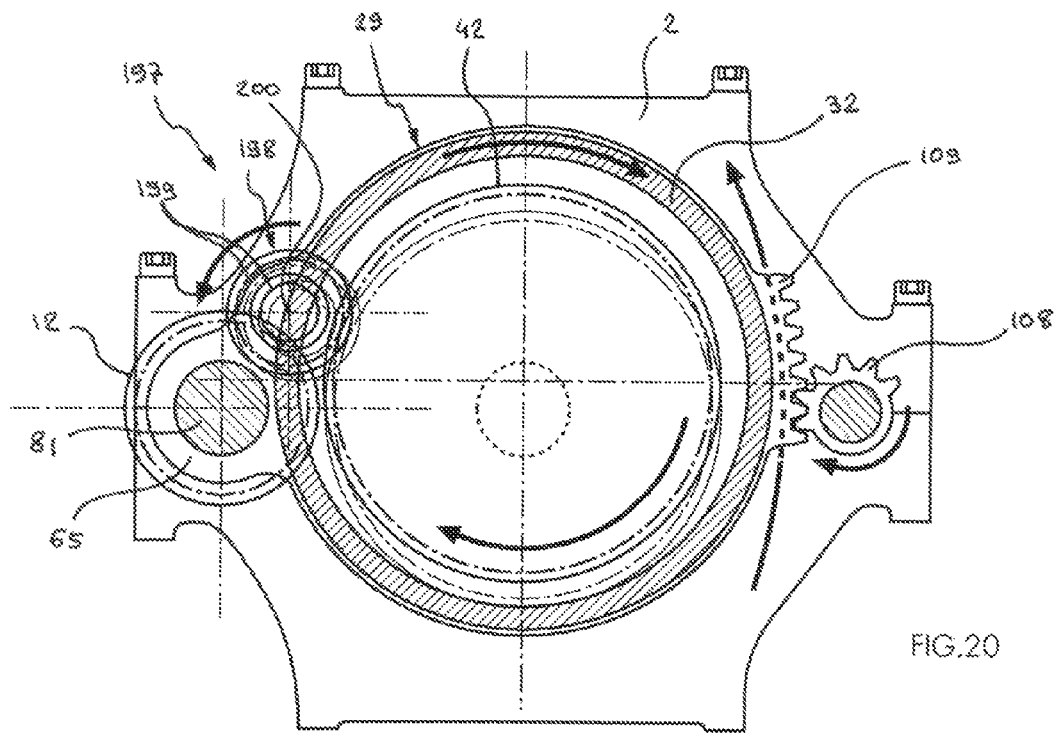
FIGS. 20 and 21 are diagrammatic views illustrating the operation of the intermediate re-phasing gear pair inserted between the peripheral rotor angular synchro ring and the angular synchronizing pinion.
Figure 21:
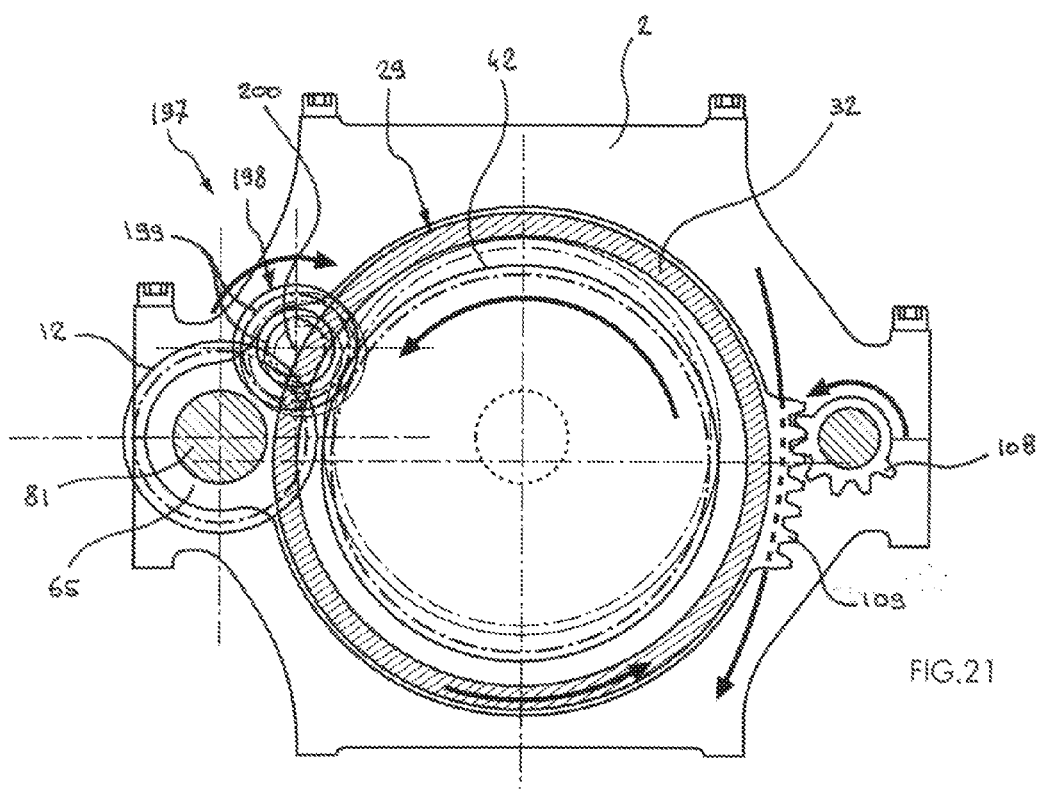

As shown in FIGS. 20 and 21, the fixed or variable displacement hydraulic motor-pump according to the invention may include rephasing means 197 that are inserted between the peripheral rotor angular synchro ring 42 and the central rotor angular synchro ring 11.

Said means 197 may be actuated by the displacement-varying servomotor 68 when the latter rotates the peripheral rotor stator 65 around the angular synchronizing pinion axle 81.

It will be noted that said means 197 may be mechanical and/or hydraulic and/or electric and may be based on a principle similar to that of the camshaft phase shifters found on reciprocating internal combustion engines or that of any phase shifter known by those skilled in the art of any type whatsoever. The rephasing means 197 in particular allow the tangential arm antifriction roller 28 to remain positioned relative to the tangential arm rolling track 26 so as to be able to cooperate with the latter irrespective of the displacement imposed by the displacement-varying servomotor 68 on the hydraulic motor-pump 1 according to the invention.

As shown in FIGS. 20 and 21, the rephasing means 197 are made up of at least one intermediate rephasing gear 198 including at least one toothed rephasing wheel 199 rotating around at least one rephasing axle 200 secured to the peripheral rotor stator 65, said gear 198 being inserted between the peripheral rotor angular synchro ring 42 and the angular synchronizing pinion 12.

It will be noted that according to this particular configuration of the hydraulic motor-pump 1 according to the invention, when the displacement-varying servomotor 68 keeps the peripheral rotor stator 65 immobile relative to the motor-pump frame 2, the speed and direction of rotation of the peripheral rotor angular synchroring 42 are identical to those of the central rotor angular synchro ring 11. To guarantee this result, the transmission means connecting the angular synchronizing pinion 12 to the central rotor angular synchroring 11 may be provided to be identical to those connecting said pinion 12 to the peripheral rotor angular synchro ring 42, or at the very least produce the same effects as the latter.

According to one particular embodiment of the hydraulic motor-pump 1 according to the invention shown in FIG. 23 and FIGS. 28 to 31, the inner input/output duct 57 and the outer input/output duct 58 may be directly or indirectly connected, respectively, with the input or the output of at least one second fixed or variable displacement hydraulic motor-pump 125, the fixed or variable displacement hydraulic motor-pump 1 and the second fixed or variable displacement motor-pump 125 together forming a hydraulic transmission device 63 that may or may not vary continuously, said second motor-pump 125 being able—according to one particular embodiment—to be identical to the fixed or variable displacement hydraulic cylinder motor-pump 1 according to the invention, or have an external gear, internal gear, vanes, axial or radial pistons, with or without variable displacement and in general, any type known from the prior art.

It will be noted that the hydraulic transmission device 63 may either be used alone, or be mounted in series or in parallel with any other transmission device known by those skilled in the art.

According to one particular embodiment of the hydraulic motor-pump 1 according to the invention shown in FIG. 23 and FIGS. 28 to 31, the central rotor power takeoff 4 of the fixed or variable displacement motor-pump 1 is mechanically connected to at least one drive motor 123 included by a motor vehicle 110, while the second fixed or variable displacement hydraulic motor-pump 25 is mechanically connected to at least one drive wheel or track 124 included by said vehicle 110, or vice versa, the drive motor 123 being able to be of the heat or electric type and able to be controlled by a management computer of the drive motor 170, while the motor vehicle 110 may be an individual vehicle, a utility vehicle, a heavy truck, a construction vehicle, an agricultural tractor, or any other self-propelled vehicle, including an airplane or ship, the drive wheel or track 124 in that case being replaced by a propeller operating in the air or water, respectively.

It will be noted that if the second fixed or variable displacement hydraulic motor-pump 125 is identical to the fixed or variable displacement hydraulic motor-pump 1 according to the invention, the central rotor power takeoff 4 of the hydraulic motor-pump 1 is connected by mechanical means to the drive motor 123, while the central rotor power takeoff 4 of the second hydraulic motor-pump 125 is connected by mechanical means to the drive wheel or track 124.

Irrespective of the configuration selected to produce the hydraulic motor-pump 1 according to the invention, said mechanical means may be made up of a transmission shaft, a differential axle assembly, a planetary gear set, a Cardan joint or homo kinetic joint, a belt, a chain, a cascade of pinions, a gear of any type whatsoever, or any mechanical transmission means known by those skilled in the art. It will be noted that, according to one particular embodiment of the hydraulic motor-pump 1 according to the invention, the hydraulic transmission device 63 advantageously makes it possible to replace the differential axle assembly ordinarily used on motor vehicles, for example by providing a fixed or variable displacement hydraulic motor-pump 1 connected to the drive motor 123 of the motor vehicle 110 that cooperates with two second fixed or variable displacement hydraulic motor-pumps 125 each connected to a drive wheel or track 124 of a same axle of said vehicle 110.

Figure 29:
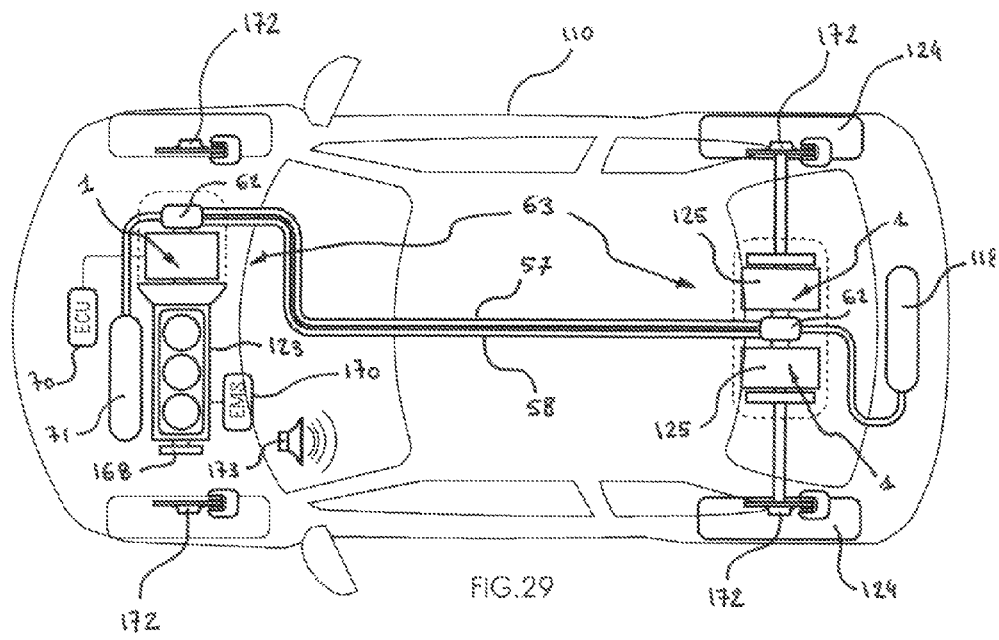
FIG. 29 is a diagrammatic view of a motor vehicle equipped on the one hand with a reciprocating internal combustion engine mounted transversely, and on the other hand with a hydraulic transmission device that forms—with two second fixed or variable displacement hydraulic motor-pumps—the fixed or variable displacement hydraulic motor-pump according to the invention, said second motor-pumps each driving a rear drive wheel of said vehicle.
Figure 30:
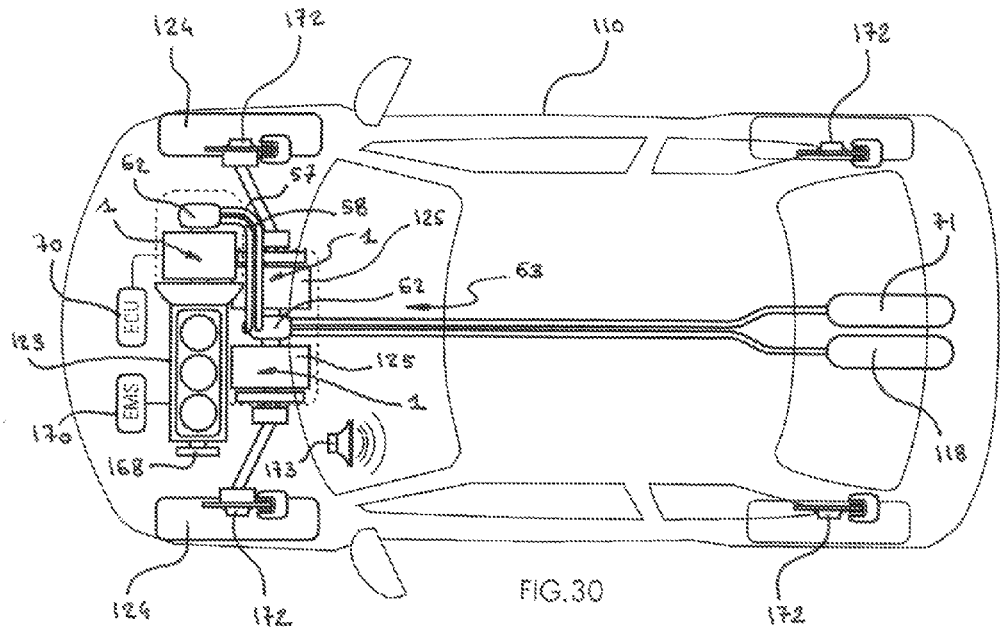
FIG. 30 is a diagrammatic view of a motor vehicle equipped on the one hand with a reciprocating internal combustion engine mounted transversely, and on the other hand with a hydraulic transmission device that forms—with two second fixed or variable displacement hydraulic motor-pumps—the fixed or variable displacement hydraulic motor-pump according to the invention, said second motor-pumps each driving a front drive wheel of said vehicle.

According to this particular configuration shown in FIGS. 29 and 30, the distribution of the motor or pump torque between said drive wheels or tracks 124 is done either naturally, the flow rate of a motor-pump oil 114 circulating between the different motor-pumps 1, 125 being distributed between said two second fixed or variable displacement hydraulic motor-pumps 125 as a function of said motor or pump torque imparted to each of said second motor-pumps 125 by the drive wheel or track 124 that they are responsible for rotating, or dynamically, by adjusting the displacement of each said second motor-pump 125 as a function of the turning radius and optionally the speed of the motor vehicle 110 respectively detected by a turning angle sensor and a tachymeter included by said vehicle 110 with which at least one accelerometer may optionally be associated. It will be noted that if the distribution of the motor or pump torque between said drive wheels or tracks 124 is done dynamically, the motor vehicle 110 offers better grip. It will be noted that this non-limiting example embodiment of the hydraulic motor-pump 1 according to the invention can be transposed to motor vehicles with two wheel drive, four-wheel drive or several drive wheels, without any number-based limitation. It will be noted that the drive motor 123 of the motor vehicle 110 may in particular be of the diesel spark ignition reciprocating internal combustion type, or maybe made up of one or more axial and/or radial turbines, in particular using a configuration similar to that described in French patent application no. FR 12/59827 belonging to the applicant and illustrated in FIG. 31.

Figure 23:
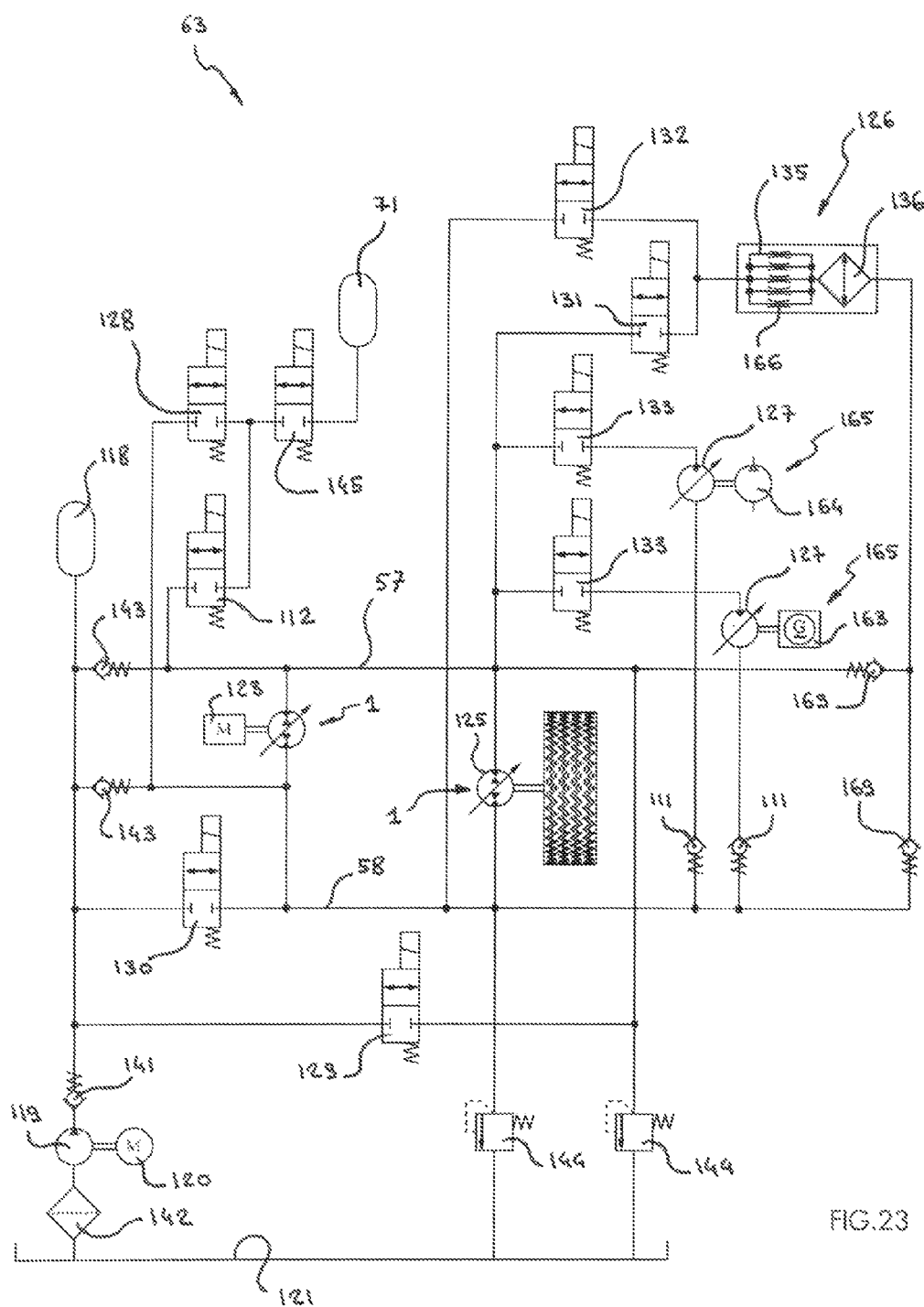
FIG. 23 illustrates a block diagram of the fixed or variable displacement hydraulic motor-pump according to the invention producing—with a second fixed or variable displacement hydraulic motor-pump—a hydraulic transmission device on the one hand allowing a drive motor to propel a motor vehicle and on the other hand making it possible to store-recover part of the kinetic and/or gravitational energy of said vehicle in a high-pressure accumulator.

According to one particular embodiment of a hydraulic motor-pump 1 according to the invention shown in FIG. 23, the inner input/output duct 57 may be connected with at least one high-pressure accumulator 71, the diagrammatic cross-section of which is shown in FIGS. 24 to 27, by at least one inner duct high-pressure accumulator valve 112.

Furthermore, the outer input/output duct 58 may be connected with at least one high-pressure accumulator 71 by at least one outer duct high-pressure accumulator valve 128.

The inner input/output duct 57 may also be connected with at least one low-pressure accumulator 118, the diagrammatic cross-section of which is shown in FIGS. 24 to 27, by at least one inner duct low-pressure accumulator valve 129.

As shown in FIG. 23, the outer input/output duct 58 may be connected with at least one low-pressure accumulator 118 by at least one outer duct low-pressure accumulator valve 130, the accumulator valves 112, 128, 129, 130 being able to be of the ball, drawer, sliding gate, delivery valve, needle, flap, tube type similar to the patent application belonging to the applicant published under no. FR 2,969,705, or any covering means maneuvered by an electric, electromagnetic, pneumatic, mechanical or hydraulic actuator, while the high-pressure accumulator 71 and/or the low-pressure accumulator 118 may for example have a membrane or a piston and comprise a gas, a fluid, or at least one spring.

Figure 24:
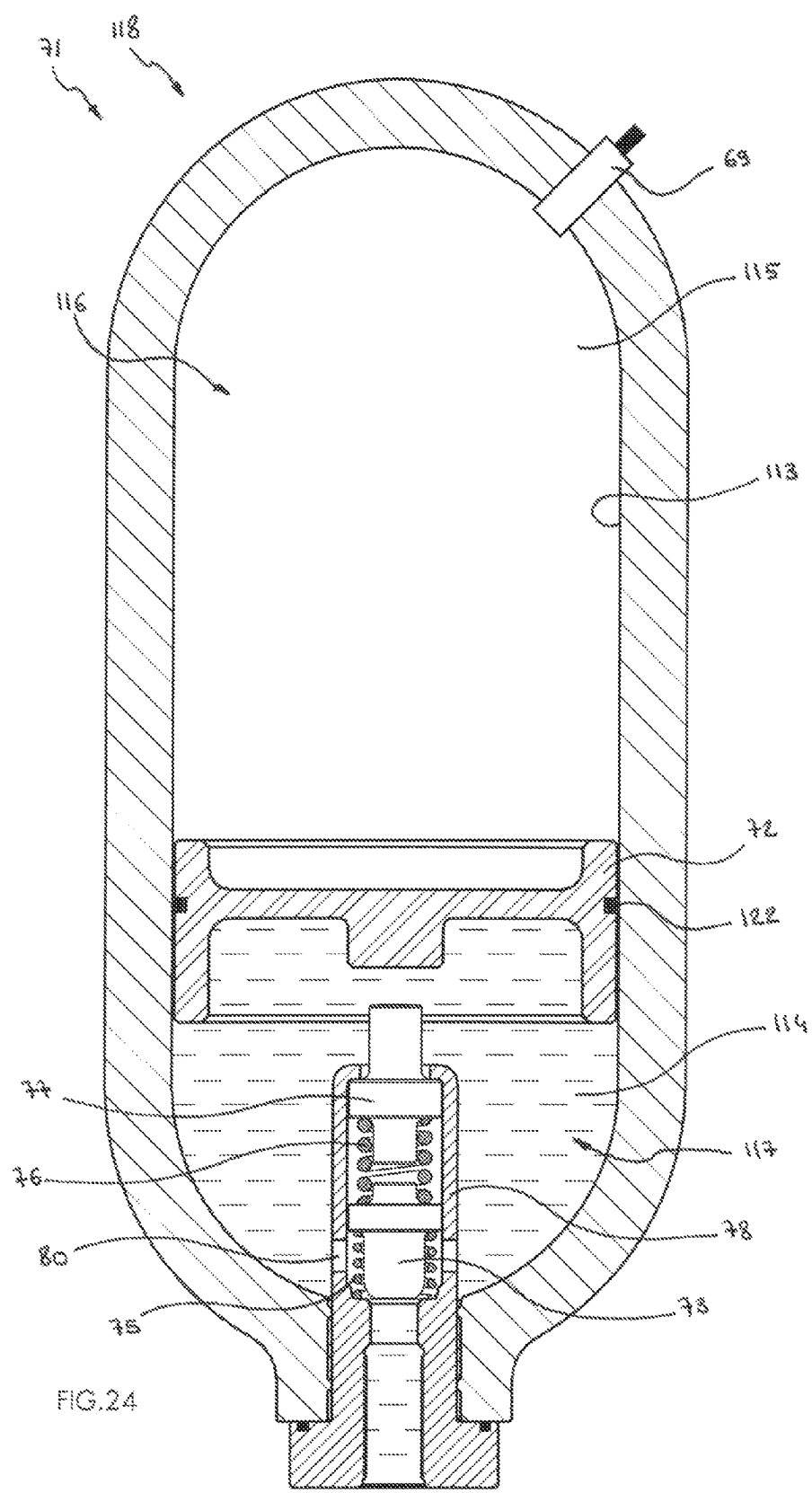
FIG. 24 is a diagrammatic cross-section of the high-pressure and/or low-pressure accumulator included by the hydraulic transmission device provided by the fixed or variable displacement hydraulic motor-pump according to the invention.

As illustrated in FIG. 24, the high-pressure accumulator 71 and/or the low-pressure accumulator 118 may include an accumulator pressure sensor 69 that informs a motor-pump management computer 70 of the pressure prevailing in the or said accumulator(s) 71, 118. Furthermore, all or part of the inner and/or outer surface of the or said accumulator(s) 71, 118 may be covered with a heat transfer material, for example rock wool, a cellular structure, or any arrangement known by those skilled in the art that makes it possible to conserve heat. According to one alternative embodiment of the hydraulic motor-pump 1 according to the invention shown in FIG. 23, the inner input/output duct 57 and/or the outer input/output duct 58 may be connected with the low-pressure accumulator 118 via a low-pressure accumulator check valve 143 that allows a motor-pump oil 114 to circulate from said accumulator 118 to the inner duct 57 and/or said outer duct 58, but not the reverse. Furthermore, FIG. 23 also shows that the inner input/output duct 57 and/or the outer input/output duct 58 may be connected to a motor-pump oil reservoir 121 by a pressure limiting valve 144, the latter protecting the main bodies making up said hydraulic motor-pump 1 from any overpressure that could damage them.

Figure 25:
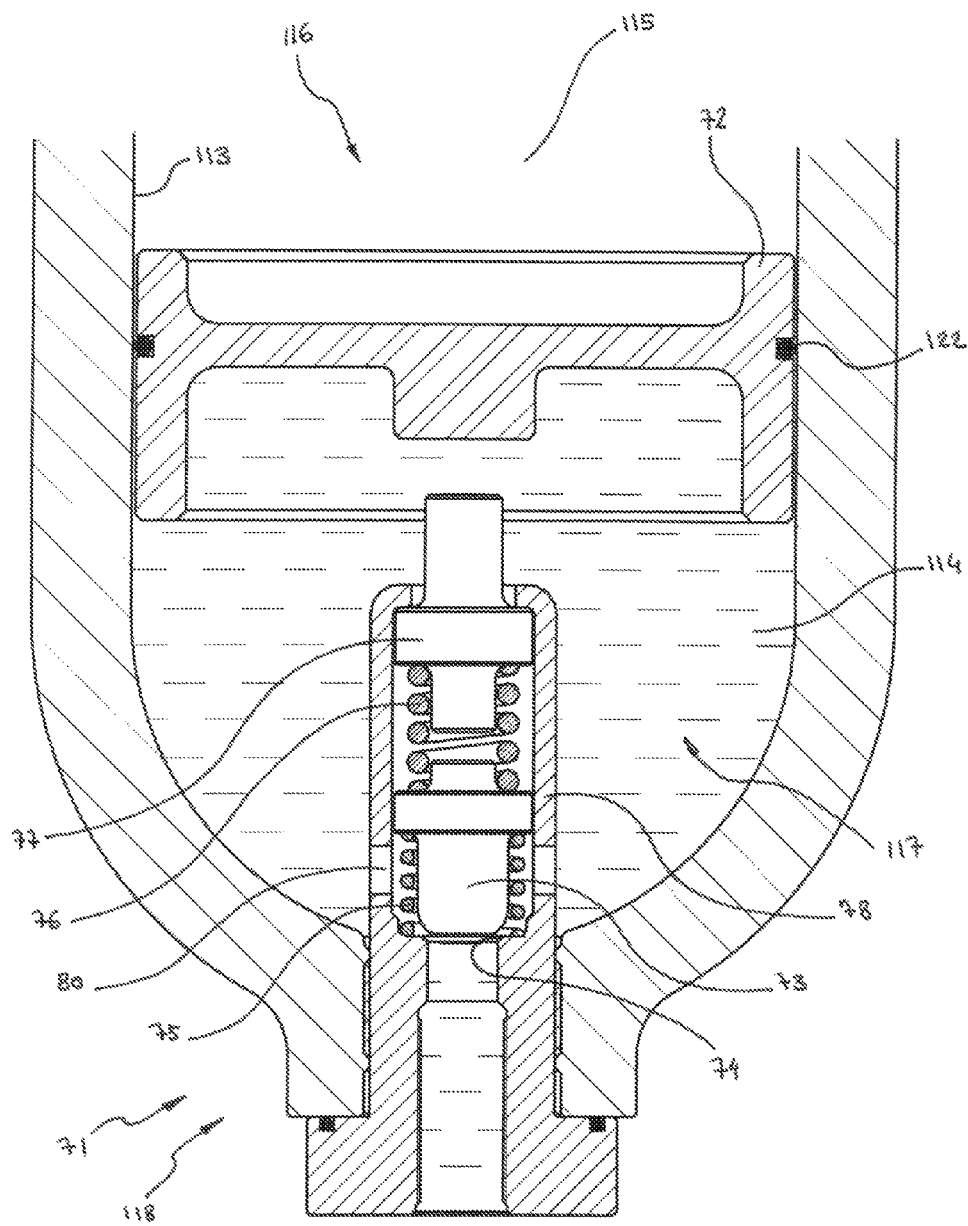
FIGS. 25, 26 and 27 are diagrammatic cross-sections that illustrate the operation of the accumulator closing gate of the high-pressure and/or low-pressure accumulator included by the hydraulic transmission device as provided by the fixed or variable displacement hydraulic motor-pump according to the invention.
Figure 26:
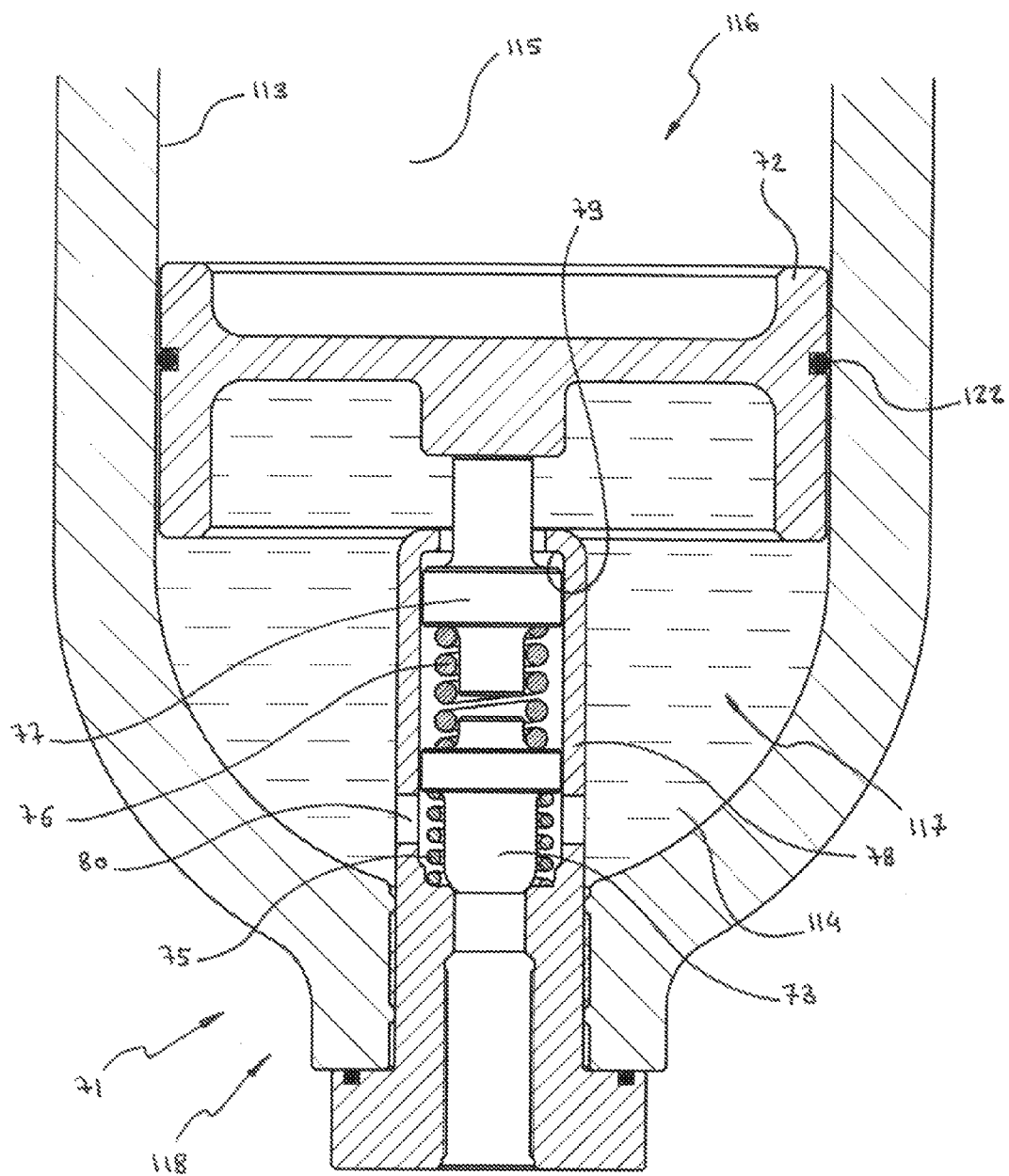
Figure 27:
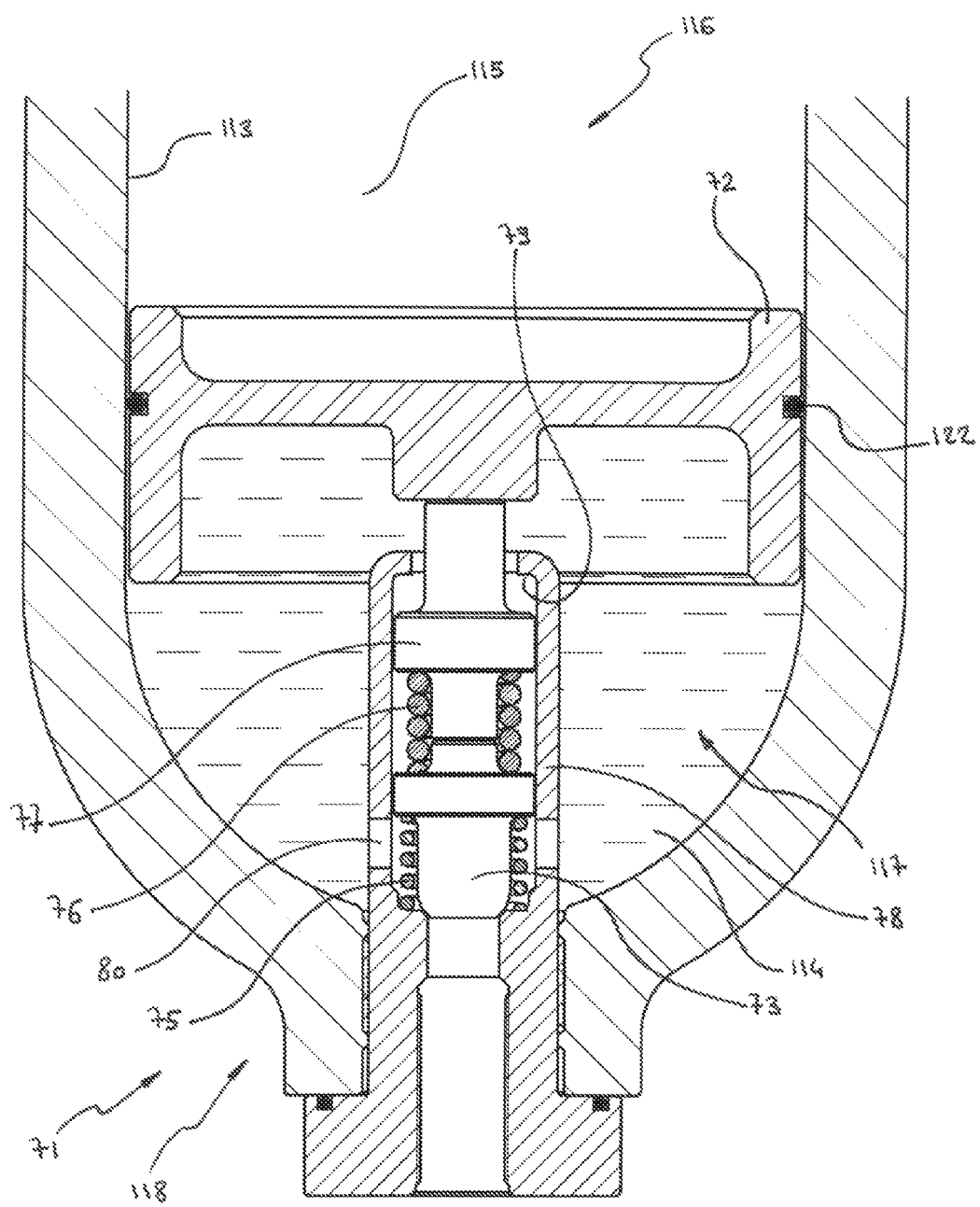

As illustrated in FIGS. 25 to 27, the high-pressure accumulator 71 and/or the low-pressure accumulator 118 may comprise at least one accumulator separator piston 72 capable of moving sealably in an accumulator blind cylinder 113, said piston 72 delimiting, with said cylinder 113, a gas compartment 116 containing a pressurized gas 115 and an oil compartment 117 containing a motor-pump oil 114, the latter compartment 117 being able to be connected with the inner input/output duct 57 and/or the outer input/output duct 58 during the operation of the hydraulic transmission device 63, while the pressurized gas 15 maybe nitrogen or any other gas whereof the characteristics are compatible with the desired pressure variations, in the desired temperature range.

It will be noted that—as shown in FIGS. 25 to 27—the accumulator separator piston 72 may include at least one accumulator piston joint 122 and/or a segment in its periphery to produce, with the accumulator blind cylinder 113, the best possible sealing, said joint 122 being able to be to roid, with a lip, composite, or made with any material or geometry whatsoever, whereas if it is a segment, the latter may also be of any type known by those skilled in the art, without limitation. It will also be noted that the accumulator blind cylinder 113 may include a hemispherical cup at each of its ends and/or be essentially made up of and/or coated with steel and/or aluminum and/or composite material, in particular able to integrate high-strength carbon fiber.

FIGS. 25 to 27 show that the oil compartment 117 may include an accumulator closing gate 73 that the accumulator separator piston 72 can press on an accumulator gate seat 74 by pushing on a high-stiffness resisting spring 76 inserted between said piston 72 and said gate 73, so as to sealably isolate said compartment 117 from said inner input/output duct 57 and/or said outer input/output duct 58, said gate 73 cooperating—unlike the high-stiffness resisting spring 76—with a low-stiffness resisting spring 75 that tends to separate said gate 73 from said seat 74, said gate 73 being able to include the shoulders necessary for said springs 75, 76 to remain centered on said gate 73.

FIGS. 25 and 26 show that the accumulator separator piston 72 may push on the high-stiffness resisting spring 76 by means of a high-stiffness spring plunger 74 that is guided in longitudinal translation by a gate and plunger guide 78 secured to the high-pressure accumulator 71 and/or the low-pressure accumulator 118, said gate guide 78 also guiding the accumulator closing gate 73 and including a plunger stop 79 that determines the maximum movement of the high-stiffness spring plunger 77 toward the accumulator separator piston 72. If the gate and plunger guide 78 is an independent piece, it may be secured to the high-pressure accumulator 71 and/or the low-pressure accumulator 118 by welding, screwing, crimping, or by any fastening means known by those skilled in the art. Whatever the configuration, the gate and plunger guide 78 may include means for connecting to any hydraulic duct, irrespective of the type of the latter.

According to this particular configuration, the gate and plunger guide 78 may include at least one radial gate guide orifice 80 that connects the oil compartment 117 with the accumulator gate seat 74 so as to allow the motor-pump oil 114 to circulate between the inner input/output duct 57 and/or the outer input/output duct 58 and said oil compartment 117. According to one particular embodiment of the hydraulic motor-pump 1 according to the invention, the gate and plunger guide 78 may be made up of an open-worked tube that has several radial gate guide orifices 80, or a support structure resulting in gate guide radial orifices 80 with a large section.

FIG. 22 shows that the high-pressure accumulator 71 and/or the low-pressure accumulator 118 may be connected to the inner input/output duct 57 and/or to the outer input/output duct 58 by means of an accumulator locking valve 145 that can sealably isolate said accumulator 71, 118 from said inner duct 57 and/or said outer duct 58, said locking valve 145 being sealed enough when it is closed for a motor-pump oil 114 contained by said high-pressure accumulator 71 and/or said low-pressure accumulator 118 not to be able to leave said accumulator 71, 118 even if the hydraulic motor-pump 1 according to the invention remains unused for long periods of time. According to one non-limiting example of the accumulator locking valve 145, the latter may be made up of a ball resting on a seat from which it may be separated by a touch needle moved by an electric, pneumatic or hydraulic motor.

FIG. 22 shows that the low-pressure accumulator 118 is supplied with motor-pump oil 114 by at least one low-pressure pump 119 driven by a low-pressure pump motor 120, the intake duct of said pump 119 being connected to a motor-pump oil reservoir 121 while its discharge duct is connected with said accumulator 118, said pump 119 being able to have an external gear, internal gear, vanes, axial radial pistons, a variable or non-variable displacement, and in general, of any type known by those skilled in the art, while the low-pressure pump motor 120 may be electric, thermal or hydraulic and may be connected to the low-pressure pump 119 by any transmission means also known by those skilled in the art such as a shaft, a Cardan joint or a homo kinetic joint, a belt, a chain or a gear of any type whatsoever, and irrespective of whether said means cooperate with a reducing gear or a variable speed transmission.

It will be noted that according to one particular embodiment of the hydraulic motor-pump 1 according to the invention shown in FIG. 23, the low-pressure accumulator 118 may be provided with an accumulator pressure sensor 69 that returns the pressure prevailing in said accumulator 118 to a motor-pump management computer 70 such that the latter controls the low-pressure pump 119 so that it continuously keeps the pressure prevailing in said accumulator 118 above a certain value. Furthermore, as illustrated in FIG. 23, the discharge duct of the low-pressure pump 120 may include a low-pressure pump check valve 141 that allows the motor-pump oil 114 to go from said pump 120 to the low-pressure accumulator 118 but not the reverse, while the intake duct of said pump 119 can include a low-pressure pump intake filter 142. According to one particular embodiment of the hydraulic motor-pump 1 according to the invention, the motor-pump oil reservoir 121 may be formed in the motor-pump frame 2.

According to one particular embodiment of the hydraulic motor-pump 1 according to the invention shown in FIG. 23, the inner input/output duct 57 may be connected by an inner duct exchanger-dissipater valve 131 with at least one exchanger-dissipater inner duct 135 included by a pressure loss exchanger-dissipater 126, said duct 135 comprising at least one dissipater heat exchange outer surface 136 that is in contact with a coolant gas or a coolant liquid, said outer surface 136 being able to be made up of the outer wall of the inner duct 135 possibly provided with fins, patterns or cooling protuberances. According to the present invention, the exchanger-dissipater inner duct 135 cooperates with, or includes, at least one throat 166 and/or a winding or labyrinthine path and/or a pressure-limiting valve that produces a pressure loss causing the pressure of a motor-pump oil 114 circulating in said inner duct 135 to drop, said pressure drop being provided to heat the motor-pump oil 114 that is simultaneously cooled by its contact with said inner duct 135 which, due to the dissipater heat exchange outer surface 136, transfers the heat from said oil 114 to the coolant gas or coolant liquid.

According to one particular embodiment of the hydraulic motor-pump 1 according to the invention, the pressure loss exchanger-dissipater 126 can be used to brake the drive motor 123 of the motor vehicle 110 when starting cold to accelerate the temperature increase of said motor 123 when the latter is a reciprocating internal combustion motor, the dissipater heat exchange outer surface 136 in that case being put in contact with the coolant liquid and/or lubricating oil of said motor 123. Furthermore, the pressure loss exchanger-dissipater 126 may be used to brake the motor vehicle 110 when the latter goes down a slope, said exchanger-dissipater then constituting a hydraulic decelerator. The pressure loss exchanger-dissipater 126 can also be used during the braking phase of the motor vehicle 110 to relieve the disc brakes 172 or drum brakes so as to limit the temperature increase and wear of said brakes. In the latter case, the dissipater heat exchange outer surface 136 may be put in contact with ambient atmospheric air to cool the motor-pump oil 114 circulating in the dissipater-exchanger inner duct 135, the cooling produced by said air replacing or being added to that produced by the coolant liquid and/or the lubricating oil of the drive motor 123. It will be noted that the input or the output of the pressure loss exchanger-dissipater 126 may include at least one dissipater check valve 169 that forces the motor-pump oil 114 coming—depending on the case—from the inner input/output duct 57 or the outer input/output duct 58, only to circulate in one direction.

According to one particular embodiment of the hydraulic motor-pump 1 according to the invention shown in FIG. 23, the outer input/output duct 58 may be connected by an outer duct exchanger-dissipater valve 132 with at least one exchanger-dissipater inner duct 135 included by a pressure loss exchanger-dissipater 126, said duct 135 comprising at least one dissipater heat exchange outer surface 136 that is in contact with a coolant gas or a coolant liquid, the configuration, operation and expected results of the pressure loss exchanger-dissipater 126 being identical to those provided when the inner input/output duct 57 is connected with said exchanger-dissipater 126, while said exchanger-dissipater valves 131, 132 may be of the ball, drawer, sliding gate, delivery valve, needle, flap, tube type similar to the patent application belonging to the applicant published under no. FR 2,969,705, or any covering means maneuvered by any electric, electric, pneumatic, mechanical or hydraulic actuator.

FIG. 23 shows that the inner input/output duct 57 may be connected with a secondary hydraulic motor 127 by an inner duct secondary motor valve 133.

As an alternative that is not shown, the outer input/output duct 58 may be connected with a secondary hydraulic motor 127 by an outer duct secondary motor valve, the latter and the inner duct secondary motor valve 133 being able to be of the ball, drawer, sliding gate, delivery valve, needle, flap, tube type similar to the patent application belonging to the applicant published under no. FR 2,969,705, or any covering means maneuvered by any electric, electromagnetic, pneumatic, mechanical or hydraulic actuator, while said hydraulic motor 127 may have an external gear, internal gear, vanes, axial or radial pistons, with or without variable displacement and in general, any type known by those skilled in the art, and may drive an electric alternator 163, a steering assistance device, an air conditioning compressor 164, a turbocharger shaft, in particular to reduce the response time of the latter, or any other accessory 165 equipping a motor vehicle 110 or that is part of a system that does or does not comprise a hydraulic transmission device 63.

It will be noted that the input or output of the secondary hydraulic motor 127 may include a secondary hydraulic motor check valve 111 that allows the motor-pump oil 114 coming from the inner input/output duct 57 or outer input/output duct 58, depending on the case, to circulate in the required direction to drive the motor 127, but not in the opposite direction. It will be noted that, according to one particular embodiment of the hydraulic motor-pump 1 according to the invention, the secondary hydraulic motor 127 may be mechanically connected to any accessory 165 by means of a freewheel known by those skilled in the art, such that said accessory 165 may be rotated by another driving system such as a belt or chain without said other system being able to rotate the secondary hydraulic motor 127 if the latter is not supplied with motor-pump oil 114. This particular embodiment may also provide that said other drive system is also connected to said accessory 165 by a freewheel such that the secondary hydraulic motor 127 cannot rotate said system if the latter is not itself rotated by another driving source.

In any case, the freewheels included, in this case, by the secondary hydraulic motor 127 and said other driving system do not oppose the latter two cooperating simultaneously to rotate said accessory 165.

Figure 33:
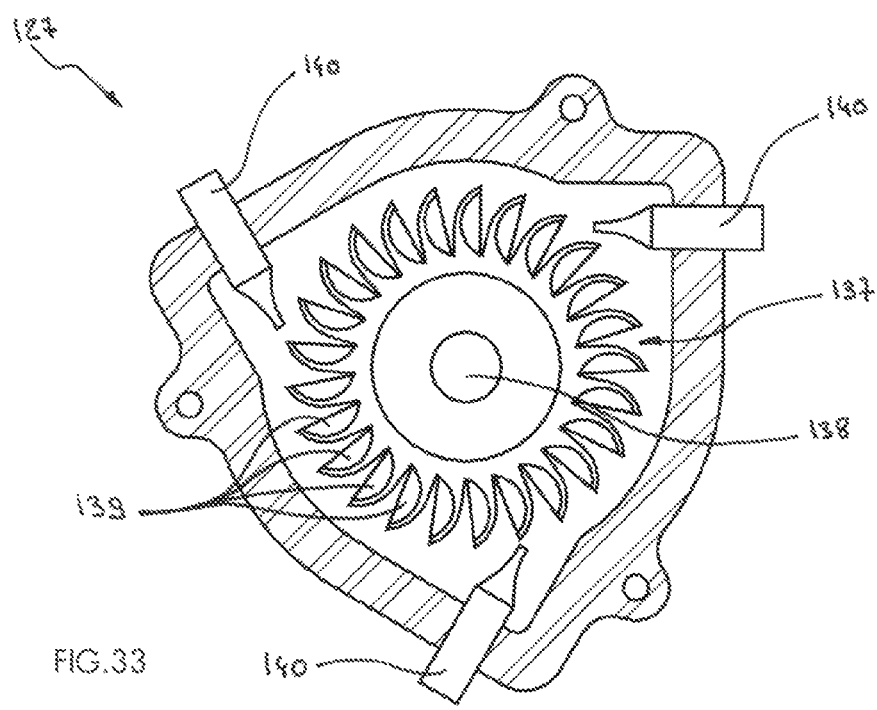
FIG. 33 is a diagrammatic cross-sectional view of a secondary hydraulic motor included by the hydraulic transmission device as provided by the fixed or variable displacement hydraulic motor-pump according to the invention, said secondary hydraulic motor being formed by a hydraulic turbine.

As shown in FIG. 33, the secondary hydraulic motor 127 may be made up of at least one hydraulic turbine 137 mounted on a hydraulic turbine shaft 138 that includes at least one hydraulic turbine blade 139 on which at least one hydraulic turbine injector 140 can axially and/or radially spray a jet of a motor-pump oil 114 such that said blade 139 rotates said turbine shaft 138, the latter being mechanically connected, directly or indirectly, to one or more accessories 165 by a fixed or variable transmission and/or by a reducing gear.

According to the invention, the latter two components may have gears, a chain, a belt, rollers, or be of any other type known by those skilled in the art, and the or said accessory or accessories may equip a motor vehicle 110 or be part of a system that does or does not comprise a hydraulic transmission device 63.

FIGS. 28 to 31 show that the hydraulic motor-pump 1 according to the invention may include a motor-pump management computer 70 that controls the displacement-varying servomotor 68 to control the displacement of the fixed or variable displacement hydraulic motor-pump 1, including that making up the hydraulic transmission device 63, irrespective of whether the latter is incorporated into a motor vehicle 110, said computer 70 also being able to control the inner duct high-pressure accumulator valve 112, and/or the outer duct high-pressure accumulator valve 128 and/or the inner duct low-pressure accumulator valve 129 and/or the outer duct low-pressure accumulator valve 130 and/or the accumulator locking valve 145 and/or the low pressure pump motor 120 and/or the inner duct exchanger-dissipater valve 131 and/or the outer duct exchanger-dissipater valve 132 and/or the inner duct secondary motor valve 133 and/or the outer duct secondary motor valve.

According to one non-limiting example embodiment of the hydraulic motor-pump 1 according to the invention, the motor-pump management computer 70 runs specific computer software and is connected to all or some of the sensor(s) and actuator(s) included by the motor vehicle 110 and its drive motor 123, such that the hydraulic transmission device 63 that equips said vehicle 110 is contributing to the energy, safety, performance and comfort objectives set for the vehicle 110.

Figure 32:
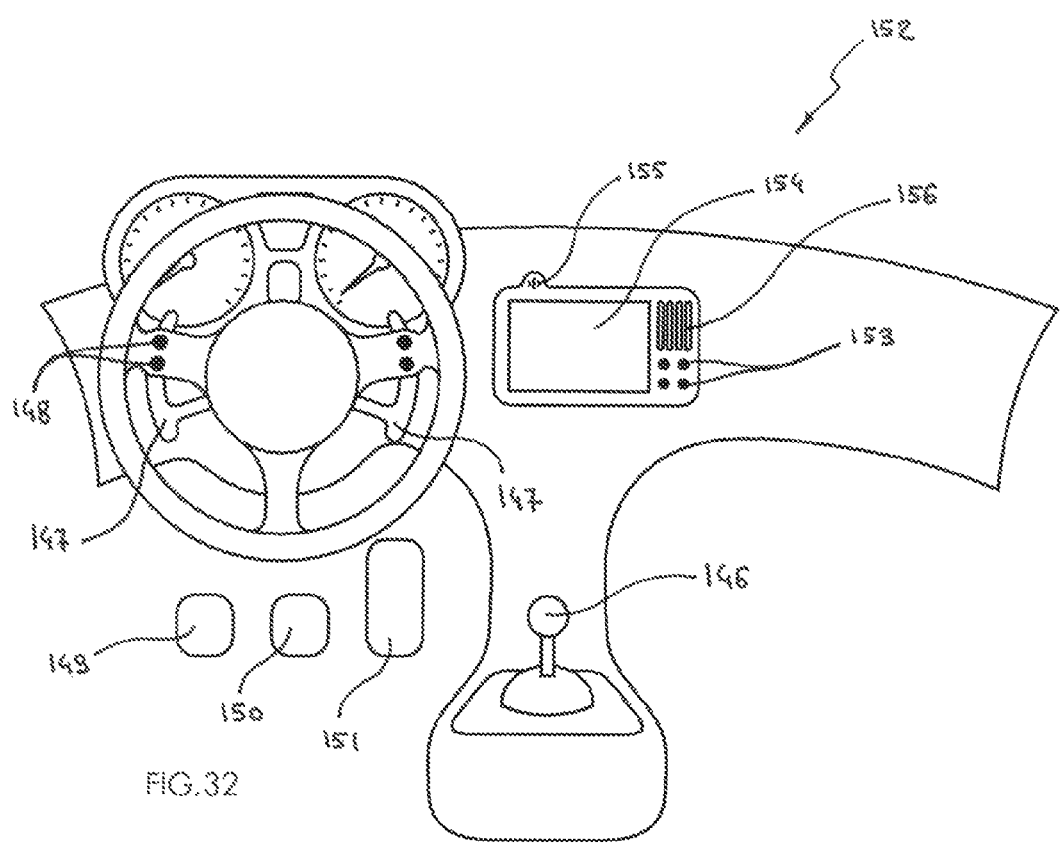
FIG. 32 is a diagrammatic view of a driving station included by a motor vehicle propelled by the hydraulic transmission device as provided by the fixed or variable displacement hydraulic motor-pump according to the invention.

According to another non-limiting example embodiment of the hydraulic motor-pump 1 according to the invention illustrated in FIG. 32, the motor-pump management computer 70 may be connected by wired, lighted or electromagnetic information transmission means to at least one shifting lever 146 and/or at least one shifting vane 147 and/or at least one shifting button 148 and/or a clutch pedal 149 and/or a brake pedal 150 and/or an accelerator pedal 151 included by a driving station 152 comprised by the motor vehicle 110, the different components that are said lever 146, said vane 147, said button 148, the clutch pedal 149 and the brake pedal 150 being able—according to one particular embodiment of the hydraulic motor-pump 1 according to the invention—to be removable, replaceable or retractable to allow the driver of the motor vehicle 110 the possibility of configuring said vehicle 110 as desired based on the anticipated use of the hydraulic transmission device 63. In that case, sensors inform the motor-pump management computer 70 of the presence, absence or status of the removable, replaceable or retractable components 146, 147, 148, 149, 150 such that said computer 70 can authorize or prohibit certain operating modes of the hydraulic transmission device 63.

For example, for said computer 70 to be able to use the hydraulic transmission device 63 to reproduce the behavior of a manual gear shifter, it is necessary for the driver of the motor vehicle 110 to have previously installed a shifting lever 147 whereof the travel is constrained in an "H" pattern; installed or unfolded the clutch pedal 149; and replaced the wide brake pedal 150 used to emulate an automatic transmission with another, narrower brake pedal 150.

It will be noted that various additional functions may be provided to control the hydraulic transmission device 63, such as a proportional parking brake whereof the forward or backward incline imparts a low forward or backward movement speed to the motor vehicle 110 in proportion to said incline. The same strategy may be established using a knob, the incline of the lever in that case being replaced by the rotation of said knob in one direction or the other. Thus, said lever or said knob controlling the hydraulic transmission device 63 during parking maneuvers may advantageously eliminate skidding of the brakes or hydrokinetic torque converters and the seizing associated with the propulsion engine 123 caused by the transmissions according to the prior art.

According to another non-limiting example embodiment of the hydraulic motor pump 1 according to the invention shown in FIG. 32, the motor-pump management computer 70 may also be connected by wired, lighted or electromagnetic information transmission means (not shown) to at least one transmission configuration button or knob 153 and/or a transmission configuration screen 154 and/or a transmission configuration microphone 155 and/or a transmission configuration speaker 156 included by a driving station 152 shown in FIG. 32 comprised by the motor vehicle 110, said button or knob 153, said screen 154, said microphone 155 and said speaker 156 forming a man-machine interface between the driver of the motor vehicle 110 and the motor-pump management computer 70, said interface in particular allowing said driver to configure the hydraulic transmission device 63 of the motor vehicle 110.

According to one particular embodiment of the hydraulic motor-pump 1 according to the invention, the transmission configuration screen 154 is a touch screen with a software interface that allows the driver of the motor vehicle 110 to choose—when the hydraulic transmission device 63 is used to reproduce the behavior of an automatic transmission with torque converter or a continuously variable transmission—between an "economy" mode, a "comfort" mode or a "sport" mode.

In the case where only one torque converter automatic transmission is emulated by the hydraulic transmission device 63, the number and stepping of the transmission ratios of said transmission can be programmed by the driver using said screen 154.

Said man-machine interface can also allow the driver to choose between different transmission ratio steppings when the hydraulic transmission device 63 reproduces the operation of a manual transmission. Furthermore, as a non-limiting example, the intensity of the motor brake that is reproduced by the pressure loss exchanger-dissipater 126 that may be included by the hydraulic transmission device 63, the progressiveness of the clutch reproduced by said device 63 when the latter emulates the operation of a manual transmission, or the progressiveness of the torque converter when said device 63 reproduces the behavior of an automatic transmission with torque converter, may be configured by the driver of the motor vehicle 110. It will be noted that, according to one particular embodiment of the hydraulic transmission device 63, the motor brake may potentially be programmed by the driver of the motor vehicle 110 to adapt automatically to the steepness of the descents encountered during any travel. In that case, the motor-pump management computer 70 is for example coupled to an inclinometer and/or accelerometer.

Operation of the Invention

To illustrate the operation of the fixed or variable displacement hydraulic motor-pump (1), it has been chosen here to apply said motor-pump (1) to the hydraulic transmission device (63) connecting the drive motor (123) of the motor vehicle (110) to the drive wheels (124) of said vehicle (110). This example embodiment of the hydraulic motor-pump (1) is non-limiting and does not call into question the diversity and interest of its other applications in many industrial and/or household fields. According to said example, the second variable displacement hydraulic motor-pump (125) that is connected to the drive wheels (124) is identical to the variable displacement hydraulic motor-pump (1) that is connected to the drive motor (123). In that context, the operation of the fixed or variable displacement hydraulic motor-pump (1) is as follows:

The drive motor (123), which is—according to this example—a heat engine with reciprocating internal combustion spark ignition, rotates the motor-pump central rotor (3) using the central rotor power takeoff (4) to which its crankshaft (168) is connected. In so doing, said motor (123) rotates the motor-pump peripheral rotor (29), whereof the peripheral rotor angular synchro ring (42) is secured in rotation to the central rotor angular synchro ring (11) by the angular synchronizing pinion (12).

As shown in FIG. 6, the motor-pump peripheral rotor (29) may be kept off-centered relative to the motor-pump central rotor (3) by its displacement-varying servomotor (68). In that case, it will be understood that the hydraulic piston (13) performs a back-and-forth translational movement in the hydraulic cylinder (14). The input/output spool valve (43) being oriented in the motor-pump frame (2) as illustrated in FIG. 11, it will be understood that relative to FIG. 6, when the hydraulic piston (13) moves away from the motor-pump central rotor (3), the hydraulic cylinder (14) is connected by said spool valve (43) with the inner input/output duct (57), while when said piston (13) comes closer to said central rotor (3), said cylinder (14) is connected by said spool valve (43) with the outer input/output duct (58). Thus, the hydraulic piston (13) and its hydraulic cylinder (14) together make up a pump that sucks the motor-pump oil (114) into the inner input/output duct (57), then discharges it into the outer input/output duct (58).

According to one particular embodiment shown in FIGS. 3 to 7, 18 and 19, the motor-pump central rotor (3) can advantageously include three rows of hydraulic pistons (13) each including four hydraulic pistons (13) uniformly distributed on the periphery of said central rotor (3) and angularly offset by 90°. The second row of hydraulic pistons (13) is angularly offset by 30° relative to the first, while in the same direction, the third row is angularly offset by 30° relative to the second. Thus, the twelve hydraulic pistons (13) included by the motor-pump central rotor (3) are radially and uniformly distributed around said rotor (3) by a distribution angle of 30°. This configuration with twelve hydraulic pistons (13) guarantees a slightly pulsed operation of the hydraulic motor-pump (1).

It will be noted that the particular mechanical configuration of the fixed or variable displacement hydraulic motor-pump (1) according to the invention minimizes the friction losses and oil leaks from the motor-pump (114) that may be created during operation by said motor-pump (1). As a result of these first two features—which are among the major advantages of the hydraulic motor-pump (1) according to the invention—it is in particular possible for said motor-pump (1) to operate under very high peak pressures, for example approximately 2000 bar.

As can be deduced from FIG. 6, when the hydraulic piston (13) is subjected to the pressure of the motor-pump oil (114) contained in the hydraulic cylinder (14), it exerts a force on the brace (82) that is guided in the plunger guide (19) and whereof the strut (83) bears the plunger path of contact on tangential arm (21). Consequently, said path of contact (21) exerts a force of similar intensity on the tangential arm bearing face on plunger (23), said force being passed on by said tangential arm (22) to the tangential arm antifriction roller (28) via the tangential arm rolling track (26) included by said arm (22). Lastly, said roller (28) passes said force onto the peripheral rotor rolling track (33), such that the hydraulic pump jointly made up of the hydraulic piston (13) and hydraulic cylinder (14) is actuated by the force produced by said piston (13) on the motor-pump peripheral rotor (29), which reacts with a force of comparable intensity simultaneously produced by said cylinder (14) and the motor-pump oil (114) that it contains, on the motor-pump central rotor (3).

As shown in FIGS. 3 to 7, the particular mechanical configuration of the hydraulic motor-pump (1) according to the invention protects the hydraulic piston (13) from any radial force to which the pistons of the piston hydraulic pumps according to the prior art are generally subjected. Advantageously, the hydraulic motor-pump (1) according to the invention provides that said radial force is reacted in small part at the contact between the strut (83) and the plunger guide (19), and for the majority by the tangential arm (22) at its tangential arm axle (24) and in the longitudinal direction of said arm (22). Furthermore, the simultaneous rotation at the same speed of the motor-pump central rotor (3) and the motor pump peripheral rotor (29) as provided by the hydraulic motor-pump (1) according to the invention effectively limits the distance variations occurring between the point of contact of the tangential arm antifriction roller (28) on the peripheral rotor rolling track (33) included by the inner surface of the motor-pump peripheral rotor (29) on the one hand, and the point of contact of said antifriction roller (28) on the tangential arm rolling track (26) included by the tangential arm (22) on the other hand. Furthermore, said remaining distance variations result in a contact that is not sliding, but rolling, the tangential arm antifriction roller (28) rolling on the one hand on the tangential arm rolling track (26), and on the other hand on the peripheral rotor rolling track (33).

FIG. 6 also shows that the travel of the tangential arm antifriction roller (28) is limited on the one hand relative to the tangential arm rolling track (26) and on the other hand relative to the peripheral rotor rolling track (33), by the tangential arm roller rack (27) and by the peripheral rotor roller ring (34) respectively included by said tracks (26, 33), the roller pinion (87) comprised by said roller (28) simultaneously cooperating with said rack (27) and said ring (34) such that said roller (28) preserves an operating position as close as possible to that making it possible to minimize the friction losses of the hydraulic motor-pump (1) according to the invention.

FIGS. 5 and 6 show that the tangential arm antifriction roller (28) is always kept simultaneously pressed on the tangential arm rolling track (26) and the peripheral rotor rolling track (33) by the tangential arm return spring (25), such that said roller (28) cannot be thrown out of gear either from the tangential arm roller rack (27) or from the peripheral rotor roller ring (34), even when there is no pressure prevailing in the hydraulic cylinder (14).

It will be noted that in order for the tangential arm antifriction roller (28) always to remain correctly positioned relative to the tangential arm roller rack (27) when the displacement-varying servomotor (68) causes the motor-pump peripheral rotor (29) to be off-centered relative to the motor-pump central rotor (3), rephasing means (197) may be inserted between the peripheral rotor angular synchro ring (42) and the central rotor angular synchro ring (11).

As shown by FIGS. 20 and 21, said means (197) may be made up of an intermediate rephasing gear (198).

It is easy to deduce from said figures that—the motor-pump central rotor (3) not rotating—when the peripheral rotor stator (65) is rotated relative to the motor-pump frame (2) by the displacement-varying ring-driving pinion (108), the rephasing toothed wheels (199) of different diameters included by the intermediate rephasing gear (198) rotate in the same direction as the peripheral rotor stator (65), but at a higher speed than said stator (65). As a result, the peripheral rotor cylindrical casing (32) rotates in the direction opposite the direction of rotation of the peripheral rotor stator (65), since the small toothed rephasing wheel (199) meshes with the angular synchronizing pinion (12) while the large toothed rephasing wheel (199) meshes with the peripheral rotor angular synchro ring (42), the two said wheels (199) being secured to one another in rotation and being supported by a same rephasing axle (200) secured to the peripheral rotor stator (65).

It will be noted that according to this example embodiment of the rephasing means (197) according to the invention, the rotating transmission ratio established between the peripheral rotor stator (65) and the peripheral rotor cylindrical casing (32) is provided so that the tangential arm anti-friction roller (28) always remains in a position on the tangential arm rolling track (26) such that the antifriction function of the antifriction means (196) of which it is a component is performed appropriately.

As can be deduced from FIGS. 10 and 11, the input/output spool valve (43) contributes greatly to the proper operation of the hydraulic motor-pump (1) according to the invention in that the friction and motor-pump oil leaks (114) of the latter are drastically limited by said spool valve (43). According to the example used here to illustrate the operation of the hydraulic motor-pump (1) according to the invention, said spool valve (43) is—according to that illustrated in FIGS. 10 and 11—made up of a cylindrical stator (91) provided with an inner duct input/output angular manifold (44) arranged over slightly less than 180° and placed axially between two outer duct radial force equalizing grooves (90). Furthermore, said cylindrical stator (91) is also provided with an outer duct input/output angular manifold (89) arranged to be diametrically opposite the inner duct input/output angular manifold (44)—also over slightly less than 180°—and placed axially between two inner duct radial force equalizing grooves (45).

It will be noted that the outer surface of the cylindrical stator (91) that is subjected to the pressure of the motor-pump oil (114) contained by the inner duct input/output angular manifold (44) is equal to the total surface area subjected to said pressure from the two inner duct radial force equalizing grooves (45), such that said pressure does not generate any radial force on the cylindrical stator (91). This principle applies similarly to the outer duct input/output angular manifold (89).

It will be noted that the twelve central rotor input/output orifices (12) are each connected to one of the twelve hydraulic cylinders (14) included by the motor-pump central rotor (3), are angularly distributed every 30° in the stator cylinder (92) of said central rotor (3) inside which they emerge, and are axially aligned so as always to stay across from either the inner duct input/output angular manifold (44) or the outer duct input/output angular manifold (89) when the motor-pump central rotor (3) is rotating, with the exception of their brief passage across from an intermediate pressure zone (158) included by the cylindrical stator (91).

According to this example embodiment of the hydraulic motor-pump (1) according to the invention, the cylindrical stator (91), with the stator cylinder (92), produces sealing owing to the machining precision of said stator (91) and said cylinder (92), but also owing to the spool valve groove segments (46) included by said manifolds (44, 89) and said equalizing grooves (90, 45) and that are also included by the two axial sealing grooves (93) that are respectively arranged on the cylindrical stator (91) near each of its axial ends.

FIGS. 14 to 17 diagrammatically show a developed surface of the cylindrical stator (91) of a hydraulic motor-pump (1) according to the invention with fifteen hydraulic cylinders (14) angularly offset by 24°. It will be noted that the spool valve groove segments (46) define three pressure zones on the surface of said stator (91). The first is a high-pressure zone (159) made up of the inner duct input/output angular manifold (44) and inner duct radial force equalizing grooves (45), while the second is a low-pressure zone (160) made up of the outer duct input/output angular manifold (89) and outer duct radial force equalizing grooves (90), or conversely, depending on whether the motor-pump central rotor (3) is leading or following, and on direction in which the motor-pump peripheral rotor (29) is off-centered relative to said central rotor (3). The third zone is the intermediate pressure zone (158). FIGS. 14 to 17 being organized sequentially, they show that the angular sectors on which the inner duct input/output angular manifold (44) and the outer duct input/output angular manifold (89) are respectively arranged are calculated so that the two central rotor input/output orifices (16) can never have one straddling the high-pressure zone (159) and the intermediate pressure zone (158) while the other is straddling the low-pressure zone (160) and the intermediate pressure zone (158). However, said sequence also shows that two central rotor input/output orifices (16) can be found simultaneously straddling the high-pressure zone (159) and the intermediate pressure zone (158), or the low-pressure zone (160) and the intermediate pressure zone (158). This configuration allows the proper operation of the hydraulic motor-pump (1) according to the invention while limiting the leaks of motor-pump oil (114) at the input/output spool valve (43) because said oil (114) comprised in the high-pressure zone (159) is always separated from the low-pressure zone (160) and the outside of the cylindrical stator (91) by at least one spool valve groove segment (46).

According to the example used to illustrate the operation of the hydraulic motor-pump (1) according to the invention, the spool valve groove segment (46) is advantageously made up—as shown in FIGS. 12 and 13—of two half-segments (95) made from a same material billet. These two half-segments (95) each have a segment flank (94) kept in axial and/or tangential contact with the cylindrical stator (91) by a segment separator spring (48) on the one hand, and a segment sealing line (49) that is radially in contact with the motor-pump central rotor (3) to form sealing on the other hand. In this configuration, said line (49) is pressed on said rotor (3) both by the thrust exerted by the pressurized motor-pump oil (114) contained by the cylindrical stator (91) and by a segment groove bottom spring (47). FIG. 12 shows that the half-segments (95), due to their segment force reacting shoulder (50) that cooperates with the shoulder (162) arranged in the cylindrical stator (91), are provided so that the segment sealing line (49) that they have is axially practically aligned with the contact zone between the segment flank (94) and the cylindrical stator (91), such that the pressure of the motor-pump oil (114) only has a small spray surface (161) to exert its thrust on said half-segments (95).

The particular configuration described above and illustrated in FIGS. 12 and 13 of the spool valve groove segments (46) according to the invention guarantees good sealing between the cylindrical stator (91) and the stator cylinder (92), without generating excessive friction losses and wear, even when the hydraulic motor-pump (1) according to the invention operates at high pressures and/or with a low viscosity motor-pump oil (114). Such a configuration thus effectively participates in giving the motor-pump (1) a high output and durability irrespective of the displacement, the pressure, or the speed of rotation that characterize its operation.

FIGS. 3 and 4 show an embodiment of the hydraulic motor-pump (1) where the latter is equipped with two central rotor bearings (5) and two peripheral rotor bearings (36). Aside from the large diameter of said bearings (5, 36), the latter are potentially subjected to strong loads, since the hydraulic pistons (13) can exert a high-intensity radial force on the motor-pump peripheral rotor (29), said force being simultaneously exerted—by reaction—on the motor-pump central rotor (3). It can be deduced from this that the hydrodynamic bearings and the conventional ball bearings or roller bearings may be difficult to select for said bearings (5, 36), at least without raising serious output and/or mechanical strength problems. That is why the central rotor bearings (5) and the peripheral bearings (36) are designed—according to the non-limiting example embodiments described in FIGS. 3 and 4—to generate limited friction losses and to durably withstand either high pressures at high peripheral speeds, or high pressures at peripheral speeds so low that a sleeve bearing according to the prior art could not maintain the hydrodynamic lubrication rating essential for its operation. Below, the operation of one of the two peripheral rotor bearings (36) is described in more detail, the counterpart of the latter or the central rotor bearings (5) operating identically.

As particularly illustrated in FIG. 9, the peripheral rotor bearing (36) is made up of several peripheral rotor bearing rollers (37) that roll simultaneously on the peripheral rotor bearing inner track (38) and on the peripheral rotor bearing outer track (39). Approximately half of said rollers (37) unevenly distribute the radial load to which the peripheral rotor bearing (36) is subjected. It will be noted that said rollers (37) remain constantly equidistant from one another owing to the roller pinions (87) that they include at each of their ends, said pinions (87) cooperating on the one hand with the peripheral rotor bearing inner rings (40), and on the other hand with the peripheral rotor bearing outer rings (41). FIG. 9 shows that the maintenance in axial position of the motor-pump peripheral rotor (29) and the peripheral rotor bearing rollers (37) relative to the motor-pump frame (2) is ensured by the guide rail (85) included by the peripheral rotor bearing inner track (38) and the peripheral rotor bearing outer track (39), said rail (85) cooperating with the guide groove (86) included by the peripheral rotor bearing rollers (37).

The peripheral rotor bearing rollers (37) having a large diameter, the Hertz pressure that they exert on the peripheral rotor bearing inner track (38) and the peripheral rotor bearing outer track (39) may remain within the mechanical strength limitations of the materials typically used by one skilled in the art to produce the rolling bearings, whereas their maximum speed of rotation remains acceptable despite the large diameter of the peripheral rotor bearing (36) and the potentially high speed of rotation of the motor-pump peripheral rotor (29). Furthermore, in addition to guaranteeing that the peripheral rotor bearing rollers (37) remain constantly equidistant from one another, the gear system formed by the roller pinions (87), the peripheral rotor bearing inner rings (40) and the peripheral rotor bearing outer rings (41) imposes a trajectory on said rollers (37) perpendicular to the axis of rotation of the motor-pump peripheral rotor (29). These two functions, ordinarily entrusted to the rolling bearings according to the prior art with ball cages or rollers, are thus advantageously performed by said gear system, said cages being both less precise and less durable than said system because they regularly collide with the balls or rollers that they grip, and generate friction losses at their point of contact with said balls or said rollers.

Because the drive motor (123) rotates the motor-pump central rotor (3) using the central rotor power takeoff (4), the interest will be noted of having fixed duct covering ball joints (59) by which the outer input/output duct (58) is connected with the input/output spool valve (43) on the one hand, and with the motor-pump frame (2) on the other hand. In fact, as shown in FIGS. 10 and 11, said covering rolling bearings (59) include a covering rolling bearing step (105) in the shape of a truncated sphere that rests on a covering rolling bearing seat (64) and produces sealing on the one hand, and produces a rolling joint connection on the other hand. The latter allows the input/output spool valve (43) to follow any misalignments or offsets to which the motor-pump central rotor (3) may be subjected relative to the motor-pump frame (2), which in particular makes it possible to preserve a small operating play between the cylindrical stator (91) and the stator cylinder (92), said small play being necessary to guarantee good sealing between the stator (91) and said cylinder (92). In fact, this play being able to be only several microns, it may not be obtained solely through machining precision of the set of parts that make up the fixed or variable displacement hydraulic motor-pump (1) according to the invention.

Furthermore, said covering rolling bearings (59) react the traction force to which the outer input/output duct (58) is longitudinally subjected and which results from the pressure of the motor-pump oil (114) contained by said duct (58), while accepting the slight diameter variations of said duct (58) resulting from said pressure.

FIGS. 10 and 11 show an inner input/output duct (57) that includes two sliding covering half-ball joints (107) at each of its ends. Alternatively, said inner duct (57) may also include a fixed duct covering ball joint (59) cooperating with a sliding covering half-ball joint (107) on the motor-pump frame side (2), and two sliding covering half-ball joints (107) on the input/output spool valve side (43). This alternative embodiment allows said internal duct (57) to be axially secured to said frame (2). Irrespective of the chosen configuration, good sealing is ensured between the inner input/output duct (57) and the outer input/output duct (58) by the fixed duct covering ball joint(s) (59) and/or the sliding covering half-ball joints (107) both at the motor-pump frame (2) and at the input/output spool valve (43), irrespective of the positive or negative pressure difference between said inner duct (57) and said outer duct (58), and irrespective of the micro-movements occurring between said frame (2) and said spool valve (43).

The central rotor power takeoff (4) rotating under the action of the drive motor (123), it is possible to make the motor-pump peripheral rotor (29) more or less off-centered relative to the motor-pump central rotor (3). To that end, the motor-pump management computer (70) included by the hydraulic transmission device (63) of the motor vehicle (110) can power the servomotor rotary electric motor (30) shown in FIGS. 1 to 6, so that the latter causes the displacement-varying ring (109) secured to the peripheral rotor stator (65) by means of the displacement-varying ring driving pinion (108) to rotate in one direction or the other. It will be noted that the greater the off-centeredness of the motor-pump peripheral rotor (29) is, the greater the hydraulic motor-pump displacement (1) will be. If said off-centered state is zero, the displacement of said motor-pump (1) will be zero (FIG. 5). If the direction of said off-centering is reversed, the motor-pump oil flow rate (114) passing in the inner input/output duct (57) and the outer input/output duct (58) changes directions. These different possibilities cover all of the control and adjustment needs of the hydraulic transmission device (63).

FIG. 23 shows a block diagram of the hydraulic transmission device (63) according to one particular and non-limiting configuration, while FIGS. 28 to 31 show various examples of the implantation thereof in the motor vehicle (110) from among many other possibilities.

In the block diagram of FIG. 23, one can see that in addition to the variable displacement hydraulic motor-pump (1) connected to the drive motor (123) and the second variable displacement hydraulic motor-pump (125) connected to the drive wheels (124), the hydraulic transmission device (63) includes a high-pressure accumulator (71) and a low-pressure accumulator (118) able to supply motor-pump oil (114) to said variable displacement motor-pumps (1, 125) or to be supplied by the latter with motor-pump oil (114) via the introductory pressure accumulator valve (112) or the outer duct high-pressure accumulator valve (128) for the high-pressure accumulator (71), and via the inner duct low-pressure accumulator valve (129) or the outer duct low-pressure accumulator valve (130) for the low-pressure accumulator (118).

The block diagram of FIG. 23 also shows the accumulator locking valve (145) that may sealably isolate the high-pressure accumulator (71) if the hydraulic transmission device (63) remains unused for long periods of time. In any case, said locking valve (145) remains continuously open when the hydraulic transmission device (63) is used. It can be deduced from said diagram that if the motor-pump oil (114) leaks from said motor-pumps (1, 125) during their operation—for example at their input/output spool valve (43) or their hydraulic pistons (13)—said oil (114) is recovered by the motor-pump oil reservoir (121) in which it flows. These motor-pump oil (114) leaks involve resupplying by the low-pressure accumulator (118) of said motor-pumps (1, 125) with said oil (114) in an equivalent quantity via the two low-pressure accumulator check valves (143), the outlet of the first emerging in the inner input/output duct (57) of said motor-pumps (1, 125) while the outlet of the second emerges in the outer input/output duct (58) included by said motor pumps (1, 125). In the diagram of FIG. 23, the hydraulic motor-pump (1) according to the invention provides that the motor-pump oil (114) that has leaked is periodically reintroduced in an equivalent quantity into the low-pressure accumulator (118) by the low-pressure pump (119) at the request of the motor-pump management computer (70), not shown in said diagram, said computer (70) being able—to that end—to power the low-pressure motor-pump (120).

It will be noted that, according to the particular embodiment of the hydraulic motor-pump (1) according to the invention as shown in the block diagram of FIG. 23, the hydraulic transmission device (63) includes a pressure loss exchanger-dissipater (126) that may be connected with the variable displacement hydraulic motor-pump (1) connected to the drive motor (123) or with the second hydraulic motor-pump (125) connected to the drive wheels (124) via the inner duct exchanger-dissipater valve (131) or the outer duct exchanger-dissipater valve (132).

It is also shown that accessories (165)—here shown by an air conditioning compressor (164) and an electric alternator (163)—may be rotated by their secondary hydraulic motor (127) when the latter is connected with the inner input/output duct (57) by the corresponding inner duct secondary motor valve (133).

It is possible—based on the block diagram of FIG. 23—to provide a non-limiting description of the main operating modes of the hydraulic transmission device (63) when it is used to propel a motor vehicle (110).

The motor vehicle (110) being stopped and its drive motor (123) idling, the displacement of the variable displacement hydraulic motor-pump (1) connected to the drive motor (123) is zero (FIG. 5), whereas for example, the displacement of the second hydraulic motor-pump (125) connected to the drive wheels (124) is maximal (FIG. 6).

Figure 28:
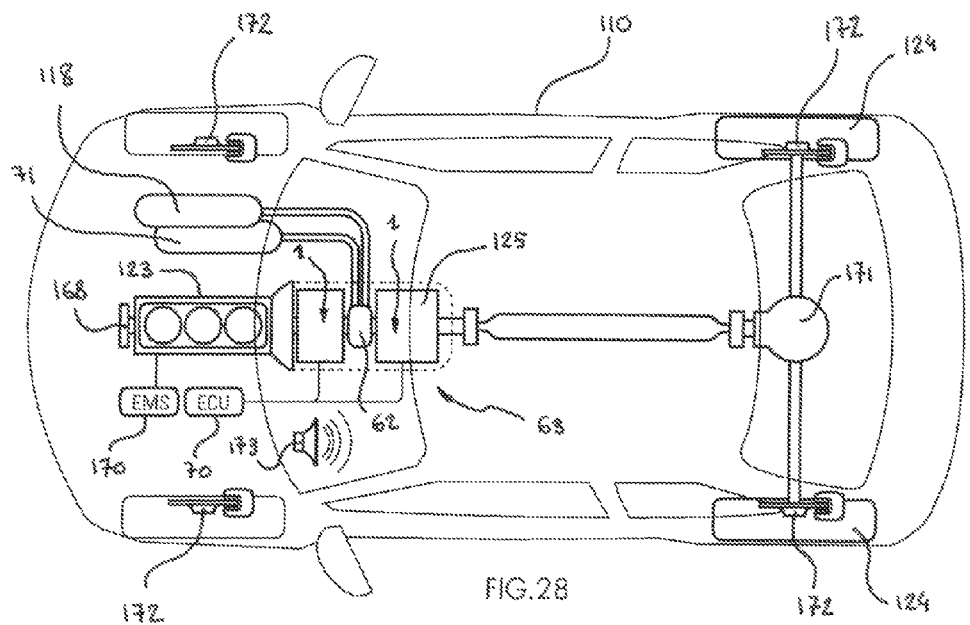
FIG. 28 is a diagrammatic view of a motor vehicle equipped on the one hand with a reciprocating internal combustion engine mounted longitudinally, and on the other hand with a hydraulic transmission device that forms—with a second fixed or variable displacement hydraulic motor-pump—the fixed or variable displacement hydraulic motor-pump according to the invention, said second motor-pump driving the rear drive wheels of said vehicle via a transmission shaft and a differential axle assembly.

If the driver of the motor vehicle (110) partially pushes down the accelerator pedal (151), the management computer of the drive motor (170) that was shown in FIGS. 28 to 31 increases the load and/or speed of the drive motor (123) whereas at the same time, the motor-pump management computer (70) controls the displacement-varying servomotor (68) of the hydraulic motor-pump (1) connected to the drive motor (123) so as to give a displacement to said motor-pump (1), then gradually increase said displacement. Rotated by the drive motor (123), the hydraulic motor-pump (1) operates in "pump" mode and sucks up motor-pump oil (114) at a low pressure in the outer input/output duct (58) to next discharge it under high pressure in the inner input/output duct (57), while the second hydraulic motor-pump (125) operates in "motor" mode to rotate the drive wheels (124) by admitting said oil (114) under high pressure from the inner input/output duct (57) to discharge it under low pressure in the outer input/output duct (58). This results in transmitting the mechanical work produced by the drive motor (123) to the drive wheels (124), the motor vehicle (110) gradually being set in motion while at each moment, the ratio between the displacement of the hydraulic motor-pump (1) connected to the drive motor (123) on the one hand, and the displacement of the second hydraulic motor-pump (125) on the other hand, determines the transmission ratio between said motor (123) and the drive wheels (124), corrected for example for the transmission ratio of a differential axle assembly (171) inserted between said second motor-pump (125) and said wheels (124) as shown in FIG. 28.

When the driver of the motor vehicle (110) is performing an ordinary journey, the motor-pump management computer (70) simultaneously controls the displacement of the hydraulic motor-pump (1) connected to the drive motor (123) and that of the second hydraulic motor-pump (125) such that on the one hand, the energy output of said motor (123) is always as high as possible—by forcing said motor (123) to operate as close as possible to the speed and load points where its actual specific consumption is lowest—and on the other hand, the energy output of the hydraulic transmission device (63) is also as high as possible, in particular by finding the best compromise between operating pressure and flow rate of said motor-pumps (1, 125), so as to minimize the total energy losses created by the leaks and/or friction and/or pressure losses inevitably generated by said motor-pumps (1, 125).

It will be understood that in this context, the management computer of the drive motor (127) and the motor-pump management computer (70) shown in FIGS. 28 to 31 cooperate so that the combined output of the drive motor (123) and the hydraulic transmission device (63) is as high as possible, and the fuel consumption of the motor vehicle (110) is as low as possible while providing the same service. It will be noted that the backward movement of the motor vehicle (110) may be obtained, for example, by reversing the direction of the off-center of the motor-pump peripheral rotor (29) of the second hydraulic motor-pump (125), relative to its motor-pump central rotor (3).

If the driver pushes the accelerator pedal (151) of the motor vehicle (110) all the way down, the management computer of the drive motor (170) immediately increases the load of the drive motor (123) to its maximum, while the motor-pump management computer (70) determines, for the hydraulic transmission device (63), a transmission ratio between said motor (123) and the drive wheels (124) such that said motor (123) is at its maximum power rating. Immediately afterward, or even at the same time, the motor-pump management computer (70) causes the acceleration of the motor vehicle (110) by gradually reducing the transmission ratio of the hydraulic transmission device (63) while using the full power of the drive motor (123). This is obtained by controlling the displacement of the hydraulic motor-pump (1) and/or that of the second hydraulic motor-pump (125). Due to the permanent maximum power delivered by the drive motor (123) during this acceleration, and due to the lack of discontinuity in the traction of the motor vehicle (110), the actual acceleration of said vehicle (110) is sharper than if the latter were equipped with a discrete ratio transmission, whether a manual or automated transmission, with single or dual clutch, or an automatic transmission with planetary gear sets coupled to the drive motor (123) by a disc clutch or a hyperkinetic converter.

When the driver wishes to slow the speed of the motor vehicle (110), he releases the accelerator pedal (151) thereof shown in FIG. 32. The hydraulic transmission device (63) can then recover part of the kinetic energy from said vehicle (110). To that end, the management computer of the drive motor (170) for example immediately causes the drive motor (123) to idle, while the motor-pump management computer (70) controls the displacement-varying servomotor (68) of the hydraulic motor-pump (1) connected to said motor (123) so that the displacement of said motor-pump (1) is zero, as shown in FIG. 5. In parallel, the motor-pump management computer (70) simultaneously opens the inner duct low-pressure accumulator valve (129) and the outer duct high-pressure accumulator valve (128) such that the second hydraulic motor-pump (125) operates in "pump" mode, being driven to that end by the drive wheels (124), and sucks up motor-pump oil (114) at a low pressure in the inner input/output duct (57), then discharges said oil (114) under high pressure into the outer input/output duct (58). In so doing, said second motor-pump (125) transfers the motor-pump oil (114) from the low-pressure accumulator (118) to the high-pressure accumulator (71).

Consequently, the pressure of the motor-pump oil (114) contained in the low-pressure accumulator (118) decreases, while the pressure of the motor-pump oil (114) contained in high-pressure accumulator (71) increases due to the respective stiffness of said accumulators (118, 71), which results from the stiffness of the nitrogen contained in their gas compartment (116). According to this example embodiment, the pressure in the low-pressure accumulator (118) for example varies between three bar, when the accumulator separator piston (72) of said accumulator (118) is at the bottom dead center, and six bar when said piston (72) is at the top dead center, whereas regarding the high-pressure accumulator (71), these pressure values may—as a non-limiting example—respectively be one thousand and two thousand bar. It will be noted that during the deceleration of the motor vehicle (110), the motor-pump management computer (70) continuously adapts the displacement of the second hydraulic motor-pump (125) so as on the one hand to adjust the intensity of said deceleration, and on the other hand, to account for the stiffness of the low-pressure accumulator (118) and that of the high-pressure accumulator (71). Thus, during a constant-intensity deceleration, the pressure of the motor-pump oil (114) at the output of the second hydraulic motor-pump (125) tends to increase with the distance traveled by the motor vehicle (110), whereas the pressure of the motor-pump oil (114) at the input of said second motor-pump (125) tends to decrease.

It will be noted that other than releasing the accelerator pedal (151) of the motor vehicle (110) to slow the latter, the driver of said vehicle (110) may also press on the brake pedal (150) of said vehicle (110), shown in FIG. 32, so that the deceleration of the latter is sharper. In that case, the hydraulic transmission device (63) may completely or partially replace the disc brakes (172) of said vehicle (110), which have been shown in FIGS. 28 to 31, so that at least part of the kinetic energy of said vehicle (110) is not dissipated in the form of heat by said brakes (172), but stored in the high-pressure accumulator (71) in the form, for example, of compressed nitrogen. In that context, at least one sensor (not shown) may provide information to the motor-pump management computer (70) on the position of the brake pedal (150) and/or on the force that the driver is exerting on said pedal (150), such that if the power of the second hydraulic motor-pump (125) and the storage capacity of motor-pump oil (114) of the high-pressure accumulator (71) allow it, the motor vehicle (110) is, as a priority, braked by the second motor-pump (125) before said brakes (172) intervene additionally or to replace the braking done by said second motor-pump (125). In any case, this configuration requires a so-called "smart" brake pedal (150) operating using a principle similar to that of the so-called "decoupled brake pedal" concept jointly developed by the companies "Renault" and "Bosch" for the "Zoe" electric vehicle produced by "Renault".

It will be noted that the braking of the motor vehicle (110) is not the only source of mechanical work that makes it possible to store energy in the high-pressure accumulator (71). In fact, the mechanical work produced by the drive motor (123) can be stored similarly. For example, when the motor vehicle (110) is traveling, part of the motor-pump oil (114) flow leaving the hydraulic motor-pump (1) connected to said motor (123) can drive the drive wheels (124) of said vehicle (110), whereas another part can be stored in the high-pressure accumulator (71). To that end, the motor-pump management computer (70) simultaneously opens the outer duct low-pressure accumulator valve (130) and the inner duct high-pressure accumulator valve (112), and controls both the displacement of the hydraulic motor-pump (1) connected to said motor (123) and that of the second hydraulic motor-pump (125), so as to be able to propel the motor-vehicle (110) as desired by the driver of said vehicle (110) on the one hand, and to fill the high-pressure accumulator (71) taking the stiffness of the nitrogen contained by the gas compartment (116) into account on the other hand.

This strategy makes it possible, in certain cases, to operate the drive motor (123) under a higher load than necessary to propel the motor vehicle (110) such that said motor (123) develops a better output. The excess work produced by said motor (123) is thus stored in the high-pressure accumulator (71), which may later supply the second hydraulic motor-pump (125) with motor-pump oil (114) to propel said vehicle (110) without it being necessary to use the drive motor (123). Furthermore, it is possible to load the drive motor (123) intermittently to move the motor vehicle (110) by alternating between short operating phases of said motor (123) at maximum output and a relatively high load, during which the motor (123) ensures both the propulsion of said vehicle (110) and the filling of the high-pressure accumulator (71), and idle phases of said motor (123), during which only said accumulator (71) supplies the energy necessary to propel said vehicle (110) via the second hydraulic motor-pump (125). According to this last strategy, the motor vehicle (110) may be equipped with an acoustic transmitter (173) as illustrated in FIGS. 28 to 30, which reproduces—through a suitable mixture of the acoustic waves that are propagated in the passenger compartment of the motor vehicle (110)—the noise from the drive motor (123) operating continuously, so as to offer the passengers of said vehicle (110) the best possible comfort. It will be noted that the high-pressure accumulator (71) may also be filled with motor-pump oil (114) by the drive motor (123) when the motor vehicle (110) is stopped.

Once the motor vehicle (110) is brought to a reduced speed or stopped, the kinetic energy of the motor vehicle (110) and/or the mechanical work produced by the drive motor (123) stored in the form of pressurized nitrogen in the high-pressure accumulator (71) can be reused to fulfill various strategies. For example, it is possible to move the motor vehicle (110) over several meters or tens of meters without using the drive motor (123) if the latter is stopped. To that end, the motor-pump management computer (70) simultaneously opens the outer duct low-pressure accumulator valve (130) and the inner duct high-pressure accumulator valve (112) and adjusts the displacement of the second hydraulic motor-pump (125) to meet the movement needs of the motor vehicle (110), while giving the displacement of the hydraulic motor-pump (1) connected to said motor (123) a zero value (FIG. 5). It is also possible to start the drive motor (123) without using an electric starter. To that end, the motor-pump management computer (70) simultaneously opens the inner duct low-pressure accumulator valve (129) and the outer duct high-pressure accumulator valve (128) and adjusts the displacement of the hydraulic motor-pump (1) connected to said motor (123) to just what is necessary to start said motor (123) while giving a zero value to the displacement of the second hydraulic motor-pump (125) (FIG. 5).

Furthermore, to propel the motor vehicle (110), the energy stored in the high-pressure accumulator (71) may reinforce that produced in mechanical form by the drive motor (123). This strategy may be justified in case of very strong acceleration of the motor vehicle (110), where it is advantageous to add the power of said high-pressure accumulator (71) to that of said motor (123). To that end, the management computer of the drive motor (170) having increased the load of the drive motor (123) to its maximum and said motor (123) being placed at its maximum power rating, the motor-pump management computer (70) simultaneously opens the outer duct low-pressure accumulator valve (130) and the inner duct high-pressure accumulator valve (112), such that the high-pressure accumulator (71) delivers a motor-pump oil flow rate (114) that is added to that produced by the hydraulic motor-pump (1) connected to said motor (123). The sum of the two flow rates is thus converted into mechanical work by the second hydraulic motor-pump (125), the displacement of which is adjusted accordingly by the motor-pump management computer (70), said work being transmitted to the drive wheels (124) of the motor vehicle (110).

The pressure loss exchanger-dissipater (126) shown in the block diagram of FIG. 23 also participates in optimizing the energy balance of the motor vehicle (110), in addition to potentially contributing to reducing the cost thereof and the maintenance of the disc brakes (172) and improving driving comfort for the driver.

Said exchanger-dissipater (126) may for example be used to accelerate the temperature increase of the drive motor (123). To that end, whether or not the motor vehicle (110) is moving, the management computer of the drive motor (170) increases the load and/or speed of said motor (123), while at the same time, the motor-pump management computer (70) opens the inner duct exchanger-dissipater valve (131), which results in forcing the motor-pump oil (114) expelled into the inner input/output duct (57) by the hydraulic motor-pump (1) connected to the drive motor (123) to pass into the exchanger-dissipater inner duct (135) and into the throats (166), the latter cooperating in creating a pressure drop. The additional load imposed by the management computer of the drive motor (170) on the drive motor (123) is thus converted into an additional pressurized motor-pump oil flow (114) that is converted into heat inside the exchanger-dissipater (126) under the effect of the pressure loss constituted by the exchanger-dissipater inner ducts (135) and the throats (166), before returning—via the dissipater check valve (169)—to the intake of the hydraulic motor-pump (1) connected to the drive motor (123), to be sucked back up therein. The motor-pump oil (114) having heated up while passing through the exchanger-dissipater inner ducts (135) and the throats (166), said oil (114) next transfers part of its heat to water contained in a cooling circuit included by the drive motor (123), via the outer dissipater heat exchange surface (136). Said water heats rapidly while the lubricating oil of the drive motor (123) also fluidizes rapidly, which limits the friction losses and heat losses generated by said motor (123).

Furthermore, the load of said motor (123) being high, the temperature of its exhaust gases is also high, which allows a rapid temperature increase of its three-way catalytic converter so as to potentially reduce the quantity of pollutants emitted by said motor (123). Furthermore, the passenger compartment for the motor vehicle (110) propelled by said motor (123) is rapidly heated in the wintertime, which promotes the comfort of said passengers.

To slow or even stop the motor vehicle (110), the pressure loss exchanger-dissipater (126) may advantageously replace the motor brake that may be produced by the drive motor (123) when it is driven by the drive wheels (124) and/or the disc brakes (172), particularly when the high-pressure accumulator (71) can no longer admit pressurized motor-pump oil (114) because it is full.

To that end, when the driver releases the accelerator pedal (151) or pushes on the brake pedal (150), the management computer of the drive motor (170) for example causes the drive motor (123) to idle, while the motor-pump management computer (70) places the displacement of the hydraulic motor-pump (1) connected to said motor (123) at a zero value (FIG. 5). In parallel, the motor-pump management computer (70) opens the outer duct exchanger-dissipater valve (132) such that the second hydraulic motor-pump (125) operates in "pump" mode, being driven to that end by the drive wheels (124), and sucks motor-pump oil (114) at a low pressure into the inner input/output duct (57), then discharges said oil (114) under high pressure at the inlet of the pressure loss exchanger-dissipater (126). Said oil (114) passes through, then leaves said exchanger-dissipater (126) after having been heated, then cooled therein, then returns into the inner input/output duct (57) via the corresponding dissipater check valve (169) to be sucked therein again by the second hydraulic motor-pump (125).

The strategy described above makes it possible to use the kinetic and/or gravitational energy of the motor vehicle (110) to effectively heat the motor and/or the passenger compartment. This strategy further makes it possible to limit the wear and heating of the disc brakes (172), for example during long descents, and optionally to provide smaller disc brakes (172).

Figure 31:
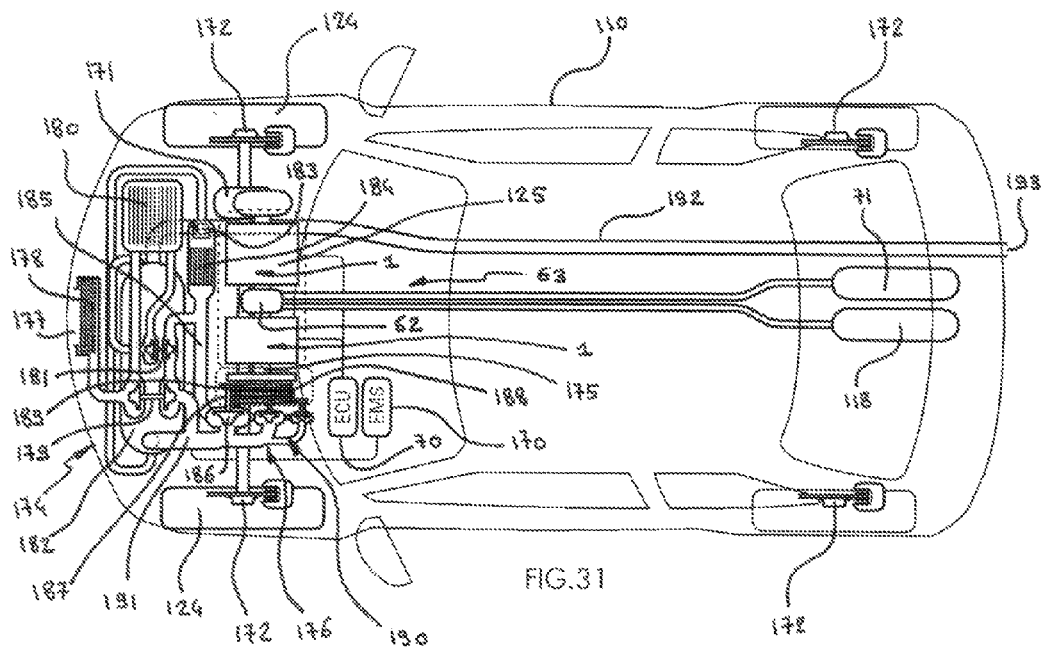
FIG. 31 is a diagrammatic view of a motor vehicle equipped on the one hand with a low-pressure internal combustion turbine engine according to the configuration described in French patent application no. FR 12 59827 belonging to the applicant, and on the other hand, a hydraulic transmission device that forms—with a second fixed or variable displacement hydraulic motor-pump—the fixed or variable displacement hydraulic motor-pump according to the invention, said second motor-pump driving the front drive wheels of said vehicle via a reducing gear, a differential axle assembly, and transmission shafts.

FIG. 31 illustrates one of the most remarkable applications of the hydraulic transmission device (63), which consists of coupling it with an internal combustion low-pressure turbine engine (174) according to the configuration described in French patent application no. FR 12 59827 belonging to the applicant, said turbine engine (174) then making up the drive motor (123) instead and in place of the reciprocating controlled ignition internal combustion heat engine previously used to illustrate the operation of the fixed or variable displacement hydraulic motor-pump (1) according to the invention.

According to this application, the multi-turbine reducing gear power output shaft (175) of the multi-turbine group (176) included by the internal combustion low-pressure turbine engine (174) is connected to the central rotor power takeoff (4) to be able to rotate the motor-pump central rotor (3) of the variable displacement hydraulic motor-pump (1) comprised by the hydraulic transmission device (63). FIG. 31 shows the main components of the internal combustion low-pressure turbine engine (174) that are described and/or claimed in French patent application no. FR 12 59827, which are a turbine engine air intake mouth (177) and its turbine engine intake air filter (178), a low-pressure turbocharger (179), an intermediate turbocharger cooler (180), a high-pressure turbocharger (181), an air/regenerative countercurrent mixture exchanger (182), a continuous combustion chamber (183), a pollutant post-treatment catalyst (184), an expansion power turbine gas-vapor intake duct (185), expansion drive turbines (186) that are part of the multi-turbine group (176) and whereof the expansion drive turbine shaft (187) drives a multi-turbine reducing gear ring (188) via a turbine driving pinion (189), an expansion turbine exhaust manifold (190), an expansion power turbine gas-vapor exhaust duct (191), an exhaust line (192), and an exhaust line outlet (193).

In this context, the hydraulic transmission device (63) makes it possible to make the internal combustion low-pressure turbine engine (174) compatible with driving of the motor vehicle (110). In fact, said device (63) makes it possible to store, in the high-pressure accumulator (71), a large part of the kinetic energy from the expansion drive turbines (186) during the speed variations of the latter, and to accommodate the response time of said turbines (186) by using or not using the energy stored in said accumulator (71) to restart the motor vehicle (110) without consequences for the driving comfort of said vehicle (110). Furthermore, the particularities specific to French patent application no. FR 12 59827 and those of the fixed or variable displacement hydraulic motor-pump (1) according to the invention make it possible to accommodate the relatively low speed of rotation range over which the expansion drive turbines (186) deliver their best output. In fact, this particularity is managed on the one hand by the multi-turbine group (176), which provides a gear reduction ratio between each expansion drive turbine (186), and the multi-turbine reducing gear power output shaft (175) adapted to each said turbine (186), said ratio being determined by the multi-turbine reducing gear ring (188) and the turbine driving pinion (29) associated with each said turbine (186), and on the other hand, by the hydraulic transmission device (63) that may, at any time, transmit the power produced by the expansion drive turbine(s) (186) to the drive wheels (124) irrespective of the speed of the latter relative to that of the or said turbine(s) (186).

The characteristics of the internal combustion low-pressure turbine engine (174) according to French patent application no. FR 12 59827 combined with those of the hydraulic transmission device (63) as set out by the fixed or variable displacement hydraulic motor-pump (1) according to the invention thus make it possible to produce motor vehicles (110) with a very low fuel consumption.

FIGS. 25 to 27 illustrate the operation of the high-pressure accumulator (71) and/or the low-pressure accumulator (118) whereof the oil compartment (117) is arranged so as to be able to store the motor-pump oil (114) under a very high pressure, for example 2000 bar, in complete safety. It will be noted that said accumulators (71, 118) can never be completely emptied of their oil, which is not novel in itself. However, the fixed or variable displacement hydraulic motor-pump (1) according to the invention provides that when the accumulator separator piston (72)—due to the emptying of the motor-pump oil (114) of the high-pressure accumulator (71) and/or the low-pressure accumulator (118)—has come into contact with the high stiffness spring plunger (77) as shown in FIG. 26, then continued its travel toward the accumulator closing valve (73), said piston (72) has next pressed said gate (73) on the accumulator gate seat (74) using a high stiffness resisting spring (76) inserted between said plunger (77) and said gate (73). This particular arrangement results in closing of the oil compartment (117) when the latter is largely emptied of the motor-pump oil (114) that it contains while preserving a small pressure difference between said oil compartment (117) and the gas compartment (116), such that the accumulator separator piston (72) never undergoes any strong pressure differential. This particularity makes it possible to produce said piston (72) using a light material with a simple accumulator piston joint (122), without incurring any risk of destruction of said piston (72) or risk of significant motor-pump oil leaks (114) between the oil compartment (117) and the gas compartment (116).

The possibilities of the fixed or variable displacement hydraulic motor-pump (1) according to the invention are not limited to the applications described above, and it must furthermore be understood that the preceding description has only been provided as an example and in no way limits the field of said invention, and it would not be beyond the scope of said invention to replace the described embodiment details with any other equivalent means.

The invention claimed is:
1. A fixed or variable displacement hydraulic motor-pump, characterized in that it comprises:
   at least one motor-pump central rotor (3) that includes a central rotor power take-off (4) and that is housed on or in a motor-pump frame (2), said rotor (3) being able to rotate in at least one central rotor (5) comprised by said frame (2) while remaining in as sealed contact as possible with at least one input/output spool valve (43) kept approximately stationary relative to said frame (2), said spool valve (43) being able to connect at least one hydraulic cylinder (14) arranged radially or tangentially in said rotor (3) with at least one internal input/output duct (57) and at least one external input/output duct (58) via an internal input/output central rotor channel (15) and an input/output central rotor orifice (16) arranged in the motor-pump central rotor (3), respectively, one of the ends of said ducts (57, 58) being secured directly or indirectly and sealably in the motor-pump frame (2), while the other end of said ducts (57, 58) is sealably secured in the input/output spool valve (43);
   at least one hydraulic piston (13) able to move in translation in the hydraulic cylinder (14) and able to push a guided hydraulic piston plunger (18) or able to be pushed by the latter, said plunger (18) being guided in translation by a plunger guide (19) arranged radially or tangentially in the motor-pump central rotor (3);
   at least one tangential arm (22) whereof one end is articulated in the motor-pump central rotor (3) while the other end includes a tangential arm bearing face on plunger (23) that can exert a force on a plunger path of contact on the tangential arm (21) included by the guided hydraulic piston plunger (18), the direction of said force being approximately tangential to the axis of rotation of said arm (22);
   at least one motor-pump peripheral rotor (29) made up of at least one cylindrical peripheral rotor casing (32) whereof at least one end ends with a peripheral rotor flange (35), said peripheral rotor (29) being able to rotate in at least one peripheral rotor bearing (36) supported by a peripheral rotor stator (65) that is directly or indirectly secured to the motor-pump frame (2), the motor-pump central rotor (3) being completely or partially housed inside said peripheral rotor (29);
   at least anti-friction means (196) included by the tangential arm (22) on its face situated opposite the tangential arm bearing face on plunger (23), said means (196) bearing on the inner surface of the cylindrical peripheral rotor casing (32).

2. The fixed or variable displacement hydraulic motor-pump according to claim 1, characterized in that the motor-pump peripheral rotor (29) is forced to rotate at the same speed as the motor-pump central rotor (3) by an angular peripheral rotor synchro ring (42) secured in rotation to a central rotor angular synchro ring (11) included by the motor-pump central rotor (3) by at least one angular synchronizing pinion (12) rotating around at least one angular synchronizing pinion shaft (81) comprised by the motor-pump frame (2).

3. The fixed or variable displacement hydraulic motor-pump according to claim 2, characterized in that the anti-friction means (196) are made up of at least one tangential arm antifriction roller (28) that can roll on the one hand on a tangential arm rolling track (26) included by the tangential arm (22) on its face situated opposite the tangential arm bearing face on plunger (23), and on the other hand on a peripheral rotor rolling track (33) included by the inner surface of the peripheral rotor cylindrical casing (32), the travel of said roller (28) being limited simultaneously relative to the tangential arm rolling track (26) and the peripheral rotor rolling track (33) by at least one tangential arm roller rack (27) included by the tangential arm rolling track (26) and by at least one peripheral rotor roller ring (34) included by the peripheral rolling track (33), said rack (27) and said ring (34) simultaneously cooperating with at least one roller pinion (87) included by said roller (28).

4. The fixed or variable displacement hydraulic motor-pump according to claim 1, characterized in that the anti-friction means (196) are made up of at least one tangential arm friction pad (194) included by the tangential arm (22) on its face situated opposite the tangential arm bearing face on plunger (23), said pad (194) being able to come into contact with a peripheral rotor friction track (195) included by the inner surface of the peripheral rotor cylindrical casing (32).

5. The fixed or variable displacement hydraulic motor-pump according to claim 1, characterized in that the hydraulic piston (13) comprises a plunger ball joint on hydraulic piston (17) on its circular face that is furthest from the motor-pump central rotor (3), said ball joint (17) being made up of a hollow or raised truncated sphere that cooperates with a hydraulic piston ball joint on plunger (20) comprised by the hydraulic piston guided plunger (18), said ball joint (20) also being made up of a hollow or raised truncated sphere shape, while the two truncated sphere shapes are complementary and constitute a ball joint connection between said piston (13) and said plunger (18).

6. The fixed or variable displacement hydraulic motor-pump according to claim 1, characterized in that the hydraulic piston guided plunger (18) comprises a brace (82) placed in the extension of the hydraulic piston (13), and a strut (83) mounted secured to said brace (82) and perpendicular to the latter, said strut (83) bearing the plunger path of contact on tangential arm (21), while each of its two ends can slide in the plunger guide (19).

7. The fixed or variable displacement hydraulic motor-pump according to claim 1, characterized in that the motor-pump central rotor (3) includes a cylindrical axle housing (84) in which a tangential arm axle (24) is housed whereas the tangential arm (22) is passed through by said axle (24) so as to be articulated in the motor-pump central rotor (3).

8. The fixed or variable displacement hydraulic motor-pump according to claim 1, characterized in that the motor-pump central rotor (3) includes a tangential arm return spring (25) that bears on the one hand on said rotor (3) and on the other hand on the tangential arm (22).

9. The fixed or variable displacement hydraulic motor-pump according to claim 3, characterized in that the peripheral rotor rolling track (33) includes at least one hollow or protruding guide rail (85) that cooperates with at least one hollow or protruding guide groove (86) included by the tangential arm antifriction roller (28).

10. The fixed or variable displacement hydraulic motor-pump according to claim 1, characterized in that the central rotor bearing (5) comprises an inner central rotor bearing track (7) provided with at least one central rotor inner bearing ring (9), said track (7) being secured to the motor-pump central rotor (3), on the one hand, and an outer central rotor bearing track (8) provided with at least one central rotor outer bearing ring (10), said track (8) being secured to the motor-pump frame (2), on the other hand, whereas at least three central rotor bearing rollers (6) can simultaneously roll on the central rotor inner bearing track (7) and on the central rotor outer bearing track (8) and remain at a constant distance from each other owing to at least one roller pinion (87) included by each central rotor bearing roller (6) and which cooperates with said inner (9) and outer (10) rings.

11. The fixed or variable displacement hydraulic motor-pump according to claim 10, characterized in that the central rotor inner bearing track (7) and/or the central rotor outer bearing track (8) includes at least one hollow or protruding guide rail (85) that cooperates with at least one hollow or protruding guide groove (86) included by the central rotor bearing rollers (6).

12. The fixed or variable displacement hydraulic motor-pump according to claim 1, characterized in that the peripheral rotor bearing (36) comprises a peripheral rotor inner bearing track (38) provided with at least one peripheral rotor inner bearing ring (40), said track (38) being secured to the motor-pump peripheral rotor (29) on the one hand, and a peripheral rotor outer bearing track (39) provided with at least one peripheral rotor outer bearing ring (41), said track (39) being secured to the peripheral rotor stator (65), on the other hand, whereas at least three peripheral rotor bearing rollers (37) can roll simultaneously on the peripheral rotor inner bearing track (38) and the peripheral rotor outer bearing track (39) and remain at a constant distance from each other owing to at least one roller pinion (87) included by each peripheral rotor bearing roller (37) and which cooperates with said inner (40) and outer (41) rings.

13. The fixed or variable displacement hydraulic motor-pump according to claim 12, characterized in that the peripheral rotor inner bearing track (38) and/or the peripheral rotor outer bearing track (39) includes at least one hollow or protruding guide rail (85) that cooperates with at least one hollow protruding guide groove (86) included by the peripheral rotor bearing rollers (37).

14. The fixed or variable displacement hydraulic motor-pump according to claim 1, characterized in that the input/output spool valve (43) is prevented from rotating with the motor-pump central rotor (3) and is kept in rotation relative to the motor-pump frame (2) by at least one lug or tie rod directly or indirectly fastened to the motor-pump frame (2).

15. The fixed or variable displacement hydraulic motor-pump according to claim 1, characterized in that the input/output spool valve (43) is a cylindrical stator (91) housed with slight play in a stator cylinder (92) arranged at the center of the motor-pump central rotor (3) and coaxially to the latter, said stator (91) containing an inner duct chamber (55) that communicates on the one hand with the inner input/output duct (57), and on the other hand with an inner duct angular input/output manifold (44) included by said stator (91) in its periphery via an inner input/output spool valve channel (53), whereas said stator (91) also contains an outer duct chamber (56) that communicates on the one hand with the outer input/output duct (58), and on the other hand with an outer duct angular input/output manifold (89) also included by said stator (91) in its periphery via another inner input/output spool valve channel (53).

16. The fixed or variable displacement hydraulic motor-pump according to claim 15, characterized in that the cylindrical stator (91) includes, next to the inner duct input/output angular manifold (44), at least one outer duct radial force equalizing groove (90) that communicates with the outer duct chamber (56) via a spool valve equalizing inner channel (54) whereas said stator (91) also includes at least one inner duct radial force equalizing groove (45) that communicates with the inner duct chamber (55) via another spool valve equalizing inner channel (54), said groove (45) being situated next to the outer duct angular input/output manifold (89).

17. The fixed or variable displacement hydraulic motor-pump according to claim 15, characterized in that the cylindrical stator (91) includes an axial sealing groove (93) near at least one of its axial ends.

18. The fixed or variable displacement hydraulic motor-pump according to claim 1, characterized in that the input/output spool valve (43) is an axial stator (96) made up of a distributing flange (97) and an equalizing flange (98) placed axially on either side of the motor-pump central rotor (3) respectively across from a distribution face (103) and an equalizing face (104) formed on said rotor (3), said flanges (97, 98) being mechanically connected to each other via a central axial stator hub (99) that axially passes through said central rotor (3) via a stator cylinder (92) arranged at the center of said central rotor (3) and coaxially thereto, said stator (96) containing an inner duct chamber (55) that communicates on the one hand with the inner input/output duct (57), and on the other hand with an inner duct input/output angular manifold (44) axially arranged on the inner face of the distributing flange (97) via an inner spool valve input/output channel (53), whereas said stator (96) also contains an outer duct chamber (56) that communicates on the one hand with the outer input/output duct (58), and on the other hand with an outer duct input/output angular manifold (89) also arranged axially on the inner face of the distributing flange (97) via another inner spool valve input/output channel (53).

19. The fixed or variable displacement hydraulic motor-pump according to claim 18, characterized in that the inner duct chamber (55) communicates with an inner duct axial force equalizing groove (100) arranged axially on the inner face of the equalizing flange (98) via a spool valve equalizing inner channel (54), whereas the outer duct chamber (56) communicates with an outer duct axial force equalizing groove (101) also arranged axially on the inner face of the equalizing flange (98) via another inner spool valve equalizing channel (54).

20. The fixed or variable displacement hydraulic motor-pump according to claim 18, characterized in that the distributing flange (97) and/or an equalizing flange (98) includes a radial sealing groove (102) at least at one of its radial ends.

21. The fixed or variable displacement hydraulic motor-pump according to claim 18, characterized in that the axial stator central hub (99) includes an axial sealing groove (93) at least at one of its axial ends or at any point along its length.

22. The fixed or variable displacement hydraulic motor-pump according to claim 15, characterized in that all or part of the inner duct input/output angular manifold (44), the outer duct input/output angular manifold (89), the outer duct radial force equalizing groove (90), the inner duct radial force equalizing groove (45), the axial sealing groove (93), the inner duct axial force equalizing groove (100), the outer duct axial force equalizing groove (101) or the radial sealing groove (102), which is provided with a spool valve groove segment (46).

23. The fixed or variable displacement hydraulic motor-pump according to claim 22, characterized in that the spool valve groove segment (46) has at least one flank segment (94) that laterally establishes sealing with the cylindrical stator (91) or the axial stator (96), and at least one segment contact line (49) which on the one hand comes into contact with the motor-pump central rotor (3) to form sealing, and which on the other hand is subjected to a force that tends to press it on said rotor (3) due to the thrust exerted by a pressurized motor-pump oil (114) contained by the cylindrical stator (91) or the axial stator (96) on the spool valve groove segment (46), said force being limited due to a small sprayed surface (161) subjected to the pressure of said oil (114) offered by said segment (46), which results from a segment force reacting shoulder (50) included by said segment (46) that cooperates with another shoulder (162) arranged in the cylindrical stator (91) or in the axial stator (96).

24. The fixed or variable displacement hydraulic motor-pump according to claim 22, characterized in that the spool valve groove segment (46) is kept in contact with the motor-pump central rotor (3) by a segment groove bottom spring (47).

25. The fixed or variable displacement hydraulic motor-pump according to claim 22, characterized in that the spool valve groove segment (46) is made up of two half-segments (95) that each have at least one segment flank (94) kept in contact with the cylindrical stator (91) or with the axial stator (96) by a segment separating spring (48).

26. The fixed or variable displacement hydraulic motor-pump according to claim 1, characterized in that the inner input/output duct (57) is secured in the input/output spool valve (43) and/or in the motor-pump frame (2) by one or the other of the end of said duct (57) using at least one fixed duct covering ball joint (59) and/or at least one sliding duct covering ball joint (60), said ball joint (59, 60) having a covering ball joint step (105) that may rest on a covering ball joint seat (64).

27. The fixed or variable displacement hydraulic motor-pump according to claim 26, characterized in that the fixed duct covering ball joint (59) is kept in contact with its covering ball joint seat (64) by a covering ball joint spring that bears on the one hand on the input/output spool valve (43) or on the motor-pump frame (2) or on a sliding duct covering ball joint (60), and on the other hand directly or indirectly on said fixed covering ball joint (59).

28. The fixed or variable displacement hydraulic motor-pump according to claim 26, characterized in that the sliding duct covering ball joint (60) is made up of at least one sliding covering half-ball (107) joint axially passed through by the inner input/output duct (57), said half-ball joint (107) being able to translate axially and sealably relative to said inner duct (57), whereas said half-ball joint (107) is kept in contact with its covering ball joint seat (64) by a covering ball joint spring (106) that bears on the one hand on the input/output spool valve (43) or on the motor-pump frame (2) or on another sliding covering half-ball joint (107), and on the other hand directly or indirectly on said sliding covering half-ball joint (107).

29. The fixed or variable displacement hydraulic motor-pump according to claim 1, characterized in that the outer input/output duct (58) is secured in the input/output spool valve (43) and/or in the motor-pump frame (2) by one or the other of the ends of said duct (58) using at least one fixed duct covering ball joint (59), said ball joint (59, 60) having a covering ball joint step (105) that can rest on a covering ball joint seat (64).

30. The fixed or variable displacement hydraulic motor-pump according to claim 15, characterized in that the inner duct chamber (55) is closed by an inner duct plug (66).

31. The fixed or variable displacement hydraulic motor-pump according to claim 15, characterized in that the outer duct chamber (56) is closed by an outer duct plug (67) that is passed through by said outer input/output duct (58).

32. The fixed or variable displacement hydraulic motor-pump according to claim 1, characterized in that the inner input/output duct (57) is housed completely or partially inside the outer input/output duct (58).

33. The fixed or variable displacement hydraulic motor-pump according to claim 1, characterized in that the motor-pump frame (2) comprises a connecting satellite (62) in which the inner input/output duct (57) and/or the outer input/output duct (58) are secured.

34. The fixed or variable displacement hydraulic motor-pump according to claim 2, characterized in that the peripheral rotor stator (65) is articulated on the angular synchronizing pinion axle (81), around which it can rotate under the action of a displacement varying servomotor (68).

35. The fixed or variable displacement hydraulic motor-pump according to claim 34, characterized in that the displacement varying servomotor (68) is a rotary electric servomotor motor (30) that can rotate—in one direction or the other and by means of a servomotor reducing gear (31)—a displacement-varying ring driving pinion (108), said pinion (108) being able to rotate in a bearing arranged in the motor-pump frame (2) and being able to rotate a displacement-varying ring (109) secured to the peripheral rotor stator (65), the pitch circle of said ring (109) being centered on the angular synchronizing pinion axle (81).

36. The fixed or variable displacement hydraulic motor-pump according to claim 34, characterized in that rephasing means (197) are inserted between the peripheral rotor angular synchro ring (42) and the central rotor angular synchro ring (11).

37. The fixed or variable displacement hydraulic motor-pump according to claim 36, characterized in that the rephasing means (197) are made up of at least one intermediate rephasing gear pair (198) including at least one rephasing toothed wheel (199) rotating around at least one rephasing axle (200) secured to the peripheral rotor stator (65), said gear pair (198) being inserted between the peripheral rotor angular synchro ring (42) and the angular synchronizing pinion (12).

38. The fixed or variable displacement hydraulic motor-pump according to claim 1, characterized in that the inner input/output duct (57) and the outer input/output duct (58) are connected to the input or the output, respectively, of at least one second fixed or variable displacement hydraulic motor-pump (125), the fixed or variable displacement hydraulic motor-pump (1) and the second fixed or variable displacement hydraulic motor-pump (125) together making up a hydraulic transmission device (63).

39. The fixed or variable displacement hydraulic motor-pump according to claim 38, characterized in that the central rotor power take-off (4) of the fixed or variable displacement motor-pump (1) is mechanically connected to at least one drive motor (123) included by a motor vehicle (110), whereas the second fixed or variable displacement hydraulic motor-pump (125) is mechanically connected to at least one driving wheel or track (124) included by said vehicle (110), or vice versa.

40. The fixed or variable displacement hydraulic motor-pump according to claim 38, characterized in that the inner input/output duct (57) can be connected with at least one high-pressure accumulator (71) by at least one inner duct high-pressure accumulator valve (112).

41. The fixed or variable displacement hydraulic motor-pump according to claim 38, characterized in that the outer input/output duct (58) can be connected with at least one high-pressure accumulator (71) by at least one outer duct high-pressure accumulator valve (128).

42. The fixed or variable displacement hydraulic motor-pump according to claim 38, characterized in that the inner input/output duct (57) can be connected with at least one low-pressure accumulator (118) by at least one inner duct low-pressure accumulator valve (129).

43. The fixed or variable displacement hydraulic motor-pump according to claim 38, characterized in that the outer input/output duct (58) can be connected with at least one low-pressure accumulator (118) by at least one outer duct low-pressure accumulator valve (130).

44. The fixed or variable displacement hydraulic motor-pump according to claim 40, characterized in that the high-pressure accumulator (71) and/or the low-pressure accumulator (118) comprises at least one accumulator separator piston (72) able to move sealably in a blind accumulator cylinder (113), said piston (72) delimiting, with said cylinder (113), a gas compartment (116) containing a pressurized gas (115) and an oil compartment (117) containing a motor-pump oil (114), the latter compartment (117) being able to be connected with the inner input/output duct (57) and/or the outer input/output duct (58).

45. The fixed or variable displacement hydraulic motor-pump according to claim 44, characterized in that the oil compartment (117) includes an accumulator-closing gate (73) that the accumulator separator piston (72) can press on an accumulator gate seat (74) by pushing on a high-stiffness resisting spring (76) inserted between said piston (72) and said gate (73), so as to sealably isolate said compartment (117) from the inner input/output duct (57) and/or the outer input/output duct (58), said gate (73) cooperating—unlike the high-stiffness resisting spring (76)—with a low-stiffness resisting spring (75) that tends to separate said gate (73) from said seat (74).

46. The fixed or variable displacement hydraulic motor-pump according to claim 45, characterized in that the accumulator separator piston (72) can push on the high-stiffness resisting spring (76) by means of a high-stiffness spring plunger (77) that is guided in longitudinal translation by a gate and plunger guide (78) secured to the high-pressure accumulator (71) and/or the low-pressure accumulator (118), said gate guide (78) also guiding the accumulator closing gate (73) and including a plunger stop (79) that determines the maximum travel of the high-stiffness spring plunger (77) toward the accumulator separator piston (72).

47. The fixed or variable displacement hydraulic motor-pump according to claim 46, characterized in that the gate and plunger guide (78) includes at least one radial gate guide orifice (80) that connects the oil compartment (117) with the accumulator gate seat (74) so as to allow the motor-pump oil (114) to circulate between the inner input/output duct (57) and/or the outer input/output duct (58) and said oil compartment (117).

48. The fixed or variable displacement hydraulic motor-pump according to claim 36, characterized in that the high-pressure accumulator (71) and/or a low-pressure accumulator (118) is connected to the inner input/output duct (57) and/or the outer input/output duct (58) by means of an accumulator locking gate (145) that can sealably isolate said accumulator (71, 118) from said inner duct (57) and/or said outer duct (58).

49. The fixed or variable displacement hydraulic motor-pump according to claim 42, characterized in that the low-pressure accumulator (118) is supplied with a motor-pump oil (114) by at least one low-pressure pump (119) driven by a low-pressure pump motor (120), the intake duct of said pump (119) being connected to a motor-pump oil reservoir (121) whereas its discharge duct is connected to said accumulator (118).

50. The fixed or variable displacement hydraulic motor-pump according to claim 38, characterized in that the inner input/output duct (57) can be connected, by an inner duct exchanger-dissipater valve (131), with at least one exchanger-dissipater inner duct (135) included by a pressure loss exchanger-dissipater (126), said duct (135) comprising at least one outer dissipater heat exchange surface (136) that is in contact with a coolant gas or a coolant liquid.

51. The fixed or variable displacement hydraulic motor-pump according to claim 38, characterized in that the outer input/output duct (58) can be connected, by an outer duct exchanger-dissipater valve (132), with at least one inner exchanger-dissipater duct (135) included by a pressure loss exchanger-dissipater (126), said duct (135) comprising at least one outer dissipater heat exchange surface (136) that is in contact with the coolant gas or a coolant liquid.

52. The fixed or variable displacement hydraulic motor-pump according to claim 38, characterized in that the inner input/output duct (57) can be connected with a secondary hydraulic motor (127) by an inner duct secondary motor valve (133).

53. The fixed or variable displacement hydraulic motor-pump according to claim 38, characterized in that the outer input/output duct (58) can be connected with a secondary hydraulic motor (127) by an outer duct secondary motor valve.

54. The fixed or variable displacement hydraulic motor-pump according to claim 52, characterized in that the secondary hydraulic motor (127) is made up of at least one hydraulic turbine (137) mounted on a hydraulic turbine shaft (138) that includes at least one hydraulic turbine blade (139) on which at least one hydraulic turbine injector (140) can axially and/or radially spray a jet of a motor-pump oil (114).

55. The fixed or variable displacement hydraulic motor-pump according to claim 39, characterized in that it includes a motor-pump management computer (70) that controls the displacement-varying servomotor (68) to control the displacement of the fixed or variable displacement hydraulic motor-pump (1), including that making up the hydraulic transmission device (63), irrespective of whether the latter is integrated into the motor vehicle (110), said computer (70) also being able to command the inner duct high-pressure accumulator valve (112) and/or the outer duct high-pressure accumulator valve (128) and/or the inner duct low-pressure accumulator valve (129) and/or the outer duct low-pressure accumulator valve (130) and/or the accumulator locking valve (145) and/or the low-pressure pump motor (120)

and/or the inner duct exchanger-dissipater valve (131) and/or the outer duct exchanger-dissipater valve (132) and/or the inner duct secondary motor valve (133) and/or the outer duct secondary motor valve.

56. The fixed or variable displacement hydraulic motor-pump according to claim 55, characterized in that the motor-pump management computer (70) is connected, by wired, lighted or electromagnetic information transmission means, to at least one shifting lever (146) and/or at least one shifting vane (147) and/or at least one shifting button (148) and/or at least one clutch pedal (149) and/or at least one brake pedal (150) and/or at least one accelerator pedal (151) included by a driving station (152) comprised by the motor vehicle (110).

57. The fixed or variable displacement hydraulic motor-pump according to claim 55, characterized in that the motor-pump management computer (70) is connected, by wired, lighted or electromagnetic information transmission means, to at least one transmission configuration button or knob (153) and/or a transmission configuration screen (154) and/or a transmission configuration microphone (155) and/or a transmission configuration speaker (156) included by a driving station (152) comprised by said motor vehicle (110).

* * * * *